(12) United States Patent
Murata et al.

(10) Patent No.: US 12,174,469 B2
(45) Date of Patent: Dec. 24, 2024

(54) DISPLAY DEVICE

(71) Applicant: Sharp Display Technology Corporation, Kameyama (JP)

(72) Inventors: Koji Murata, Kameyama (JP); Hiroshi Tsuchiya, Kameyama (JP); Atsuko Kanashima, Kameyama (JP); Takashi Satoh, Kameyama (JP); Shinji Shimada, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/122,725

(22) Filed: Mar. 17, 2023

(65) Prior Publication Data

US 2023/0296932 A1    Sep. 21, 2023

(30) Foreign Application Priority Data

Mar. 18, 2022  (JP) ................. 2022-043906

(51) Int. Cl.
  *G02F 1/13* (2006.01)
  *G02F 1/1335* (2006.01)
  *G02F 1/1343* (2006.01)

(52) U.S. Cl.
  CPC ...... *G02F 1/1323* (2013.01); *G02F 1/133531* (2021.01); *G02F 1/134363* (2013.01); *G02F 1/134372* (2021.01)

(58) Field of Classification Search
  CPC ... G02F 1/1323; G02F 1/1347; G02F 1/13471
  See application file for complete search history.

(56) References Cited

U.S. PATENT DOCUMENTS 11,002,998 B2   5/2021  Hopkin et al.
2008/0316366 A1* 12/2008 Takatani ............ G02F 1/13471
                                                348/E5.057

(Continued)

FOREIGN PATENT DOCUMENTS

| CN | 111323946 A * | 6/2020 | ........... G02F 1/1323 |
| JP | 2008-203565 A | 9/2008 | |
| WO | 2007/138732 A1 | 12/2007 | |

OTHER PUBLICATIONS

Min-Hsuan Chiu et al., "Advanced Hyper-Viewing Angle Controllable LCD", 543 • SID 2021 Digest, ISSN 0097-996X/21/5202-0543-$1.00 © 2021 SID, First published: Jun. 28, 2021.

*Primary Examiner* — Alexander P Gross
(74) *Attorney, Agent, or Firm* — ScienBiziP, P.C.

(57) ABSTRACT

Provided is a display device including a backlight; a first liquid crystal panel; a display panel; and a second liquid crystal panel. The first liquid crystal panel includes a first substrate, a first liquid crystal layer containing first liquid crystal molecules, and a second substrate. The second liquid crystal panel includes a third substrate, a second liquid crystal layer containing second liquid crystal molecules, and a fourth substrate. The display device satisfies the following formula: |φ3−φ1|≥50°, wherein φ1 represents an azimuthal angle of a director of the first liquid crystal molecules near the first substrate with no voltage applied to the first liquid crystal layer, and 43 represents an azimuthal angle of a director of the second liquid crystal molecules near the third substrate with no voltage applied to the second liquid crystal layer.

4 Claims, 24 Drawing Sheets

(56) References Cited

U.S. PATENT DOCUMENTS

| | | |
|---|---|---|
| 2009/0102989 A1 | 4/2009 | Sakai et al. |
| 2020/0326567 A1* | 10/2020 | Fang ................. G02F 1/133524 |
| 2021/0341769 A1* | 11/2021 | Woodgate ............ G02B 6/0053 |
| 2021/0341800 A1* | 11/2021 | Woodgate ............. G02F 1/0136 |

* cited by examiner

DISPLAY DEVICE

CROSS-REFERENCE TO RELATED APPLICATIONS

The present application claims priority under 35 U.S.C. § 119 to Japanese Patent Application No. 2022-043906 filed on Mar. 18, 2022, the contents of which are incorporated herein by reference in their entirety.

BACKGROUND OF THE INVENTION

Field of the Invention

The following disclosure relates to display devices.

Description of Related Art

Various display devices such as liquid crystal display devices and organic electroluminescent (EL) display devices have been widely used as devices that display videos (moving images and still images).

Liquid crystal panels used for liquid crystal display devices are panels utilizing a liquid crystal composition to control light passing therethrough. In a typical mode thereof, voltage is applied to a liquid crystal composition sealed between paired substrates such that the alignment of liquid crystal molecules in the liquid crystal composition is changed according to the applied voltage, whereby the amount of light passing through the panel is controlled. Such liquid crystal panels have advantageous features such as thin profile, light weight, and low power consumption, and are therefore used in a variety of fields.

Studies to enhance the viewing angle characteristics of display devices have been made such that the same image can be observed regardless of whether the angle of observation is in a narrow viewing angle range or a wide viewing angle range. Meanwhile, a display method considered in terms of privacy protection is one that allows observation of an image in a narrow viewing angle range but makes the image difficult to observe in a wide viewing angle range. Such studies and consideration suggest a desire for display devices switchable between these modes, namely the public mode (wide viewing angle mode) that allows observation of the same image both in a narrow viewing angle range and in a wide viewing angle range and the privacy mode (narrow viewing angle mode) that allows observation of an image in the narrow viewing angle range but makes the image difficult to observe in the wide viewing angle range. Such a display device is also referred to as a viewing angle-controlling display.

An emphasis is placed particularly on the balance between the privacy protection and the features such as thin profile, light weight, and low power consumption in viewing angle-controlling displays in the smartphone and personal computer (PC) markets. Meanwhile, in the in-car device market (co-driver displays (CDDs): passenger seat exclusive liquid crystal displays (LCDs)), an emphasis is placed on switching between turning on and off the complete light blocking mode which makes the display unobservable from the driver's seat while maintaining the display quality from the passenger seat. In all of the above markets, controlling the left and right viewing angles (or only the left viewing angle) is desired.

Unlike in the markets mentioned above, controlling the viewing angles in the top-bottom direction as well as the left-right direction is advantageous in the automatic teller machine (ATM) market and the point of sales (POS) register market. For example, an ATM terminal preferably functions to display an advertisement with a wide viewing angle when no one uses the ATM terminal while functioning with a narrower viewing angle for personal information protection when a consumer makes a cash deposit at the ATM terminal. Thus, viewing angle-controllable ATM terminals have been desired.

A technique related to a display device switchable between the public mode and the privacy mode is disclosed in JP 2008-203565 A, for example. JP 2008-203565 A discloses a viewing angle-controlling liquid crystal panel which, when placed on the front or back surface of a display panel, controls the viewing angle of an image displayed on the display panel, and includes a liquid crystal layer and pixels as units used in application of voltage to the liquid crystal layer. Linearly polarized light is to be incident on the liquid crystal layer. On the surface of the liquid crystal layer from which light is to be emitted is provided a polarizing plate that transmits only light components parallel to the polarization axis of the linearly polarized light incident on the liquid crystal layer, among the light components emitted from the liquid crystal layer. The liquid crystal molecules in the liquid crystal layer tilt in the direction parallel or perpendicular to the polarization axis of linearly polarized light incident on the liquid crystal layer when voltage is applied to the liquid crystal layer. The pixels are arranged in a matrix pattern.

U.S. Ser. No. 11/002,998 B2 discloses a backlight system for controlling a viewing angle, the backlight system including: a first backlight unit that emits light from a non-viewing side of the backlight system toward a viewing side of the backlight system; a second backlight unit located on a viewing side of the first backlight unit that emits light toward the viewing side of the backlight system; a privacy optic that includes a liquid crystal material and is located on a non-viewing side of the second backlight unit and between the first backlight unit and the second backlight unit, wherein the privacy optic operates to transmit light from the first backlight unit in a limited viewing angle range; a first polarizer located on a viewing side of the privacy optic and on a non-viewing side of the second backlight unit; and a second polarizer located on a non-viewing side of the privacy optic and on a viewing side of the first backlight unit; wherein the privacy optic includes a liquid crystal cell configured as a hybrid aligned nematic (HAN) liquid crystal cell located between the first polarizer and the second polarizer, the HAN liquid crystal cell including a first substrate having a first electrode layer and a second substrate having a second electrode layer on opposite sides of a liquid crystal layer, and wherein a viewing angle restriction is stronger when a voltage is applied across the HAN liquid crystal cell.

WO 2007/138732 discloses a display system including a display device, the display device including: a backlight; a display panel; and a viewing angle control panel for controlling the viewing angle of the display panel, the display system further including a reflected light amount relative increasing section for causing an amount of external light reflected in the display device to be relatively larger than an amount of light leaked from the backlight in the display device.

AU Optronics Corp., Hsinchu et al., Taiwan, "Advanced Hyper-Viewing Angle Controllable LCD", SID 2021 DIGEST, 543 discloses a dual-cell liquid crystal display device including a vertical alignment (VA) mode liquid crystal lens cell; a viewing angle-controlling liquid crystal panel with an ITO grid electrode on its substrate on one side; a display-providing liquid crystal panel; and a louver film. This liquid crystal display device can utilize the transverse electric field to modulate the refractive index distribution in the cell and thereby diffuse the backlight illumination through the louver film (operates in the public mode) during voltage application to the grid electrode of the viewing angle-controlling liquid crystal panel, while allowing the backlight illumination to travel as is toward the display-providing liquid crystal panel without being diffused during no voltage application (operates in the privacy mode).

BRIEF SUMMARY OF THE INVENTION

JP 2008-203565 A, U.S. Ser. No. 11/002,998 B2, WO 2007/138732, and Hsinchu et al. do not mention any consideration on the technique of controlling the viewing angles in the top-bottom direction as well as in the left-right direction.

In response to the above issues, an object of the present invention is to provide a display device capable of controlling the viewing angles in the left-right direction and the viewing angles in the top-bottom direction.

(1) One embodiment of the present invention is directed to a display device including, sequentially from a back surface side toward a viewing surface side: a backlight; a first liquid crystal panel; a display panel; and a second liquid crystal panel, the first liquid crystal panel including, sequentially from the back surface side toward the viewing surface side, a first substrate, a first liquid crystal layer containing first liquid crystal molecules, and a second substrate, the second liquid crystal panel including, sequentially from the back surface side toward the viewing surface side, a third substrate, a second liquid crystal layer containing second liquid crystal molecules, and a fourth substrate, the display device satisfying the following Formula (1):

$$|\varphi 3-\varphi 1|\geq 50° \quad \text{Formula (1)}$$

wherein $\varphi 1$ represents an azimuthal angle of a director of the first liquid crystal molecules near the first substrate with no voltage applied to the first liquid crystal layer, and $\varphi 3$ represents an azimuthal angle of a director of the second liquid crystal molecules near the third substrate with no voltage applied to the second liquid crystal layer.

(2) In an embodiment of the present invention, the display device includes the structure (1), further includes a polarizing plate with an absorption axis between the first liquid crystal panel and the display panel, and satisfies at least one of the following Formula (A2-1) to Formula (A2-4) as well as the following Formula (A3):

$$0°\leq\theta(\varphi 1,P2)\leq 3° \quad \text{Formula (A2-1)}$$

$$87°\leq\theta(\varphi 1,P2)\leq 90° \quad \text{Formula (A2-2)}$$

$$0°\leq\theta(\varphi 2,P2)\leq 3° \quad \text{Formula (A2-3)}$$

$$87°\leq\theta(\varphi 2,P2)\leq 90° \quad \text{Formula (A2-4)}$$

$$0°\leq|\varphi 1-\varphi 2|<5° \quad \text{Formula (A3)}$$

wherein $\varphi 2$ represents an azimuthal angle of a director of the first liquid crystal molecules near the second substrate with no voltage applied to the first liquid crystal layer, $\theta(\varphi 1, P2)$ represents an angle formed by the director of the first liquid crystal molecules near the first substrate and the absorption axis in a plan view, and $\theta(\varphi 2, P2)$ represents an angle formed by the director of the first liquid crystal molecules near the second substrate and the absorption axis in a plan view.

(3) In an embodiment of the present invention, the display device includes the structure (1), further includes a polarizing plate with an absorption axis between the first liquid crystal panel and the display panel, and satisfies at least one of the following Formula (A4-1) to Formula (A4-4) as well as the following Formula (A5):

$$5°\leq\theta(\varphi 1,P2)\leq 20° \quad \text{Formula (A4-1)}$$

$$65°\leq\theta(\varphi 1,P2)\leq 80° \quad \text{Formula (A4-2)}$$

$$5°\leq\theta(\varphi 2,P2)\leq 20° \quad \text{Formula (A4-3)}$$

$$65°\leq\theta(\varphi 2,P2)\leq 80° \quad \text{Formula (A4-4)}$$

$$0°\leq|\varphi 1-\varphi 2|<5° \quad \text{Formula (A5)}$$

wherein $\varphi 2$ represents an azimuthal angle of a director of the first liquid crystal molecules near the second substrate with no voltage applied to the first liquid crystal layer, $\theta(\varphi 1, P2)$ represents an angle formed by the director of the first liquid crystal molecules near the first substrate and the absorption axis in a plan view, and $\theta(\varphi 2, P2)$ represents an angle formed by the director of the first liquid crystal molecules near the second substrate and the absorption axis in a plan view.

(4) In an embodiment of the present invention, the display device includes the structure (1), further includes a polarizing plate with an absorption axis between the first liquid crystal panel and the display panel, and satisfies at least one of the following Formula (A6-1) to Formula (A6-4) as well as the following Formula (A7):

$$5°\leq\theta(\varphi 1,P2)\leq 20° \quad \text{Formula (A6-1)}$$

$$65°\leq\theta(\varphi 1,P2)\leq 80° \quad \text{Formula (A6-2)}$$

$$5°\leq\theta(\varphi 2,P2)\leq 20° \quad \text{Formula (A6-3)}$$

$$65°\leq\theta(\varphi 2,P2)\leq 80° \quad \text{Formula (A6-4)}$$

$$5°|\varphi 1-\varphi 2|\leq 20° \quad \text{Formula (A7)}$$

wherein $\varphi 2$ represents an azimuthal angle of a director of the first liquid crystal molecules near the second substrate with no voltage applied to the first liquid crystal layer, $\theta(\varphi 1, P2)$ represents an angle formed by the director of the first liquid crystal molecules near the first substrate and the absorption axis in a plan view, and $\theta(\varphi 2, P2)$ represents an angle formed by the director of the first liquid crystal molecules near the second substrate and the absorption axis in a plan view.

(5) In an embodiment of the present invention, the display device includes the structure (2), (3), or (4), and satisfies at least one of the following Formula (B2-1) to Formula (B2-4) as well as the following Formula (B3):

$$0°\leq\theta(\varphi 3,P2)\leq 3° \quad \text{Formula (B2-1)}$$

$$87°\leq\theta(\varphi 3,P2)\leq 90° \quad \text{Formula (B2-2)}$$

$$0°\leq\theta(\varphi 4,P2)\leq 3° \quad \text{Formula (B2-3)}$$

$$87°\leq\theta(\varphi 4,P2)\leq 90° \quad \text{Formula (B2-4)}$$

$$0°\leq|\varphi 3-\varphi 4|<5° \quad \text{Formula (B3)}$$

wherein $\varphi 4$ represents an azimuthal angle of a director of the second liquid crystal molecules near the fourth substrate with no voltage applied to the second liquid crystal layer, $\theta(\varphi 3, P2)$ represents an angle formed by the director of the second liquid crystal molecules near the third substrate and the absorption axis in a plan view, and $\theta(\varphi 4, P2)$ represents an angle formed by the director of the second liquid crystal molecules near the fourth substrate and the absorption axis in a plan view.

(6) In an embodiment of the present invention, the display device includes the structure (1), (2), (3), (4), or (5), and the display panel is an IPS mode or FFS mode liquid crystal display panel.

The present invention can provide a display device capable of controlling the viewing angles in the left-right direction and the viewing angles in the top-bottom direction.

DETAILED DESCRIPTION OF THE INVENTION

Hereinafter, embodiments of the present invention are described. The present invention is not limited to the following embodiments. The design may be modified as appropriate within the range satisfying the configuration of the present invention. In the following description, components having the same or similar functions in different drawings are commonly provided with the same reference sign so as to appropriately avoid repetition of description. The embodiments in the present invention may be combined as appropriate without departing from the spirit of the present invention.

DEFINITION OF TERMS

The "viewing surface side" herein means the side closer to the screen (display surface) of the liquid crystal panel. The "back surface side" herein means the side farther from the screen (display surface) of the liquid crystal panel.

Figure 1:
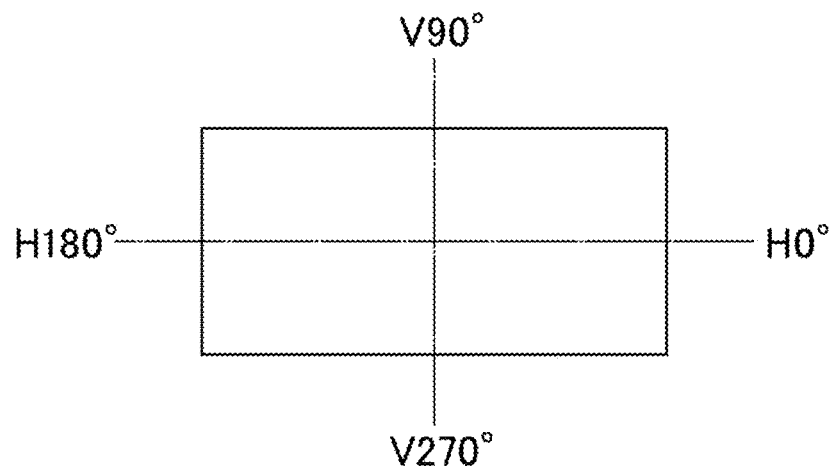
FIG. 1 is a view used to describe azimuthal angles and polar angles.

FIG. 1 is a view used to describe azimuthal angles and polar angles. FIG. 1 is a schematic plan view of a liquid crystal panel as viewed from the viewing surface side (front). The "azimuth" herein means the direction in question (e.g., measurement direction) in a view projected onto the screen of the liquid crystal panel and is expressed as an angle (azimuthal angle) formed with the reference azimuth. The reference azimuth (0°) is set to the right in the horizontal direction of the screen of the liquid crystal panel as shown in FIG. 1. The numerical values in FIG. 1 represent azimuthal angles, with H representing the left-right direction (horizontal direction) and V representing the top-bottom direction (vertical direction). Herein, the left-right direction is also referred to as H180°-0°, and the top-bottom direction is also referred to as V270°-90°.

The azimuthal angle measures positive in the counterclockwise direction from the reference azimuth and measures negative in the clockwise direction from the reference azimuth. Both the counterclockwise and clockwise directions are rotational directions when the screen of the liquid crystal panel is viewed from the viewing surface side (front). The angle is a value measured in a plan view of the liquid crystal panel. The expression that two straight lines (including axes and directions) are "perpendicular" herein means that they are perpendicular in a plan view of the liquid crystal panel. The expression that two straight lines (including axes and directions) are "parallel" means that they are parallel in a plan view of the liquid crystal panel.

The "polar angle" herein means an angle formed by the direction in question (e.g., measurement direction) and the direction normal to the screen of the liquid crystal panel. As shown in FIG. 1, in the left-right direction, i.e., H180°-0°, the polar angle of the direction in question is positive when it is at an azimuthal angle of 0° while the polar angle of the direction in question is negative when it is at an azimuthal angle of 180°. In the top-bottom direction, i.e., V270°-90°, the polar angle of the direction in question is positive when it is at an azimuthal angle of 90° while the polar angle of the direction in question is negative when it is at an azimuthal angle of 270°.

The "axis azimuth" herein means, unless otherwise specified, the azimuth of the absorption axis (reflection axis) of a polarizer or the optic axis (slow axis) of a birefringent layer.

The expression that two axes are "perpendicular" herein means that they form an angle of 90°±3°, preferably 90°±1°, more preferably 90°±0.5°, particularly preferably 90° (perfectly perpendicular). The expression that two axes are "parallel" means that they form an angle of 0°±3°, preferably 0°±1°, more preferably 0°±0.5°, particularly preferably 0° (perfectly parallel).

The retardation Rp in the in-plane direction is defined by Rp=(ns−nf)d. The retardation Rth in the thickness direction is defined by Rth=(nz−(nx+ny)/2)d. In the formulas, ns represents nx or ny, whichever is greater, while nf represents nx or ny, whichever is smaller; nx and ny each represent a principal refractive index in the in-plane direction of a birefringent layer (including a liquid crystal panel); nz represents a principal refractive index in the out-of-plane direction, i.e., the direction perpendicular to a surface of the birefringent layer; and d represents the thickness of the birefringent layer.

The measurement wavelength for optical parameters such as a principal refractive index and a phase difference herein is 550 nm unless otherwise specified.

The "birefringent layer" herein means a layer having optical anisotropy and is a concept encompassing a liquid crystal panel. The birefringent layer provides, for example, a retardation in the in-plane direction, or a retardation in the thickness direction in absolute value of not less than 10 nm, preferably not less than 20 nm.

Hereinafter, embodiments of the present invention are described. The present invention is not limited to the following embodiments. The design may be modified as appropriate within the range satisfying the configuration of the present invention.

Embodiment 1

Figure 2:
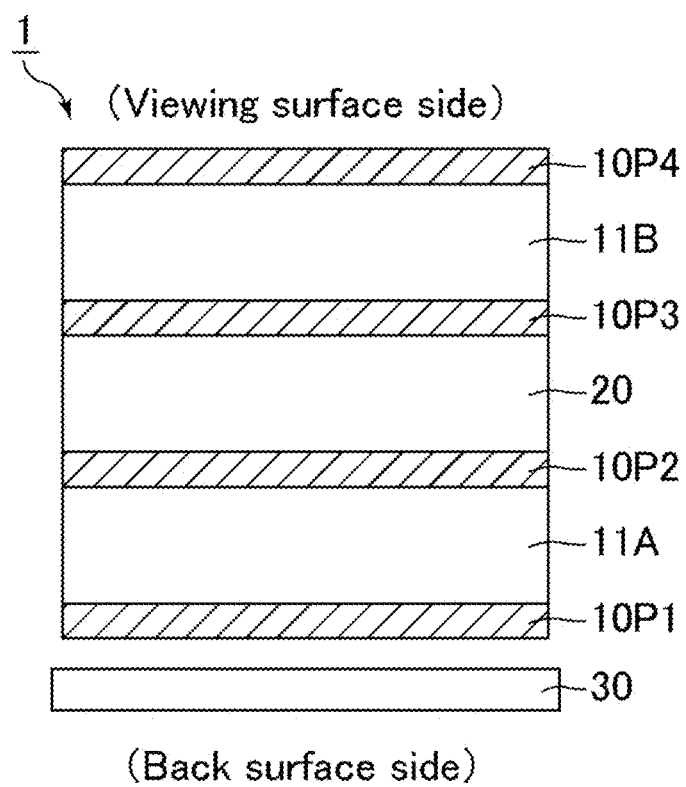
FIG. 2 is a schematic cross-sectional view of a display device of Embodiment 1.
Figure 3:
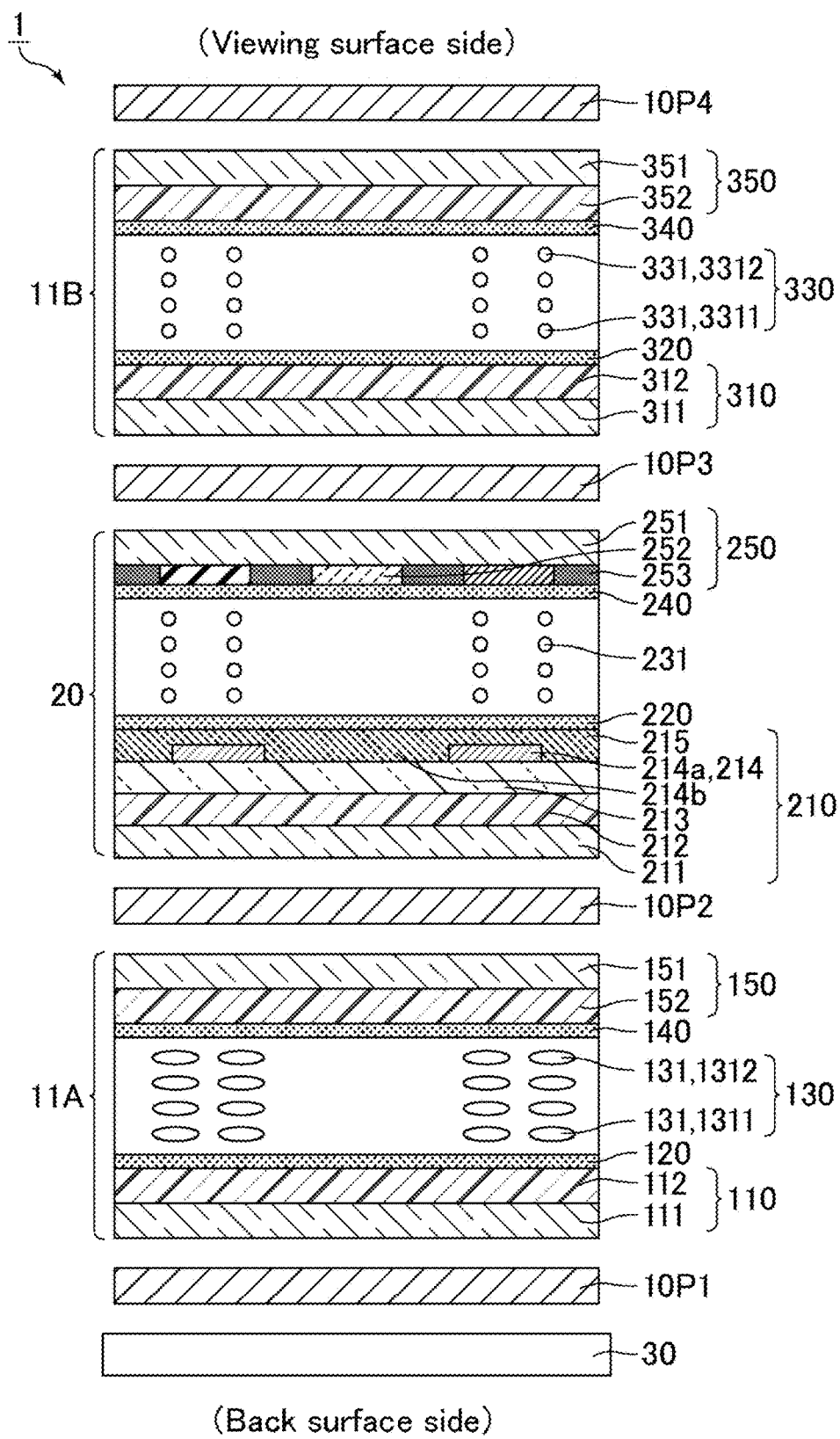
FIG. 3 is an enlarged schematic cross-sectional view of the display device of Embodiment 1.
Figure 4:
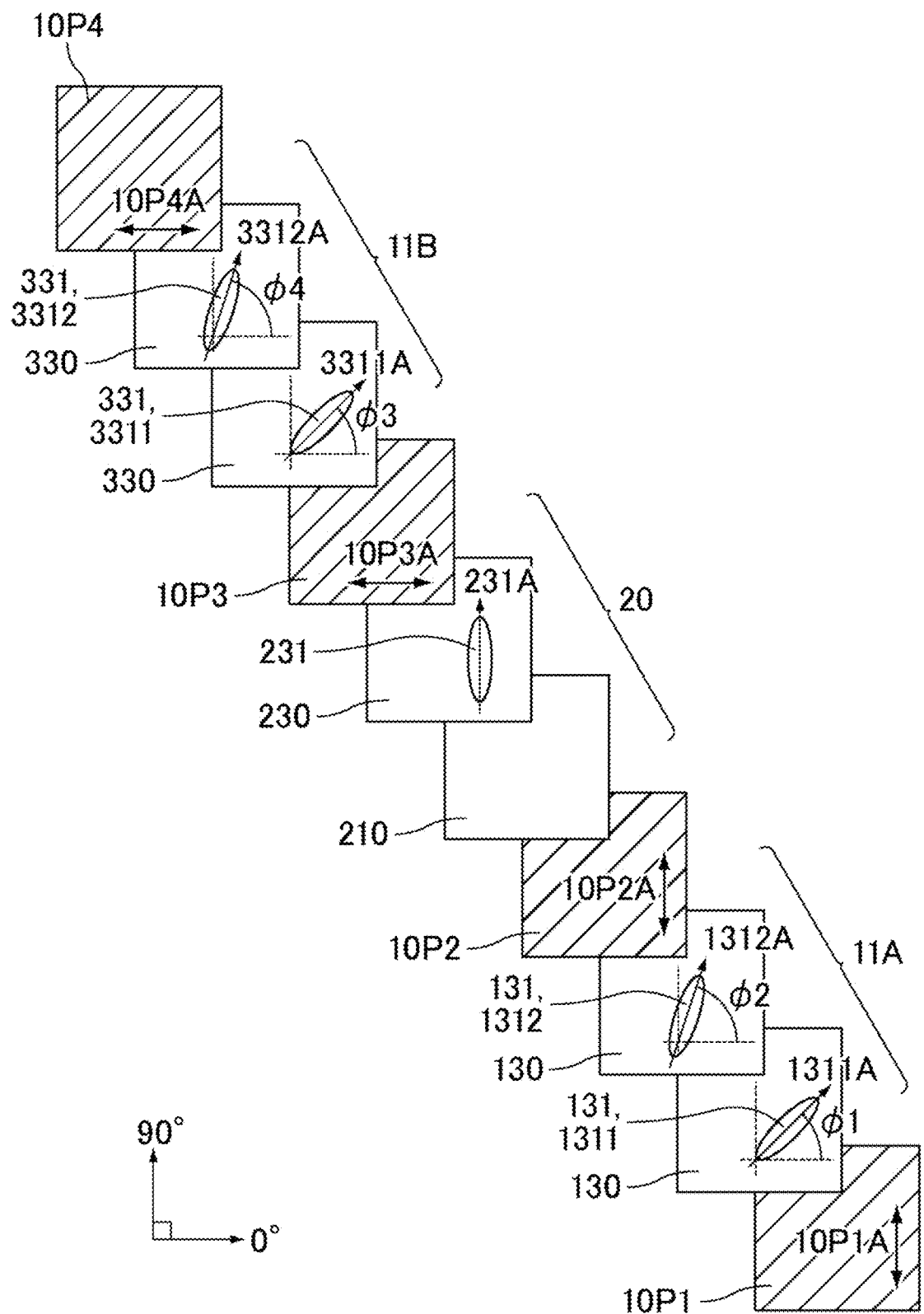
FIG. 4 is a front schematic view of the display device of Embodiment 1.

FIG. 2 is a schematic cross-sectional view of a display device of Embodiment 1. FIG. 3 is an enlarged schematic cross-sectional view of the display device of Embodiment 1. FIG. 4 is a front schematic view of the display device of Embodiment 1.

As shown in FIG. 2 to FIG. 4, a display device 1 of the present embodiment includes, sequentially from the back surface side toward the viewing surface side, a backlight 30; a first viewing angle-controlling liquid crystal panel 11A as the first liquid crystal panel; a liquid crystal display panel 20 as the display panel; and a second viewing angle-controlling liquid crystal panel 11B as the second liquid crystal panel. The first viewing angle-controlling liquid crystal panel 11A includes, sequentially from the back surface side toward the viewing surface side, a first substrate 110; a first liquid crystal layer 130 containing first liquid crystal molecules 131; and a second substrate 150. The second viewing angle-controlling liquid crystal panel 11B includes a third substrate 310; a second liquid crystal layer 330 containing second liquid crystal molecules 331; and a fourth substrate 350. The display device 1 satisfies the following Formula (1):

$$|\varphi 3-\varphi 1|\geq 50°$$ Formula (1)

wherein $\varphi 1$ represents an azimuthal angle of a director 1311A of the first liquid crystal molecules 1311 near the first substrate 110 with no voltage applied to the first liquid crystal layer 130, and $\varphi 3$ represents an azimuthal angle of a director 3311A of the second liquid crystal molecules 3311 near the third substrate 310 with no voltage applied to the second liquid crystal layer 330.

In this configuration, with no voltage applied to the first liquid crystal layer 130 and the second liquid crystal layer 330, the first viewing angle-controlling liquid crystal panel 11A and the second viewing angle-controlling liquid crystal panel 11B function in the wide viewing angle mode. Also, with voltage applied to the first liquid crystal layer 130 and the second liquid crystal layer 330, the display device 1 functions in the narrow viewing angle mode in which one of the first viewing angle-controlling liquid crystal panel 11A and the second viewing angle-controlling liquid crystal panel 11B controls the viewing angles in the left-right direction and the other of the first viewing angle-controlling liquid crystal panel 11A and the second viewing angle-controlling liquid crystal panel 11B controls the viewing angles in the top-bottom direction. This enables a display device 1 capable of controlling the viewing angles in the left-right direction and the viewing angles in the top-bottom direction. The expression "controlling the viewing angles in the left-right direction (H180°-0°)" means reducing the polar angle (light-shielding angle) at which the transmittance is minimum (preferably, achieving a light-shielding angle not greater than 45° in absolute value) in at least one of the left direction (negative polar angle side) or the right direction (positive polar angle side). The expression "controlling the viewing angles in the top-bottom direction (V270°-90°)" means reducing the light-shielding angle (preferably, achieving a light-shielding angle not greater than 45° in absolute value) in at least one of the bottom direction (negative polar angle side) or the top direction (positive polar angle side).

Unlike the present embodiment above, JP 2008-203565 A, U.S. Ser. No. 11/002,998 B2, WO 2007/138732, and Hsinchu et al. each include a single viewing angle-controlling liquid crystal panel, and thus can control the viewing angles only in one of the left-right direction and the top-bottom direction. Also, the viewing angle-controlling panel in the display system of WO 2007/138732 is provided with paired polarizing plates whose polarization axes are set at azimuthal angles of 45° and 135° in crossed Nicols. This means that the panel functions in the VA mode and may thus disadvantageously have a significantly low front luminance. Also, the display panel is limited to a VA-mode one. Hereinafter, the display device 1 of the present embodiment is described in detail.

The display device 1 of the present embodiment includes, sequentially from the back surface side toward the viewing surface side, the backlight 30; a first polarizing plate 10P1 with a first absorption axis 10P1A; the first viewing angle-controlling liquid crystal panel 11A; a second polarizing plate 10P2 with a second absorption axis 10P2A; the liquid crystal display panel 20; a third polarizing plate 10P3 with a third absorption axis 10P3A; the second viewing angle-controlling liquid crystal panel 11B; and a fourth polarizing plate 10P4 with a fourth absorption axis 10P4A.

All the first polarizing plate 10P1, the second polarizing plate 10P2, the third polarizing plate 10P3, and the fourth polarizing plate 10P4 are absorptive polarizers. The first polarizing plate 10P1, the second polarizing plate 10P2, the third polarizing plate 10P3, and the fourth polarizing plate 10P4 may each be, for example, a polarizer (absorptive polarizing plate) obtained by dyeing a polyvinyl alcohol (PVA) film with an anisotropic material such as an iodine complex (or dye) to adsorb the anisotropic material on the PVA film, and stretching the film for alignment.

The first polarizing plate 10P1 has the first absorption axis 10P1A and a first transmission axis perpendicular to the first absorption axis 10P1A. The second polarizing plate 10P2 has the second absorption axis 10P2A and a second transmission axis perpendicular to the second absorption axis 10P2A. The third polarizing plate 10P3 has the third absorption axis 10P3A and a third transmission axis perpendicular to the third absorption axis 10P3A. The fourth polarizing plate 10P4 has the fourth absorption axis 10P4A and a fourth transmission axis perpendicular to the fourth absorption axis 10P4A.

As shown in FIG. 4, the first absorption axis 10P1A is preferably parallel to the second absorption axis 10P2A. This configuration allows the first polarizing plate 10P1 and the second polarizing plate 10P2 to be arranged in parallel Nicols.

The configuration thus enables more effective transmission of backlight illumination in a region ranging from small to large polar angles with no voltage applied when the backlight 30 is placed on the back surface side of the first viewing angle-controlling liquid crystal panel 11A. For example, the first absorption axis 10P1A and the second absorption axis 10P2A are set in the 90°-270° azimuthal angle direction.

The third absorption axis 10P3A is preferably parallel to the fourth absorption axis 10P4A. This configuration allows the third polarizing plate 10P3 and the fourth polarizing plate 10P4 to be arranged in parallel Nicols. The configuration thus enables more effective transmission of backlight illumination in a region ranging from small to large polar angles with no voltage applied when the backlight 30 is placed on the back surface side of the second viewing angle-controlling liquid crystal panel 11B. For example, the third absorption axis 10P3A and the fourth absorption axis 10P4A are set in the 0°-180° azimuthal angle direction.

The second absorption axis 10P2A is preferably perpendicular to the third absorption axis 10P3A. This configuration enables the normally black mode, increasing the contrast ratio of the displayed image.

The first liquid crystal panel (the first viewing angle-controlling liquid crystal panel 11A in the present embodiment) and the second liquid crystal panel (the second viewing angle-controlling liquid crystal panel 11B in the present embodiment) are switching liquid crystal panels switchable between the wide viewing angle mode and the narrow viewing angle mode at azimuths different from each other. The wide viewing angle mode allows observation of the same image both in a narrow viewing angle range and in a wide viewing angle range, and this mode is also referred to as a public mode. The narrow viewing angle mode allows observation of an image in the narrow viewing angle range but makes the image difficult to observe in the wide viewing angle range, and this mode is also referred to as a privacy mode. The first viewing angle-controlling liquid crystal panel 11A and the second viewing angle-controlling liquid crystal panel 11B are also simply referred to as viewing angle-controlling liquid crystal panels.

The first viewing angle-controlling liquid crystal panel 11A includes, sequentially from the back surface side toward the viewing surface side, the first substrate 110 including a first support substrate 111 and a first electrode 112; a first alignment film 120; the first liquid crystal layer 130 containing the first liquid crystal molecules 131; a second alignment film 140; and the second substrate 150 including a second support substrate 151 and a second electrode 152.

The second viewing angle-controlling liquid crystal panel 11B includes, sequentially from the back surface side toward the viewing surface side, the third substrate 310 including a third support substrate 311 and a third electrode 312; a third alignment film 320; the second liquid crystal layer 330 containing the second liquid crystal molecules 331; a fourth alignment film 340; and the fourth substrate 350 including a fourth support substrate 351 and a fourth electrode 352.

The first viewing angle-controlling liquid crystal panel 11A can change the voltage applied between the first electrode 112 and the second electrode 152 to change the retardation of the first liquid crystal layer 130, thus controlling transmission and blocking of light in the first liquid crystal layer 130. The second viewing angle-controlling liquid crystal panel 11B can change the voltage applied between the third electrode 312 and the fourth electrode 352 to change the retardation of the second liquid crystal layer 330, thus controlling transmission and blocking of light in the second liquid crystal layer 330.

The first viewing angle-controlling liquid crystal panel 11A and the second viewing angle-controlling liquid crystal panel 11B each are a passive liquid crystal panel which is passively driven. Similar to a typical passive liquid crystal panel, the first substrate 110 of the first viewing angle-controlling liquid crystal panel 11A includes the first electrode 112 as a solid electrode covering the entire surface of a screen, and the second substrate 150 includes the second electrode 152 as a solid electrode covering the entire surface of the screen. This configuration enables switching between the public mode and the privacy mode throughout the screen. The third substrate 310 of the second viewing angle-controlling liquid crystal panel 11B includes the third electrode 312 as a solid electrode covering the entire surface of a screen, and the fourth substrate 350 includes the fourth electrode 352 as a solid electrode covering the entire surface of the screen. This configuration enables switching between the public mode and the privacy mode throughout the screen.

With no voltage applied to the first liquid crystal layer 130 and the second liquid crystal layer 330, the azimuthal angle of the director 1311A of the first liquid crystal molecules 1311 near the first substrate 110 is $\varphi 1$, the azimuthal angle of a director 1312A of first liquid crystal molecules 1312 near the second substrate 150 is $\varphi 2$, the azimuthal angle of the director 3311A of the second liquid crystal molecules 3311 near the third substrate 310 is $\varphi 3$, and the azimuthal angle of a director 3312A of second liquid crystal molecules 3312 near the fourth substrate 350 is $\varphi 4$.

The director 1311A of the first liquid crystal molecules 1311 near the first substrate 110 is the alignment vector pointing from an initial point, which is the average of the back surface side long axis ends of the first liquid crystal molecules 1311 near the first substrate 110, to a terminal point, which is the average of the viewing surface side long axis ends of the first liquid crystal molecules 1311 near the first substrate 110. The director 1312A of the first liquid crystal molecules 1312 near the second substrate 150 is the alignment vector pointing from an initial point, which is the average of the viewing surface side long axis ends of the first liquid crystal molecules 1312 near the second substrate 150, to a terminal point, which is the average of the back surface side long axis ends of the first liquid crystal molecules 1312 near the second substrate 150. The director 3311A of the second liquid crystal molecules 3311 near the third substrate 310 is the alignment vector pointing from an initial point, which is the average of the back surface side long axis ends of the second liquid crystal molecules 3311 near the third substrate 310, to a terminal point, which is the average of the viewing surface side long axis ends of the second liquid crystal molecules 3311 near the third substrate 310. The director 3312A of the second liquid crystal molecules 3312 near the fourth substrate 350 is the alignment vector pointing from an initial point, which is the average of the viewing surface side long axis ends of the second liquid crystal molecules 3312 near the fourth substrate 350, to a terminal point, which is the average of the back surface side long axis ends of the second liquid crystal molecules 3312 near the fourth substrate 350.

The display device 1 of the present embodiment satisfies the following Formula (1). This configuration enables control of the viewing angles in the left-right direction of one of the first viewing angle-controlling liquid crystal panel 11A and the second viewing angle-controlling liquid crystal panel 11B and control of the viewing angles in the top-bottom direction of the other of the first viewing angle-controlling liquid crystal panel 11A and the second viewing angle-controlling liquid crystal panel 11B.

$|\varphi 3 - \varphi 1| \geq 50°$ Formula (1)

The first viewing angle-controlling liquid crystal panel 11A and the second viewing angle-controlling liquid crystal panel 11B each employ a vertical electric field mode, for example, to display an image. In the vertical electric field mode, a liquid crystal layer is sandwiched between paired substrates one of which includes pixel electrodes and the other of which includes a common electrode, and voltage is applied between the pixel electrodes and the common electrode to generate a vertical electric field in the liquid crystal layer.

Examples of the vertical electric field mode include the ECB mode which aligns the liquid crystal molecules in the liquid crystal layer in the direction parallel to a substrate surface, i.e., homogeneously (horizontally), with no voltage applied, and the vertical alignment (VA) mode and the hybrid aligned nematic (HAN) mode which align liquid crystal molecules in the liquid crystal layer in the direction vertical to a substrate surface, i.e., homeotropically (vertically), with no voltage applied. The first viewing angle-controlling liquid crystal panel 11A and the second viewing angle-controlling liquid crystal panel 11B in the present embodiment are preferably in the ECB mode.

The director of the first liquid crystal molecules near the first substrate means the director of the first liquid crystal molecules horizontally aligned in the vicinity of the first substrate. Specifically, when the alignment film on the first liquid crystal layer side of the first substrate is a horizontal alignment film, the director of the first liquid crystal molecules near the first substrate means the director of the first liquid crystal molecules in the first substrate side interface of the first liquid crystal layer. When the alignment film on the first liquid crystal layer side of the first substrate is a vertical alignment film, the first liquid crystal molecules in the first substrate side interface of the first liquid crystal layer are vertically aligned, and thus the director of the first liquid crystal molecules near the first substrate means the director of horizontally aligned first liquid crystal molecules that are closer to the center of the first liquid crystal layer than the first liquid crystal molecules in the first substrate side interface are. The director of the first liquid crystal molecules means the direction of the principal axes of alignment (the average direction of the long axes of molecules in nematic liquid crystal). Thus, the director of the first liquid crystal molecules near the first substrate with no voltage applied to the first liquid crystal layer and the alignment treatment direction for the alignment film on the first liquid crystal layer side of the second substrate are at the same azimuthal angle.

Similarly, the director of the first liquid crystal molecules near the second substrate is the director of the first liquid crystal molecules horizontally aligned in the vicinity of the second substrate. Specifically, when the alignment film on the first liquid crystal layer side of the second substrate is a horizontal alignment film, the director of the first liquid crystal molecules near the second substrate means the director of the first liquid crystal molecules in the second substrate side interface of the first liquid crystal layer. When the alignment film on the first liquid crystal layer side of the second substrate is a vertical alignment film, the first liquid crystal molecules in the second substrate side interface of the first liquid crystal layer are vertically aligned, and thus the director of the first liquid crystal molecules near the second substrate means the director of horizontally aligned first liquid crystal molecules that are closer to the center of the first liquid crystal layer than the first liquid crystal molecules in the second substrate side interface are. The director of the first liquid crystal molecules means the direction of the principal axes of alignment. Thus, the director of the first liquid crystal molecules near the second substrate with no voltage applied to the first liquid crystal layer and the alignment treatment direction for the alignment film on the first liquid crystal layer side of the first substrate are at the same azimuthal angle.

Similarly, the director of the second liquid crystal molecules near the third substrate is the director of the second liquid crystal molecules horizontally aligned in the vicinity of the third substrate. Specifically, when the alignment film on the second liquid crystal layer side of the third substrate is a horizontal alignment film, the director of the second liquid crystal molecules near the third substrate means the director of the second liquid crystal molecules in the third substrate side interface of the second liquid crystal layer. When the alignment film on the second liquid crystal layer side of the third substrate is a vertical alignment film, the second liquid crystal molecules in the third substrate side interface of the second liquid crystal layer are vertically aligned, and thus the director of the second liquid crystal molecules near the third substrate means the director of horizontally aligned second liquid crystal molecules that are closer to the center of the second liquid crystal layer than the second liquid crystal molecules in the third substrate side interface are. The director of the second liquid crystal molecules means the direction of the principal axes of alignment. Thus, the director of the second liquid crystal molecules near the third substrate with no voltage applied to the second liquid crystal layer and the alignment treatment direction for the alignment film on the second liquid crystal layer side of the third substrate are at the same azimuthal angle.

Similarly, the director of the second liquid crystal molecules near the fourth substrate is the director of the second liquid crystal molecules horizontally aligned in the vicinity of the fourth substrate. Specifically, when the alignment film on the second liquid crystal layer side of the fourth substrate is a horizontal alignment film, the director of the second liquid crystal molecules near the fourth substrate means the director of the second liquid crystal molecules in the fourth substrate side interface of the second liquid crystal layer. When the alignment film on the second liquid crystal layer side of the fourth substrate is a vertical alignment film, the second liquid crystal molecules in the fourth substrate side interface of the second liquid crystal layer are vertically aligned, and thus the director of the second liquid crystal molecules near the fourth substrate means the director of horizontally aligned second liquid crystal molecules that are closer to the center of the second liquid crystal layer than the second liquid crystal molecules in the fourth substrate side interface are. The director of the second liquid crystal molecules means the direction of the principal axes of alignment. Thus, the director of the second liquid crystal molecules near the fourth substrate with no voltage applied to the second liquid crystal layer and the alignment treatment direction for the alignment film on the second liquid crystal layer side of the fourth substrate are at the same azimuthal angle.

The alignment state of the liquid crystal molecules can also be analyzed as follows. When an extinction position is found in a state where the liquid crystal panel with no voltage applied is sandwiched between paired polarizing plates arranged in crossed Nicols, the liquid crystal molecules are determined to be in the homogeneous (horizontal) alignment state (State 1) or the homeotropic (vertical) alignment state (State 2), each with no twist. When no extinction position is found, only one of the polarizing plates arranged in crossed Nicols is rotated in an azimuth direction. If the rotation is in the counterclockwise direction by 10° and the rotation reveals an extinction position, the liquid crystal molecules in the liquid crystal panel are determined to be twisted by 10° with no voltage applied while being in (State 1) or (State 2).

A distinction can be made between (State 1) and (State 2) by determining the voltage dependence of the in-plane phase difference using Axoscan (available from Axometrics, Inc.) to see whether the mode is the ECB mode or a different mode (e.g., HAN mode, VA mode) based on the characteristic curve of the determined voltage dependence. Such a distinction between the modes can be made because the ECB mode shows a clear threshold in the voltage dependence of the in-plane phase difference whereas the HAN mode shows no threshold.

Whether the liquid crystal molecules are horizontally aligned or vertically aligned can be determined by measuring the in-plane phase difference with no voltage applied using Axoscan (available from Axometrics, Inc.). A horizontal alignment state with no twist shows an in-plane phase difference: (ne−no)×d, while a horizontal alignment state with a twist of 10° shows an in-plane phase difference: {(ne−no)×cos 5°}×d, where ne represents the refractive index along the long axes of the liquid crystal molecules, no represents the refractive index along the short axes of the liquid crystal molecules, and d represents a gap (thickness of the liquid crystal layer). In contrast, the vertical alignment state is clearly different from the horizontal alignment state because only light experiencing the refractive index along the short axes is perceived and thus the in-plane phase difference with no voltage applied is about 0 nm. The formula of the in-plane phase difference with a twist of 10° includes cos 5° because the liquid crystal molecules are twisted gradually in the thickness direction by a (total) twist of 10° and the average of such twists is 5°.

The alignment state (including the director) of the liquid crystal molecules can be more specifically analyzed using Axoscan (available from Axometrics, Inc.) by measuring oblique phase differences along two axes (measurement of oblique phase differences of a cell), specifically by measuring the in-plane phase differences of the liquid crystal panel from a polar angle of 0° (front) to a polar angle of ±60° along the two axes (in the two azimuth directions). These measurement results also allow estimation of the director of the liquid crystal molecules (information including specific tilt angles).

The display device 1 more preferably satisfies the following Formula (1-1). This configuration enables more effective control of the viewing angles in the left-right direction of one of the first viewing angle-controlling liquid crystal panel 11A and the second viewing angle-controlling liquid crystal panel 11B and more effective control of the viewing angles in the top-bottom direction of the other of the first viewing angle-controlling liquid crystal panel 11A and the second viewing angle-controlling liquid crystal panel 11B.

$|\varphi 3-\varphi 1| \geq 70°$  Formula (1-1)

The display device 1 preferably satisfies the following Formula (2) and more preferably satisfies the following Formula (2-1). This configuration enables still more effective control of the viewing angles in the left-right direction of one of the first viewing angle-controlling liquid crystal panel 11A and the second viewing angle-controlling liquid crystal panel 11B and still more effective control of the viewing angles in the top-bottom direction of the other of the first viewing angle-controlling liquid crystal panel 11A and the second viewing angle-controlling liquid crystal panel 11B.

$130° \geq |\varphi 3-\varphi 1|$  Formula (2)

$110° \geq |\varphi 3-\varphi 1|$  Formula (2-1)

The display device 1 preferably satisfies the following Formula (3) and more preferably satisfies the following Formula (3-1). This configuration enables particularly effective control of the viewing angles in the left-right direction of one of the first viewing angle-controlling liquid crystal panel 11A and the second viewing angle-controlling liquid crystal panel 11B and particularly effective control of the viewing angles in the top-bottom direction of the other of the first viewing angle-controlling liquid crystal panel 11A and the second viewing angle-controlling liquid crystal panel 11B.

$$130° \geq |\varphi 3 - \varphi 1| \geq 50° \quad \text{Formula (3)}$$

$$110° \geq |\varphi 3 - \varphi 1| \geq 70° \quad \text{Formula (3-1)}$$

Preferably, the display device 1 includes the second polarizing plate 10P2 with the second absorption axis 10P2A between the first viewing angle-controlling liquid crystal panel 11A and the liquid crystal display panel 20, and the display device 1 satisfies at least one of the following Formula (A2-1) to Formula (A2-4) as well as the following Formula (A3):

$$0° \leq \theta(\varphi 1, P2) \leq 3° \quad \text{Formula (A2-1)}$$

$$87° \leq \theta(\varphi 1, P2) \leq 90° \quad \text{Formula (A2-2)}$$

$$0° \leq \theta(\varphi 2, P2) \leq 3° \quad \text{Formula (A2-3)}$$

$$87° \leq \theta(\varphi 2, P2) \leq 90° \quad \text{Formula (A2-4)}$$

$$0° \leq |\varphi 1 - \varphi 2| < 5° \quad \text{Formula (A3)}$$

wherein $\varphi 2$ represents the azimuthal angle of the director 1312A of the first liquid crystal molecules 1312 near the second substrate 150 with no voltage applied to the first liquid crystal layer 130, $\theta(\varphi 1, P2)$ represents the angle formed by the director 1311A of the first liquid crystal molecules 1311 near the first substrate 110 and the second absorption axis 10P2A in a plan view, and $\theta(\varphi 2, P2)$ represents the angle formed by the director 1312A of the first liquid crystal molecules 1312 near the second substrate 150 and the second absorption axis 10P2A in a plan view. This configuration enables the display device 1 to operate in a narrow viewing angle mode symmetric in the left-right direction or the top-bottom direction (for example, light-shielding angles of ±45°). The "angle formed" is expressed as an angle not smaller than 0° and not greater than 90°.

The display device 1 more preferably satisfies at least one of the following Formula (A2-1-1) to Formula (A2-4-1) as well as the following Formula (A3-1). This configuration more effectively enables the display device 1 to operate in the narrow viewing angle mode symmetric in the left-right direction or the top-bottom direction (for example, light-shielding angles of ±45°).

$$0° \leq \theta(\varphi 1, P2) \leq 1° \quad \text{Formula (A2-1-1)}$$

$$89° \leq \theta(\varphi 1, P2) \leq 90° \quad \text{Formula (A2-2-1)}$$

$$0° \leq \theta(\varphi 2, P2) \leq 1° \quad \text{Formula (A2-3-1)}$$

$$89° \leq \theta(\varphi 2, P2) \leq 90° \quad \text{Formula (A2-4-1)}$$

$$0° \leq |\varphi 1 - \varphi 2| \leq 3° \quad \text{Formula (A3-1)}$$

Preferably, the display device 1 includes the second polarizing plate 10P2 with the second absorption axis 10P2A between the first viewing angle-controlling liquid crystal panel 11A and the liquid crystal display panel 20, and the display device 1 satisfies at least one of the following Formula (B2-1) to Formula (B2-4) and the following Formula (B3):

$$0° \leq \theta(\varphi 3, P2) \leq 3° \quad \text{Formula (B2-1)}$$

$$87° \leq \theta(\varphi 3, P2) \leq 90° \quad \text{Formula (B2-2)}$$

$$0° \leq \theta(\varphi 4, P2) \leq 3° \quad \text{Formula (B2-3)}$$

$$87° \leq \theta(\varphi 4, P2) \leq 90° \quad \text{Formula (B2-4)}$$

$$0 \leq |\varphi 3 - \varphi 4| < 5° \quad \text{Formula (B3)}$$

wherein $\varphi 4$ represents the azimuthal angle of the director 3312A of the second liquid crystal molecules 3312 near the fourth substrate 350 with no voltage applied to the second liquid crystal layer 330, $\theta(\varphi 3, P2)$ represents the angle formed by the director 3311A of the second liquid crystal molecules 3311 near the third substrate 310 and the second absorption axis 10P2A in a plan view, and $\theta(\varphi 4, P2)$ represents the angle formed by the director 3312A of the second liquid crystal molecules 3312 near the fourth substrate 350 and the second absorption axis 10P2A in a plan view. This configuration enables the display device 1 to operate in the narrow viewing angle mode symmetric in the left-right direction or the top-bottom direction (for example, light-shielding angles of ±45°).

The display device 1 more preferably satisfies at least one of the following Formula (B2-1-1) to Formula (B2-4-1) as well as the following Formula (B3-1). This configuration more effectively enables the display device 1 to operate in the narrow viewing angle mode symmetric in the left-right direction or the top-bottom direction (for example, light-shielding angles of ±45°).

$$0° \leq \theta(\varphi 3, P2) \leq 1° \quad \text{Formula (B2-1-1)}$$

$$89° \leq \theta(\varphi 3, P2) \leq 90° \quad \text{Formula (B2-2-1)}$$

$$0° \leq \theta(\varphi 4, P2) \leq 1° \quad \text{Formula (B2-3-1)}$$

$$89° \leq \theta(\varphi 4, P2) \leq 90° \quad \text{Formula (B2-4-1)}$$

$$0° \leq |\varphi 3 - \varphi 4| \leq 3° \quad \text{Formula (B3-1)}$$

When the azimuthal angle $\varphi 1$ is not smaller than 45° and smaller than 135° or is not smaller than 225° and smaller than 315°, the first viewing angle-controlling liquid crystal panel 11A can achieve the narrow viewing angle mode in the left-right direction. When the azimuthal angle $\varphi 1$ is not smaller than 0° and smaller than 45°, is not smaller than 135° and smaller than 225°, or is not smaller than 315° and smaller than 360°, the first viewing angle-controlling liquid crystal panel 11A can achieve the narrow viewing angle mode in the top-bottom direction.

When the azimuthal angle $\varphi 3$ is not smaller than 45° and smaller than 135° or is not smaller than 225° and smaller than 315°, the second viewing angle-controlling liquid crystal panel 11B can achieve the narrow viewing angle mode in the left-right direction. When the azimuthal angle $\varphi 3$ is not smaller than 0° and smaller than 45°, is not smaller than 135° and smaller than 225°, or is not smaller than 315° and smaller than 360°, the second viewing angle-controlling liquid crystal panel 11B can achieve the narrow viewing angle mode in the top-bottom direction.

Examples of the first support substrate 111, the second support substrate 151, the third support substrate 311, and the fourth support substrate 351 include substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The first electrode 112, the second electrode 152, the third electrode 312, and the fourth electrode 352 may be transparent electrodes that can be formed from, for example, a transparent conductive material such as indium tin oxide (ITO), indium zinc oxide (IZO), zinc oxide (ZnO), or tin oxide (SnO) or an alloy of any of these materials.

The first alignment film 120 and the second alignment film 140 control the alignment azimuth for the first liquid crystal molecules 131 with no voltage applied and the tilt angle of the first liquid crystal molecules 131 with no voltage applied. The first alignment film 120 and the second alignment film 140 may be horizontal alignment films or vertical alignment films. In order to increase the transmittance with no voltage applied, the first alignment film 120 and the second alignment film 140 are preferably horizontal alignment films.

The third alignment film 320 and the fourth alignment film 340 control the alignment azimuth for the second liquid crystal molecules 331 with no voltage applied and the tilt angle of the second liquid crystal molecules 331 with no voltage applied. The third alignment film 320 and the fourth alignment film 340 may be horizontal alignment films or vertical alignment films. In order to increase the transmittance with no voltage applied, the third alignment film 320 and the fourth alignment film 340 are preferably horizontal alignment films.

A horizontal alignment film, when provided to a substrate in a liquid crystal panel, exerts an alignment control force of aligning the liquid crystal molecules in the liquid crystal layer substantially horizontally thereto, with no voltage applied to the liquid crystal layer. A vertical alignment film, when provided to a substrate in a liquid crystal panel, exerts an alignment control force of aligning the liquid crystal molecules in the liquid crystal layer substantially vertically thereto, with no voltage applied to the liquid crystal layer.

The expression "substantially horizontally" means that the tilt angle is not smaller than 0° and not greater than 10°, preferably not smaller than 0° and not greater than 5°, more preferably not smaller than 0° and not greater than 2°. The expression "substantially vertically" means that the tilt angle is not smaller than 83° and not greater than 90°, preferably not smaller than 85° and not greater than 90°, more preferably not smaller than 87.5° and not greater than 88.0°.

The "tilt angle" herein does not mean the angle formed by the director of liquid crystal molecules and the main surface of each substrate, but means the average angle formed by the director of liquid crystal molecules in the thickness direction of the liquid crystal layer and the main surface of each substrate, with the angle parallel to the substrate main surface measuring 0° and the angle of the line normal to the substrate main surface measuring 90°. In particular, the tilt angle of the liquid crystal molecules with no voltage applied is also referred to as a pre-tilt angle. The alignment azimuth of liquid crystal molecules with no voltage applied is also referred to as an initial alignment azimuth. The tilt angle can be measured by the rotating crystal method with, for example, Axoscan (available from Axometrics, Inc.). The director of liquid crystal molecules in the present embodiment means the direction of the principal axes of alignment (the average direction of the long axes of molecules in nematic liquid crystal). For example, in a plan view, the director of liquid crystal molecules with no voltage applied coincides with the alignment treatment direction for the alignment films.

The first alignment film 120, the second alignment film 140, the third alignment film 320, and the fourth alignment film 340 can be made of a material commonly used in the field of liquid crystal panels, such as a polymer having a polyimide structure in its main chain, a polymer having a polyamic acid structure in its main chain, or a polymer having a polysiloxane structure in its main chain. The first alignment film 120, the second alignment film 140, the third alignment film 320, and the fourth alignment film 340 can be formed by, for example, applying an alignment film material to a substrate. The application method may be any method such as flexographic printing or inkjet coating.

The first alignment film 120, the second alignment film 140, the third alignment film 320, and the fourth alignment film 340 may each be a photoalignment film containing a photo-functional group and having undergone a photoalignment treatment as the alignment treatment, a rubbed alignment film having undergone a rubbing treatment as the alignment treatment, or an alignment film having undergone no alignment treatment.

The first liquid crystal layer 130 contains the first liquid crystal molecules 131. The amount of light passing through the first liquid crystal layer 130 is controlled by changing the alignment state of the first liquid crystal molecules 131 according to the voltage applied to the first liquid crystal layer 130. The second liquid crystal layer 330 contains the second liquid crystal molecules 331. The amount of light passing through the second liquid crystal layer 330 is controlled by changing the alignment of the second liquid crystal molecules 331 according to the voltage applied to the second liquid crystal layer 330.

The anisotropy of dielectric constant ($\Delta\varepsilon$) of the first liquid crystal molecules 131 and the second liquid crystal molecules 331 is defined by the following formula (L). Preferably, the first liquid crystal molecules 131 and the second liquid crystal molecules 331 have a positive anisotropy of dielectric constant. This configuration can relatively reduce the driving voltage as compared with the case of using negative liquid crystal molecules having a negative anisotropy of dielectric constant. The configuration also can make the liquid crystal panel resistant to the external thermal environment (highly reliable) as compared with the case of using negative liquid crystal molecules. Liquid crystal molecules having a positive anisotropy of dielectric constant are referred to as positive liquid crystal molecules, while liquid crystal molecules having a negative anisotropy of dielectric constant are referred to as negative liquid crystal molecules. The direction of the long axes of liquid crystal molecules with no voltage applied is also referred to as the initial alignment direction of the liquid crystal molecules.

$\Delta\varepsilon$=(dielectric constant in long axis direction of liquid crystal molecules)−(dielectric constant in short axis direction of liquid crystal molecules)  (L)

When the first liquid crystal molecules 131 have a positive anisotropy of dielectric constant, the first liquid crystal molecules 131 are homogeneously aligned with no voltage applied and thus can achieve the ECB mode in the first viewing angle-controlling liquid crystal panel 11A. When the second liquid crystal molecules 331 have a positive anisotropy of dielectric constant, the second liquid crystal molecules 331 are homogeneously aligned with no voltage applied and thus can achieve the ECB mode in the second viewing angle-controlling liquid crystal panel 11B.

Herein, the homogeneous alignment means an alignment state where the liquid crystal molecules are aligned horizontally to the surfaces of a substrate constituting the viewing angle-controlling liquid crystal panel (e.g., the surfaces of at least one of the substrates between which the liquid crystal layer is sandwiched) and the orientations of the liquid crystal molecules are the same. The state with no voltage applied to the liquid crystal layer (with no voltage applied, during no voltage application) herein means a state where voltage of not lower than the threshold for the liquid crystal molecules is not applied to the liquid crystal layer. For example, the same constant voltage may be applied to the paired electrodes between which the liquid crystal layer is sandwiched, or a constant voltage may be applied to one of the paired electrodes between which the liquid crystal layer is sandwiched while a voltage lower than the threshold for the liquid crystal molecules relative to the constant voltage may be applied to the other of the electrodes. The state with voltage applied to the liquid crystal layer (with voltage applied, during voltage application) herein means a state where a voltage of not lower than the threshold for the liquid crystal molecules is applied to the liquid crystal layer.

The birefringence Δn of the first liquid crystal molecules 131 may be not lower than 0.08 and not higher than 0.24. For a high degree of reliability (high voltage holding ratio, wide operation temperature range), the birefringence Δn is preferably not lower than 0.08 and not higher than 0.16.

Similarly, the birefringence Δn of the second liquid crystal molecules 331 may be not lower than 0.08 and not higher than 0.24. For a high degree of reliability (high voltage holding ratio, wide operation temperature range), the birefringence Δn is preferably not lower than 0.08 and not higher than 0.16.

The thickness (cell thickness) d of the first liquid crystal layer 130 is preferably not smaller than 3 μm and not greater than 10 μm. This configuration can increase the response speed of the first liquid crystal molecules 131. Also, the thickness of the first viewing angle-controlling liquid crystal panel 11A can be further reduced. In terms of reduction of thickness, the thickness d of the first liquid crystal layer 130 is more preferably not smaller than 3 μm and not greater than 5 μm. In terms of the yield, the thickness d of the first liquid crystal layer 130 is more preferably not smaller than 5 μm and not greater than 10 μm. The first liquid crystal layer 130 having a thickness d of not smaller than 5 μm can cause the display unevenness due to contamination with a foreign material to be less noticeable, thus increasing the yield.

Similarly, the thickness (cell thickness) d of the second liquid crystal layer 330 is preferably not smaller than 3 μm and not greater than 10 μm. This configuration can increase the response speed of the second liquid crystal molecules 331. Also, the thickness of the second viewing angle-controlling liquid crystal panel 11B can be further reduced. In terms of reduction of thickness, the thickness d of the second liquid crystal layer 330 is more preferably not smaller than 3 μm and not greater than 5 μm. In terms of the yield, the thickness d of the second liquid crystal layer 330 is more preferably not smaller than 5 μm and not greater than 10 μm. The second liquid crystal layer 330 having a thickness d of not smaller than 5 μm can cause the display unevenness due to contamination with a foreign material to be less noticeable, thus increasing the yield.

The display panel (the liquid crystal display panel 20 in the present embodiment) is a panel having a function of displaying an image. The liquid crystal display panel 20 includes, as shown in FIG. 3, sequentially from the back surface side toward the viewing surface side, a fifth substrate 210, a fifth alignment film 220, a third liquid crystal layer 230, a sixth alignment film 240, and a sixth substrate 250. The liquid crystal display panel 20 includes pixels arranged in a matrix pattern in the in-plane direction.

The fifth substrate 210 preferably includes fifth electrodes 212 and sixth electrodes 214. This configuration enables an in-plane switching (IPS) mode or fringe field switching (FFS) mode liquid crystal display panel 20. The liquid crystal display panel 20 alone thus can achieve a wide viewing angle. In the present embodiment, a case where the liquid crystal display panel 20 is in the FFS mode is described as an example.

As shown in FIG. 3, the fifth substrate 210 includes, sequentially from the back surface side toward the viewing surface side, a fifth support substrate 211, the fifth electrodes 212 arranged in the respective pixels, an insulating layer 213, the sixth electrodes 214 each including linear electrodes 214a, and an insulating layer 215. In other words, the fifth substrate 210 has an FFS-mode electrode structure including the fifth electrodes 212 and the sixth electrodes 214 stacked with the insulating layer 213 in between. The fifth substrate 210 is also referred to as an active matrix substrate.

The fifth substrate 210 includes, on the fifth substrate 210, parallel gate lines and parallel source lines crossing the gate lines via an insulating film. The gate lines and the source lines as a whole are formed in a grid pattern. TFTs are arranged as switching elements at the respective intersections of the gate lines and the source lines.

The present embodiment is described with reference to the liquid crystal display panel 20 having an FFS-mode electrode structure as an example. Yet, the concept of the present embodiment is also applicable to an IPS-mode electrode structure in which the fifth electrodes 212 and the sixth electrodes 214 are both comb-teeth electrodes, and the fifth electrodes 212 as comb-teeth electrodes and the sixth electrodes 214 as comb-teeth electrodes are formed in the same electrode layer such that their comb teeth fit each other.

Examples of the fifth support substrate 211 include substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The fifth electrodes 212 and the sixth electrodes 214 are arranged in the respective pixels. The fifth electrodes 212 are preferably planar electrodes. Herein, the "planar electrode" means an electrode without any slit or aperture in a plan view. The fifth electrodes 212 preferably overlap at least the later-described linear electrodes 214a of the sixth electrodes 214 in a plan view.

The sixth electrodes 214 are electrically connected to one another over the pixels. The sixth electrodes 214 each include the linear electrodes 214a. The planar shape of the sixth electrodes 214 may be, for example, a structure in which the ends of the linear electrodes 214a are both closed. The sixth electrodes 214 may each be provided with an aperture 214b surrounded by its electrode portion.

The sixth electrodes 214 arranged in the respective pixels may be electrically connected to one another and a common constant voltage may be applied to the pixels, while each of the fifth electrodes 212 arranged in the respective pixels may be electrically connected to the corresponding source line via the semiconductor layer of the corresponding TFT and different voltages may be applied to the respective pixels according to the respective image signals. Also, each of the sixth electrodes 214 may be electrically connected to the corresponding source line via the semiconductor layer of the corresponding TFT and different voltages may be applied to the respective pixels according to the respective image signals, while the fifth electrodes 212 may be electrically connected to one another and a common constant voltage may be applied to the pixels.

Examples of the fifth electrodes 212 and the sixth electrodes 214 include the same electrodes as the first electrode 112 and the second electrode 152.

Examples of the insulating layer 213 and the insulating layer 215 include inorganic insulating films and organic insulating films. The inorganic insulating films may be, for example, inorganic films (relative dielectric constant ε=5 to 7) such as a silicon nitride (SiNx) film or a silicon oxide (SiO$_2$) film, or a laminate of these films. The organic insulating films may be, for example, organic films such as an acrylic resin film, a polyimide resin film, or a novolac resin film, or a laminate of any of these films.

The sixth substrate 250 includes, sequentially from the viewing surface side toward the back surface side, a sixth support substrate 251, a color filter layer 252, and a black matrix layer 253. The sixth substrate 250 is also referred to as a color filter substrate.

The sixth support substrate 251 may be, for example, the same substrate as the fifth support substrate 211.

The color filter layer 252 is defined by, for example, red color filters, green color filters, and blue color filters. The red color filters, the green color filters, and the blue color filters each are made of, for example, a transparent resin containing a pigment.

The black matrix layer 253 is disposed in a grid pattern to partition the color filters of multiple colors in the color filter layer 252. The black matrix layer may be made of any material capable of blocking light and may preferably be made of a resin material containing a black pigment or a metal material capable of blocking light. The black matrix layer 253 is formed by, for example, applying a photosensitive resin containing a black pigment to form a film, followed by photolithography including exposure and development.

The fifth alignment film 220 and the sixth alignment film 240 control the alignment azimuth for the third liquid crystal molecules 231 with no voltage applied and the tilt angle of the third liquid crystal molecules 231 with no voltage applied. The fifth alignment film 220 and the sixth alignment film 240 may be horizontal alignment films or vertical alignment films. In order to adjust the in-plane liquid crystal retardation to achieve a sufficient white luminance, the fifth alignment film 220 and the sixth alignment film 240 are preferably horizontal alignment films.

The fifth alignment film 220 and the sixth alignment film 240 may be rubbed alignment films or photoalignment films. The fifth alignment film 220 and the sixth alignment film 240 contain, for example, a polymer for an alignment film such as a polymer having a polyimide structure in its main chain, a polymer having a polyamic acid structure in its main chain, or a polymer having a polysiloxane structure in its main chain. The fifth alignment film 220 and the sixth alignment film 240 can be formed by, for example, applying an alignment film material containing the polymer for an alignment film to the fifth substrate 210 and the sixth substrate 250, respectively. The application method may be any method such as flexographic printing or inkjet coating.

The third liquid crystal layer 230 contains the third liquid crystal molecules 231. The amount of light passing through the third liquid crystal layer 230 is controlled by changing the alignment of the third liquid crystal molecules 231 according to the voltage applied to the third liquid crystal layer 230. The anisotropy of dielectric constant (Δε) of the liquid crystal molecules defined by the formula (L) may be positive or negative, and is preferably positive.

The backlight 30 may be one commonly used in the field of liquid crystal display devices. The backlight 30 may be any one that can be placed on the back surface side of the first viewing angle-controlling liquid crystal panel 11A and emit light produced therein to the viewing surface side. The backlight 30 may be a direct-lit one or an edge-lit one. The light source of the backlight 30 may be of any type such as a light emitting diode (LED) or a cold cathode fluorescent lamp (CCFL).

The backlight 30 may include a louver film to improve the directivity. Preferably, the backlight 30 includes two light guide plates, and one of the two light guide plates has a function for the wide viewing angle mode and the other of the two light guide plates has a function for the narrow viewing angle mode. Specifically, for example, the backlight 30 may include a light guide plate laminate of a diffusing light guide plate and a non-diffusing light guide plate and independently control the LEDs arranged at the end of each of the two light guide plates, so as to be able to switch the mode of the backlight between the public mode and the privacy mode.

The display device 1 may further include a viewing angle widening film (phase difference film) on the back surface side of the fifth substrate 210 or on the viewing surface side of the sixth substrate 250. Examples of the viewing angle widening film include SAM films that have a fine wedge-like slope structure and disperse straight-forward-travelling light to all the azimuths.

Embodiment 2

The features unique to the present embodiment are mainly described here, and description of the matters already described in Embodiment 1 is omitted. The present embodiment is substantially the same as Embodiment 1, except for the director of the first liquid crystal molecules with no voltage applied to the first liquid crystal layer.

Preferably, the display device 1 includes the second polarizing plate 10P2 with the second absorption axis 10P2A between the first viewing angle-controlling liquid crystal panel 11A and the liquid crystal display panel 20, wherein the display device 1 satisfies at least one of the following Formula (A4-1) to Formula (A4-4) as well as the following Formula (A5):

$$5° \leq \theta(\varphi1, P2) \leq 20° \quad \text{Formula (A4-1)}$$

$$65° \leq \theta(\varphi1, P2) \leq 80° \quad \text{Formula (A4-2)}$$

$$5° \leq \theta(\varphi2, P2) \leq 20° \quad \text{Formula (A4-3)}$$

$$65° \leq \theta(\varphi2, P2) \leq 80° \quad \text{Formula (A4-4)}$$

$$0° \leq |\varphi1 - \varphi2| < 5° \quad \text{(Formula A5)}$$

wherein φ2 represents the azimuthal angle of the director 1312A of the first liquid crystal molecules 1312 near the second substrate 150 with no voltage applied to the first liquid crystal layer 130, θ(φ1, P2) represents the angle formed by the director 1311A of the first liquid crystal molecules 1311 near the first substrate 110 and the second absorption axis 10P2A in a plan view, and θ(φ2, P2) represents the angle formed by the director 1312A of the first liquid crystal molecules 1312 near the second substrate 150 and the second absorption axis 10P2A in a plan view. This configuration enables the display device 1 to operate in a narrow viewing angle mode asymmetric in the left-right direction or the top-bottom direction. For example, the light-shielding angle can be further reduced on either the positive polar angle side or the negative polar angle side. The term "asymmetric" means that the light-shielding angle on the negative polar angle side is different from the light-shielding angle on the positive polar angle side.

For example, the present embodiment can achieve an even narrower viewing angle using the viewing angle-controlling liquid crystal panel operated in the narrow viewing angle mode symmetric in the left-right direction in combination with the viewing angle-controlling liquid crystal panel operated in the narrow viewing angle mode asymmetric in the top-bottom direction.

The display device 1 more preferably satisfies at least one of the following Formula (A4-1-1) to Formula (A4-4-1) as well as the following Formula (A5-1). This configuration more effectively enables the display device 1 to operate in the narrow viewing angle mode asymmetric in the left-right direction or the top-bottom direction.

$$8°≤θ(φ1,P2)≤17°$$ Formula (A4-1-1)

$$68°≤θ(φ1,P2)≤77°$$ Formula (A4-2-1)

$$8°≤θ(φ2,P2)≤17°$$ Formula (A4-3-1)

$$68°≤θ(φ2,P2)≤77°$$ Formula (A4-4-1)

$$0°≤|φ1-φ2|≤3°$$ Formula (A5-1)

In the ECB mode liquid crystal panel containing liquid crystal molecules having a positive anisotropy of dielectric constant, there is a trade-off relationship between the light-shielding angle and the retardation Re of the liquid crystal layer at θ(φ1, P2) of 0° or 90°. Specifically, when the liquid crystal layer provides a Re of 800 nm, the light-shielding angle at the optimum voltage is about 45 degrees. Meanwhile, in order to achieve a light-shielding angle of about 30°, Re needs to be about 1600 nm, meaning that the birefringence Δn or the cell thickness d of the liquid crystal layer has to be increased. For example, Δn needs to be 0.12 and d needs to be 13 μm when the cell thickness d is to be increased, while Δn needs to be 0.22 and d needs to be 7 μm when the birefringence Δn is to be increased. Increasing the cell thickness d and increasing the birefringence Δn, however, both raise issues of productivity and reliability. Specifically, increasing the cell thickness d involves issues of in-plane unevenness and yield (property stability) due to the increased thickness. Increasing the birefringence Δn leads to unstable operation at low temperature although it can achieve a high Δn when a tolane-based liquid crystal material is used. In contrast, the first viewing angle-controlling liquid crystal panel 11A of the present embodiment eliminates the need for increasing the cell thickness d or birefringence Δn, and thus can achieve a sufficiently small light-shielding angle in the narrow viewing angle mode without a decline in productivity or reliability while preventing or reducing unstable operation at low temperature.

JP 2008-203565 A mentions only the case of including the viewing angle-controlling liquid crystal panel and the display-providing liquid crystal panel, wherein the viewing angle-controlling liquid crystal panel is in the ECB mode (homogeneous alignment state) in which the director of the liquid crystal molecules and the transmission axis of each of the polarizing plates between which the display-providing liquid crystal panel is sandwiched form an angle of 0° (parallel). In this case, the light-shielding angle cannot be made sufficiently small. In contrast, the first viewing angle-controlling liquid crystal panel 11A of the present embodiment can achieve a sufficiently small light-shielding angle in the narrow viewing angle mode.

The liquid crystal display device disclosed in U.S. Ser. No. 11/002,998 B2 includes the HAN mode viewing angle-controlling liquid crystal panel, the display-providing liquid crystal panel, and the two layers of backlight units for the public mode and the privacy mode. This display device is a dual-cell liquid crystal display device switchable between the narrow viewing angle mode and the wide viewing angle mode, wherein the narrow viewing angle mode is achieved by shifting the viewing angle-controlling liquid crystal panel to the off state, the backlight unit for the privacy mode to the on state, and the backlight unit for the public mode to the off state, while the wide viewing angle mode is achieved by shifting the viewing angle-controlling liquid crystal panel to the on state, the backlight unit for the public mode to the on state, and the backlight unit for the privacy mode to the off state. In the liquid crystal display device disclosed in U.S. Ser. No. 11/002,998 B2, achieving a small light-shielding angle requires an increase in retardation (Re=Δn×d) provided by the liquid crystal layer, which is however difficult to achieve at the same time as the mass productivity. In contrast, the first viewing angle-controlling liquid crystal panel 11A of the present embodiment can achieve a sufficiently small light-shielding angle in the narrow viewing angle mode while preventing or reducing a decline in mass productivity.

The liquid crystal display device disclosed in Hsinchu et al. is a dual-cell liquid crystal display device including a VA mode viewing angle-controlling liquid crystal panel, a display-providing liquid crystal panel, and a louver film, wherein the viewing angle-controlling liquid crystal panel includes an ITO grid electrode only on its substrate on one side. The liquid crystal display device disclosed in Hsinchu et al. achieves the public mode by utilizing a transverse electric field to modulate the refractive index distribution in the liquid crystal cell and thereby diffusing the backlight illumination through the louver film during voltage application to the grid electrode. The liquid crystal display device achieves the privacy mode by allowing the backlight illumination to travel as is toward the display-providing liquid crystal panel without being diffused during no voltage application. In this manner, in the method of Hsinchu et al., the light-shielding angle in the privacy mode depends on the louver film. This causes a failure in achieving a sufficiently wide viewing angle in the public mode in the case of using a louver film having a small light-shielding angle. In contrast, the first viewing angle-controlling liquid crystal panel 11A of the present embodiment can achieve a sufficiently wide viewing angle in the public mode and a sufficiently small light-shielding angle in the privacy mode.

Preferably, the first liquid crystal layer 130 with voltage applied provides a retardation Re of not less than 600 nm and not more than 1000 nm. This configuration can reliably achieve a sufficient light-shielding ability and sufficient production stability. The retardation Re provided by the first liquid crystal layer 130 is expressed as the product of the birefringence (Δn) of the first liquid crystal molecules 131 and the thickness (d) of the first liquid crystal layer 130.

Embodiment 3

The features unique to the present embodiment are mainly described here, and description of the matters already described in Embodiment 1 and Embodiment 2 is omitted. The present embodiment is substantially the same as Embodiment 1, except for the director of the second liquid crystal molecules with no voltage applied to the second liquid crystal layer.

Preferably, the display device 1 includes the second polarizing plate 10P2 with the second absorption axis 10P2A between the first viewing angle-controlling liquid crystal panel 11A and the liquid crystal display panel 20, wherein the display device 1 satisfies at least one of the following Formula (B4-1) to Formula (B4-4) as well as the following Formula (B5):

$$5° \leq \theta(\varphi 3, P2) \leq 20°$$ Formula (B4-1)

$$65° \leq \theta(\varphi 3, P2) \leq 80°$$ Formula (B4-2)

$$5° \leq \theta(\varphi 4, P2) \leq 20°$$ Formula (B4-3)

$$65° \leq \theta(\varphi 4, P2) \leq 80°$$ Formula (B4-4)

$$0° \leq |\varphi 3 - \varphi 4| < 5°$$ Formula (B5)

wherein $\varphi 4$ represents the azimuthal angle of the director 3312A of the second liquid crystal molecules 3312 near the fourth substrate 350 with no voltage applied to the second liquid crystal layer 330, $\theta(\varphi 3, P2)$ represents the angle formed by the director 3311A of the second liquid crystal molecules 3311 near the third substrate 310 and the second absorption axis 10P2A in a plan view, and $\theta(\varphi 4, P2)$ represents the angle formed by the director 3312A of the second liquid crystal molecules 3312 near the fourth substrate 350 and the second absorption axis 10P2A in a plan view. This configuration enables the display device 1 to operate in the narrow viewing angle mode asymmetric in the left-right direction or the top-bottom direction. For example, the light-shielding angle can be further reduced on either the positive polar angle side or the negative polar angle side.

For example, the present embodiment can achieve an even narrower viewing angle using the viewing angle-controlling liquid crystal panel operated in the narrow viewing angle mode symmetric in the left-right direction in combination with the viewing angle-controlling liquid crystal panel operated in the narrow viewing angle mode asymmetric in the top-bottom direction.

The display device 1 preferably satisfies at least one of the following Formula (B4-1-1) to Formula (B4-4-1) as well as the following Formula (B5-1). This configuration more effectively enables the display device 1 to operate in the narrow viewing angle mode asymmetric in the left-right direction or the top-bottom direction.

$$8° \leq \theta(\varphi 3, P2) \leq 17°$$ Formula (B4-1-1)

$$68° \leq \theta(\varphi 3, P2) \leq 77°$$ Formula (B4-2-1)

$$8° \leq \theta(\varphi 4, P2) \leq 17°$$ Formula (B4-3-1)

$$68° \leq \theta(\varphi 4, P2) \leq 77°$$ Formula (B4-4-1)

$$0° \leq |\varphi 3 - \varphi 4| \leq 3°$$ Formula (B5-1)

The birefringence $\Delta n$ of the second liquid crystal molecules 331 may be not lower than 0.08 and not higher than 0.24. For a high degree of reliability (high voltage holding ratio, wide operation temperature range), the birefringence $\Delta n$ is preferably not lower than 0.08 and not higher than 0.16.

The thickness (cell thickness) d of the second liquid crystal layer 330 is preferably not smaller than 3 μm and not greater than 10 μm. This configuration can increase the response speed of the second liquid crystal molecules 331. Also, the thickness of the second viewing angle-controlling liquid crystal panel 11B can be further reduced. In terms of reduction of thickness, the thickness d of the second liquid crystal layer 330 is more preferably not smaller than 3 μm and not greater than 5 μm. In terms of the yield, the thickness d of the second liquid crystal layer 330 is more preferably not smaller than 5 μm and not greater than 10 μm. The second liquid crystal layer 330 having a thickness d of not smaller than 5 μm can cause the display unevenness due to contamination with a foreign material to be less noticeable, thus increasing the yield.

Preferably, the second liquid crystal layer 330 with voltage applied provides a retardation Re of not less than 600 nm and not more than 1000 nm. This configuration can reliably achieve a sufficient light-shielding ability and sufficient production stability. The retardation Re provided by the second liquid crystal layer 330 is expressed as the product of the birefringence ($\Delta n$) of the second liquid crystal molecules 331 and the thickness (d) of the second liquid crystal layer 330.

Embodiment 4

The features unique to the present embodiment are mainly described here, and description of the matters already described in Embodiment 1 to Embodiment 3 is omitted. The present embodiment is substantially the same as Embodiment 1, except for the director of the first liquid crystal molecules with no voltage applied to the first liquid crystal layer.

Preferably, the display device 1 includes the second polarizing plate 10P2 with the second absorption axis 10P2A between the first viewing angle-controlling liquid crystal panel 11A and the liquid crystal display panel 20, wherein the display device 1 satisfies at least one of the following Formula (A6-1) to Formula (A6-4) as well as the following Formula (A7):

$$5° \leq \theta(\varphi 1, P2) \leq 20°$$ Formula (A6-1)

$$65° \leq \theta(\varphi 1, P2) \leq 80°$$ Formula (A6-2)

$$5° \leq \theta(\varphi 2, P2) \leq 20°$$ Formula (A6-3)

$$65° \leq \theta(\varphi 2, P2) \leq 80°$$ Formula (A6-4)

$$5 \leq |\varphi 1 - \varphi 2| \leq 20°$$ Formula (A7)

wherein $\varphi 2$ represents the azimuthal angle of the director 1312A of the first liquid crystal molecules 1312 near the second substrate 150 with no voltage applied to the first liquid crystal layer 130, $\theta(\varphi 1, P2)$ represents the angle formed by the director 1311A of the first liquid crystal molecules 1311 near the first substrate 110 and the second absorption axis 10P2A in a plan view, and $\theta(\varphi 2, P2)$ represents the angle formed by the director 1312A of the first liquid crystal molecules 1312 near the second substrate 150 and the second absorption axis 10P2A in a plan view. This configuration enables the display device 1 to operate in the narrow viewing angle mode asymmetric in the left-right direction or the top-bottom direction. For example, the light-shielding angle can be further reduced on either the positive polar angle side or the negative polar angle side. In addition, a color shift in a front view can be reduced.

For example, the present embodiment can achieve an even narrower viewing angle using the viewing angle-controlling liquid crystal panel operated in the narrow viewing angle mode symmetric in the left-right direction in combination with the viewing angle-controlling liquid crystal panel operated in the narrow viewing angle mode asymmetric in the top-bottom direction.

Satisfying at least one of Formula (A6-1) to Formula (A6-4), the display device 1 can operate in the narrow viewing angle mode asymmetric in the left-right direction or the top-bottom direction. For example, the light-shielding angle can be further reduced on either the positive polar angle side or the negative polar angle side. When the display device 1 satisfies any one of Formula (A6-1) to Formula (A6-4), the first viewing angle-controlling liquid crystal panel 11A (preferably in the electrically controlled birefringence (ECB) mode) introduces a retardation of $\lambda/2$ [nm] at a desired light-shielding angle (polar angle direction). This means that the display device 1 can achieve the same light-shielding effect when it satisfies any one of Formula (A6-1) to Formula (A6-4). Also, satisfying Formula (A7), the display device 1 can reduce a color shift in a front view. The relationship between φ1 and φ2 may be either φ1>φ2 or φ1<φ2. In either case, the same effect can be achieved.

The display device 1 more preferably satisfies the following Formula (A7-1). This configuration can more effectively reduce a color shift in a front view.

$$5°\leq|\varphi1-\varphi2|\leq15° \quad \text{Formula (A7-1)}$$

The display device 1 more preferably satisfies at least one of the following Formula (A6-1-1) to Formula (A6-4-1) as well as the following Formula (A7-1). This configuration more effectively enables the display device 1 to operate in the narrow viewing angle mode asymmetric in the left-right direction or the top-bottom direction. In addition, the configuration can more effectively reduce a color shift in a front view.

$$8°\leq\theta(\varphi1,P2)\leq17° \quad \text{Formula (A6-1-1)}$$

$$68°\leq\theta(\varphi1,P2)\leq77° \quad \text{Formula (A6-2-1)}$$

$$8°\leq\theta(\varphi2,P2)\leq17° \quad \text{Formula (A6-3-1)}$$

$$68°\leq\theta(\varphi2,P2)\leq77° \quad \text{Formula (A6-4-1)}$$

$$5\leq|\varphi1-\varphi2|\leq15° \quad \text{Formula (A7-1)}$$

The twist alignment of the first liquid crystal molecules 131 can be achieved by, for example, adding a chiral agent to the liquid crystal material. The chiral agent is not limited and can be a conventionally known one. Examples of the chiral agent include S-811 (available from Merck KGaA). Achievement of a twist alignment with a small twist, such as a twist of 5° to 10°, without display defects such as disclination not necessarily requires addition of a chiral agent to the liquid crystal material.

Preferably, the first liquid crystal layer 130 with no voltage applied provides a retardation Re of not less than 700 nm and not more than 1200 nm. This configuration can reliably achieve a sufficient light-shielding ability and sufficient production stability during voltage application while exhibiting bright and wide viewing angle characteristics during no voltage application.

Embodiment 5

The features unique to the present embodiment are mainly described here, and description of the matters already described in Embodiment 1 to Embodiment 4 is omitted. The present embodiment is substantially the same as Embodiment 1, except for the director of the second liquid crystal molecules with no voltage applied to the second liquid crystal layer.

Preferably, the display device 1 includes the second polarizing plate 10P2 with the second absorption axis 10P2A between the first viewing angle-controlling liquid crystal panel 11A and the liquid crystal display panel 20, wherein the display device 1 satisfies at least one of the following Formula (B6-1) to Formula (B6-4) as well as the following Formula (B7):

$$5°\leq\theta(\varphi3,P2)\leq20° \quad \text{Formula (B6-1)}$$

$$65°\leq\theta(\varphi3,P2)\leq80° \quad \text{Formula (B6-2)}$$

$$5°\leq\theta(\varphi4,P2)\leq20° \quad \text{Formula (B6-3)}$$

$$65°\leq\theta(\varphi4,P2)\leq80° \quad \text{Formula (B6-4)}$$

$$5°\leq|\varphi3-\varphi4|\leq20° \quad \text{Formula (B7)}$$

wherein φ4 represents the azimuthal angle of the director 3312A of the second liquid crystal molecules 3312 near the fourth substrate 350 with no voltage applied to the second liquid crystal layer 330, θ(φ3, P2) represents the angle formed by the director 3311A of the second liquid crystal molecules 3311 near the third substrate 310 and the second absorption axis 10P2A in a plan view, and θ(φ4, P2) represents the angle formed by the director 3312A of the second liquid crystal molecules 3312 near the fourth substrate 350 and the second absorption axis 10P2A in a plan view. This configuration enables the display device 1 to operate in the narrow viewing angle mode asymmetric in the left-right direction or the top-bottom direction. For example, the light-shielding angle can be further reduced on either the positive polar angle side or the negative polar angle side. In addition, a color shift in a front view can be reduced.

For example, the present embodiment can achieve an even narrower viewing angle using the viewing angle-controlling liquid crystal panel operated in the narrow viewing angle mode symmetric in the left-right direction in combination with the viewing angle-controlling liquid crystal panel operated in the narrow viewing angle mode asymmetric in the top-bottom direction.

Satisfying at least one of Formula (B6-1) to Formula (B6-4), the display device 1 can operate in the narrow viewing angle mode asymmetric in the left-right direction or the top-bottom direction. For example, the light-shielding angle can be further reduced on either the positive polar angle side or the negative polar angle side. When the display device 1 satisfies any one of Formula (B6-1) to Formula (B6-4), the second viewing angle-controlling liquid crystal panel 11B (preferably in the electrically controlled birefringence (ECB) mode) introduces a retardation of $\lambda/2$ [nm] at a desired light-shielding angle (polar angle direction). This means that the display device 1 can achieve the same light-shielding effect when it satisfies any one of Formula (B6-1) to Formula (B6-4). Also, satisfying Formula (B7), the display device 1 can reduce a color shift in a front view. The relationship between φ3 and φ4 may be either φ3>φ4 or φ3<φ4. In either case, the same effect can be achieved.

The display device 1 more preferably satisfies the following Formula (B7-1). This configuration can more effectively reduce a color shift in a front view.

$$5°\leq|\varphi3-\varphi4|\leq15° \quad \text{Formula (B7-1)}$$

The display device 1 preferably satisfies at least one of the following Formula (B6-1-1) to Formula (B6-4-1) as well as the following Formula (B7-1). This configuration more effectively enables the display device 1 to operate in the narrow viewing angle mode asymmetric in the left-right direction or the top-bottom direction. In addition, the configuration can more effectively reduce a color shift in a front view.

$$8°≤θ(φ3,P2)≤17°$$ Formula (B6-1-1)

$$68°≤θ(φ3,P2)≤77°$$ Formula (B6-2-1)

$$8°≤θ(φ4,P2)≤17°$$ Formula (B6-3-1)

$$68°≤θ(φ4,P2)≤77°$$ Formula (B6-4-1)

$$5°≤|φ3-φ4|≤15°$$ Formula (B7-1)

The twist alignment of the second liquid crystal molecules 331 can be achieved by, for example, adding a chiral agent to the liquid crystal material. The chiral agent is not limited and can be a conventionally known one. Examples of the chiral agent include S-811 (available from Merck KGaA). Achievement of a twist alignment with a small twist, such as a twist of 5° to 10°, without display defects such as disclination not necessarily requires addition of a chiral agent to the liquid crystal material.

Preferably, the second liquid crystal layer 330 with no voltage applied provides a retardation Re of not less than 700 nm and not more than 1200 nm. This configuration can reliably achieve a sufficient light-shielding ability and sufficient production stability during voltage application while exhibiting bright and wide viewing angle characteristics during no voltage application.

Modified Example 1 of Embodiment 1 to Embodiment 5

Figure 5:
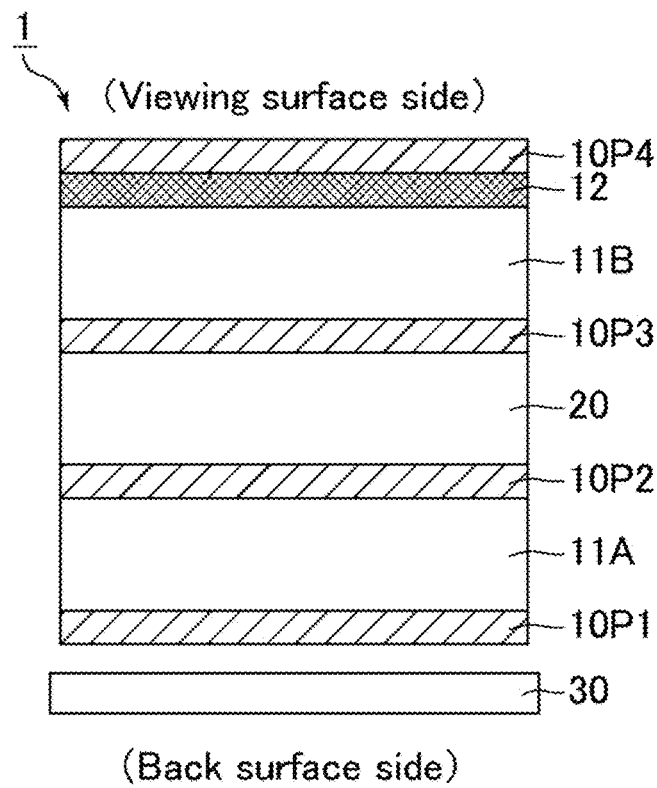
FIG. 5 is a schematic perspective view of a viewing angle-controlling liquid crystal panel of Modified Example 1 of Embodiment 1 to Embodiment 5.

FIG. 5 is a schematic perspective view of a viewing angle-controlling liquid crystal panel of Modified Example 1 of Embodiment 1 to Embodiment 5. As shown in FIG. 5, preferably, the display device 1 further includes a negative C plate 12 providing a retardation Rth in the thickness direction of not less than 500 nm. This configuration can achieve an even smaller light-shielding angle in the narrow viewing angle mode. The negative C plate 12 may be a single-layered plate or a laminate of a plurality of layers. Configurations except for those described in the present modified example are the same as those in Embodiment 1 to Embodiment 5. For the convenience of description, components having the same functions in FIG. 5 and the drawings for Embodiment 1 to Embodiment 5 are provided with the same reference sign so as to avoid repetition of description.

The retardation Rth in the thickness direction provided by the negative C plate 12 is more preferably not less than 550 nm. The upper limit of the retardation Rth in the thickness direction provided by the negative C plate 12 is not limited and may be, for example, not more than 1000 nm. The negative C plate 12 may introduce an in-plane phase difference of several nanometers for manufacturing reasons. Thus, the in-plane phase difference of the negative C plate 12 is, for example, not less than 0 nm and not more than 5 nm.

Examples of the negative C plate 12 include stretched cycloolefin polymer films.

The negative C plate 12 is preferably placed on the viewing surface side of the second viewing angle-controlling liquid crystal panel 11B, more preferably between the second viewing angle-controlling liquid crystal panel 11B and the fourth polarizing plate 10P4. This configuration enables effective reduction of the light-shielding angle in the narrow viewing angle mode.

Modified Example 2 of Embodiment 1 to Embodiment 5

The first viewing angle-controlling liquid crystal panel 11A and the second viewing angle-controlling liquid crystal panel 11B of any of Embodiment 1 to Embodiment 5 each are passive liquid crystal panel which is passively driven. The first viewing angle-controlling liquid crystal panel 11A and the second viewing angle-controlling liquid crystal panel 11B are not limited thereto. At least one of the first viewing angle-controlling liquid crystal panel 11A or the second viewing angle-controlling liquid crystal panel 11B may be, for example, an active matrix liquid crystal panel which is driven by an active matrix driving method. This configuration enables switching between the public mode and the privacy mode partially, not entirely, on the screen. Configurations except for those described in the present modified example are the same as those in Embodiment 1 to Embodiment 5. For the convenience of description, components having the same functions as in the drawings for Embodiment 1 to Embodiment 5 are commonly provided with the same reference sign so as to avoid repetition of description.

When the first viewing angle-controlling liquid crystal panel 11A is an active matrix liquid crystal panel which is driven by an active matrix driving method, the first substrate 110 of the first viewing angle-controlling liquid crystal panel 11A includes, as in a typical active matrix liquid crystal panel, gate lines and source lines arranged perpendicularly to each other and forming a grid pattern, and thin film transistors (TFTs) as switching elements at or near the respective intersections. Regions surrounded by the gate lines and the source lines define pixels, and each pixel includes as the first electrode 112 a pixel electrode connected to a corresponding TFT.

The second substrate 150 facing the first substrate 110 includes as the second electrode 152 a common electrode that is a solid electrode covering the entire screen.

The gate lines are conductive lines connected to the gate electrodes of the respective TFTs (typically, the bus lines connected to the gate electrodes). Scanning signals (signals that control the on and off states of the TFTs) are supplied to the connected gate electrodes of the TFTs. The source lines are conductive lines connected to the source electrodes of the respective TFTs (typically, bus lines connected to the source electrodes). Data signals (e.g., video signals) are supplied to the connected TFTs. Typically, either the gate lines or the source lines are in the form of lines vertically crossing an array region with the TFTs arranged in a matrix pattern while the others are in the form of lines horizontally crossing the array region.

The gate lines, the source lines, and the conductive lines and electrodes of the TFTs can be formed by forming a single- or multi-layered film of a metal such as copper, titanium, aluminum, molybdenum, or tungsten, or an alloy of any of these metals by a method such as sputtering, followed by patterning of the film by a method such as photolithography. Various conductive lines and electrodes to be formed in the same layer are produced from the same material for a higher efficiency of production.

The first viewing angle-controlling liquid crystal panel 11A may be driven by any method such as a typical active matrix driving method. In other words, the TFTs in the respective pixels are switched on or off (turned on or off) via a gate driver. The switching is followed by application of voltage to the switched-on pixel via the source driver so as to store electric charge in the storage capacitor in the pixel via the drain bus of the corresponding TFT. The storage capacitor maintains the pixel turned on.

Similarly, when the second viewing angle-controlling liquid crystal panel 11B is an active matrix liquid crystal panel which is driven by an active matrix driving method, the third substrate 310 of the second viewing angle-controlling liquid crystal panel 11B includes, as in a typical active matrix liquid crystal panel, gate lines and source lines arranged perpendicularly to each other and forming a grid pattern, and TFTs as switching elements at or near the respective intersections. Regions surrounded by the gate lines and the source lines define pixels, and each pixel includes as the third electrode 312 a pixel electrode connected to a corresponding TFT.

The fourth substrate 350 facing the third substrate 310 includes as the fourth electrode 352 a common electrode that is a solid electrode covering the entire screen.

The method of driving the second viewing angle-controlling liquid crystal panel 11B is the same as the method of driving the first viewing angle-controlling liquid crystal panel 11A.

Modified Example 3 of Embodiment 1 to Embodiment 5

Embodiment 1 to Embodiment 5 adopt the liquid crystal display panel 20 as the display panel. The display panel is not limited and may be any light-emitting panel such as an organic electroluminescent (EL) display panel, an inorganic EL display panel, a microLED display panel, or a quantum dot light emitting diode (QLED) display panel. The QLED display panel may be, for example, a liquid crystal-type one adopting blue LEDs as the backlight light sources and wavelength conversion by quantum dots (conversion from blue light to green light and conversion from blue light to red light, with the blue light transmitted as is to provide a blue color), so that the panel can reproduce a wider variety of colors and achieve lower power consumption than conventional liquid crystal panels.

The second polarizing plate 10P2 may be an absorptive polarizing plate. Yet, for example, a reflective polarizing plate (having a structure of linearly polarizing plate/reflective polarizing plate) may also be used to increase the light recycling efficiency and thus the luminance as well, since the light from organic light emitting diodes (OLEDs) used in an organic EL display panel is unpolarized.

EXAMPLES

Hereinafter, the effects of the present invention are described with reference to examples and comparative examples. The present invention is not limited to these examples.

Example 1

The LCD Master 2D was used to simulate the luminance viewing angles as well as the normalized transmittance versus polar angle in the left-right direction (H180°-0°) and the top-bottom direction (V270°-90°) in the display device 1 of Example 1 having the same configuration as in Embodiment 1. The first absorption axis 10P1A and the second absorption axis 10P2A were set in the 90°-270° azimuthal angle direction. The third absorption axis 10P3A and the fourth absorption axis 10P4A were set in the 0°-180° azimuthal angle direction. The first viewing angle-controlling liquid crystal panel 11A and the second viewing angle-controlling liquid crystal panel 11B were ECB mode liquid crystal panels. The liquid crystal display panel 20 was in the FFS mode. The axial azimuths and other conditions were set as shown in the following Table 1 and Table 2.

| | | | First viewing angle-controlling liquid crystal panel | | | | Second viewing |
|---|---|---|---|---|---|---|---|
| | Viewing angle control | Mode | First liquid crystal layer And [mm] | First liquid crystal layer/first alignment film interface Azimuthal angle φ1 [°] of director | First liquid crystal layer/second alignment film interface Azimuthal angle φ2 [°] of director | Twist \|φ1 − φ2\| [°] | angle-controlling liquid crystal panel Viewing angle control |
| Comparative Example 1 | Left-right | Symmetric ECB | 800 | 90 | 90 | 0 | — |
| Comparative Example 2 | | | — | | | 0 | Left-right |
| Comparative Example 3 | Left low polar angle | Asymmetric ECB | 800 | 75 | 75 | 0 | — |
| Comparative Example 4 | Bottom low polar angle | Asymmetric ECB | 800 | 15 | 15 | 0 | — |
| Example 1 | Top-bottom | Symmetric ECB | 800 | 0 | 0 | 0 | Left-right |
| Example 2 | Bottom low polar angle | Asymmetric ECB | 800 | 15 | 15 | 0 | Left-right |
| Example 3 | Top low polar angle | Asymmetric ECB | 800 | 195 | 195 | 0 | Left-right |
| Example 4 | Bottom low polar angle | Asymmetric ECB | 800 | 15 | 15 | 0 | Left-right |
| Example 5 | Top low polar angle | Asymmetric ECB | 1000 | 180 | 190 | 10 | Left-right |
| Comparative Example 5 | Left low polar angle | Asymmetric ECB | 800 | 75 | 75 | 0 | Left-right |

-continued

| | | Second crystal layer ΔnD [nm] | Second liquid crystal layer/third alignment film interface Azimuthal angle φ3 [°] of director | Second liquid crystal layer/fourth alignment film interface Azimuthal angle φ4 [°] of director | Twist \|φ3 − φ4\| [°] | Between second viewing angle-controlling liquid crystal panel and fourth polarizing plate Negative C plate |
|---|---|---|---|---|---|---|
| | Mode | | | | | |
| Comparative Example 1 | — | — | — | — | — | — |
| Comparative Example 2 | Symmetric ECB | 800 | 90 | 90 | 0 | — |
| Comparative Example 3 | — | — | — | — | — | — |
| Comparative Example 4 | — | — | — | — | — | — |
| Example 1 | Symmetric ECB | 800 | 90 | 90 | 0 | — |
| Example 2 | Symmetric ECB | 800 | 90 | 90 | 0 | — |
| Example 3 | Symmetric ECB | 800 | 90 | 90 | 0 | — |
| Example 4 | Symmetric ECB | 800 | 90 | 90 | 0 | Rth = 550 nm |
| Example 5 | Symmetric ECB | 800 | 90 | 90 | 0 | — |
| Comparative Example 5 | Symmetric ECB | 800 | 90 | 90 | 0 | — |

TABLE 2

| | \|φ3 − φ1\| [°] | θ (φ1, P2) [°] | θ (φ2, P2) [°] | θ (φ3, P2) [°] | θ (φ4, P2) [°] |
|---|---|---|---|---|---|
| Comparative Example 1 | — | 0 | 0 | — | — |
| Comparative Example 2 | — | — | — | 0 | 0 |
| Comparative Example 3 | — | 15 | 15 | — | — |
| Comparative Example 4 | — | 75 | 75 | — | — |
| Example 1 | 90 | 90 | 90 | 0 | 0 |
| Example 2 | 75 | 75 | 75 | 0 | 0 |
| Example 3 | 105 | 75 | 75 | 0 | 0 |
| Example 4 | 75 | 75 | 75 | 0 | 0 |
| Example 5 | 90 | 90 | 80 | 0 | 0 |
| Comparative Example 5 | 15 | 15 | 15 | 0 | 0 |

In the first viewing angle-controlling liquid crystal panel 11A, the retardation Re of the first liquid crystal layer 130 was 800 nm and both the azimuthal angle 41 and the azimuthal angle φ2 were 0°. In the second viewing angle-controlling liquid crystal panel 11B, the retardation Re of the second liquid crystal layer 330 was 800 nm and both the azimuthal angle φ3 and the azimuthal angle φ4 were 90°. The display device 1 of the present example showed a difference \|φ3−φ1\| of 90° (≥50°) and thus satisfied Formula (1). The display device 1 also satisfied Formula (A2-2), Formula (A2-4), Formula (A3), Formula (B2-1), Formula (B2-3), and Formula (B3). FIG. 6 to FIG. 11 and the following Table 3 show the simulation results.

Figure 6:
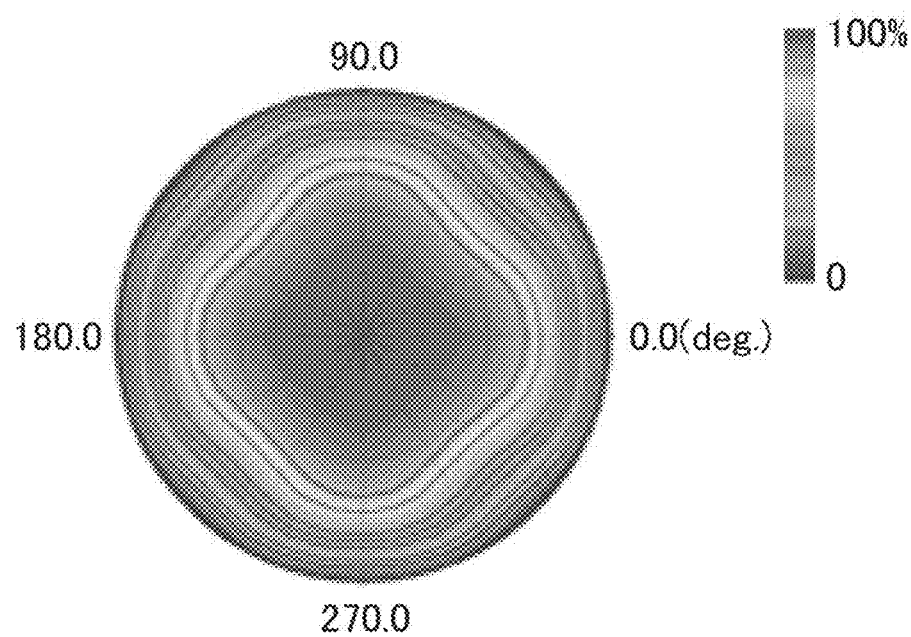
FIG. 6 shows the simulation results of luminance viewing angles of a display device of Example 1 in a wide viewing angle mode.
Figure 7:
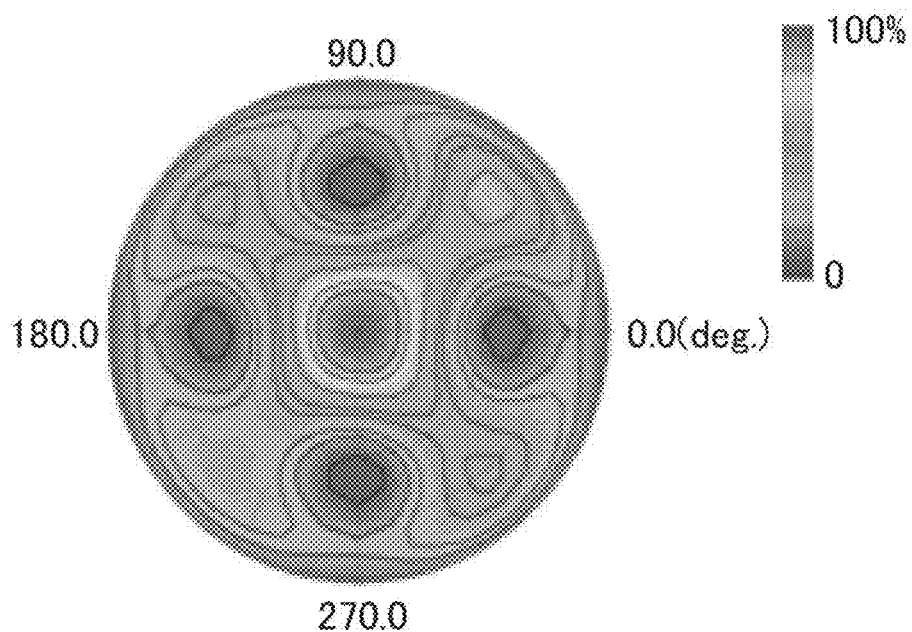
FIG. 7 shows the simulation results of luminance viewing angles of the display device of Example 1 in a narrow viewing angle mode.
Figure 8:
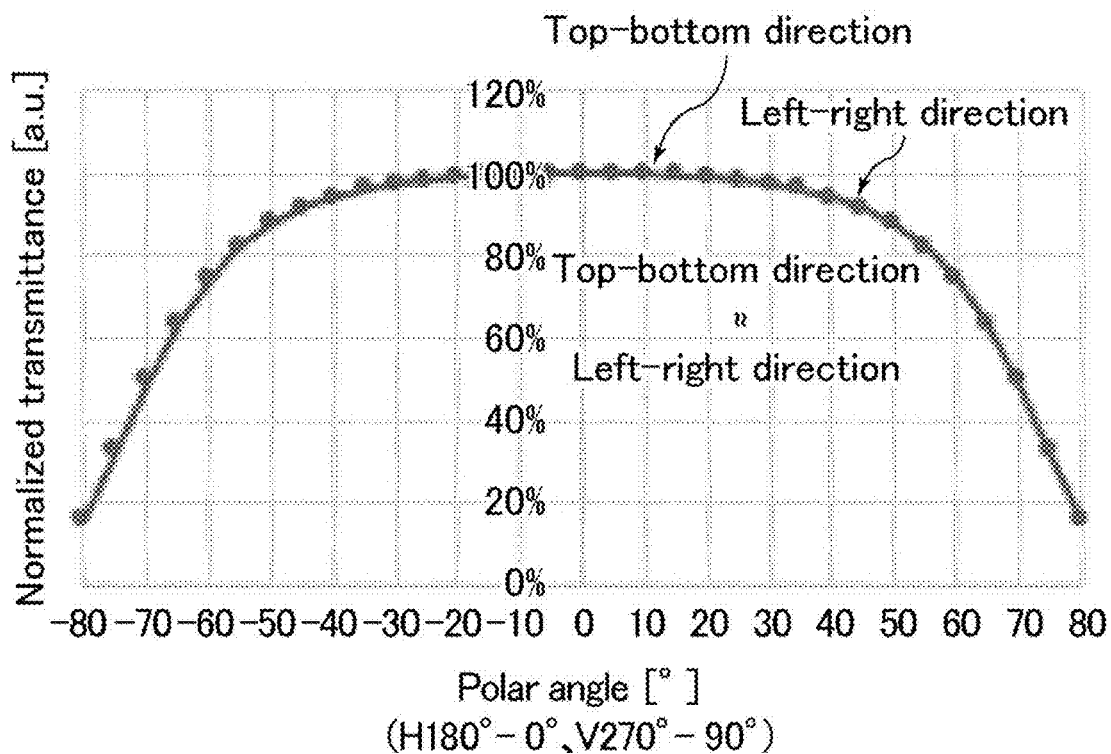
FIG. 8 shows the simulation results of normalized transmittance versus polar angle in the display device of Example 1 in the wide viewing angle mode.
Figure 9:
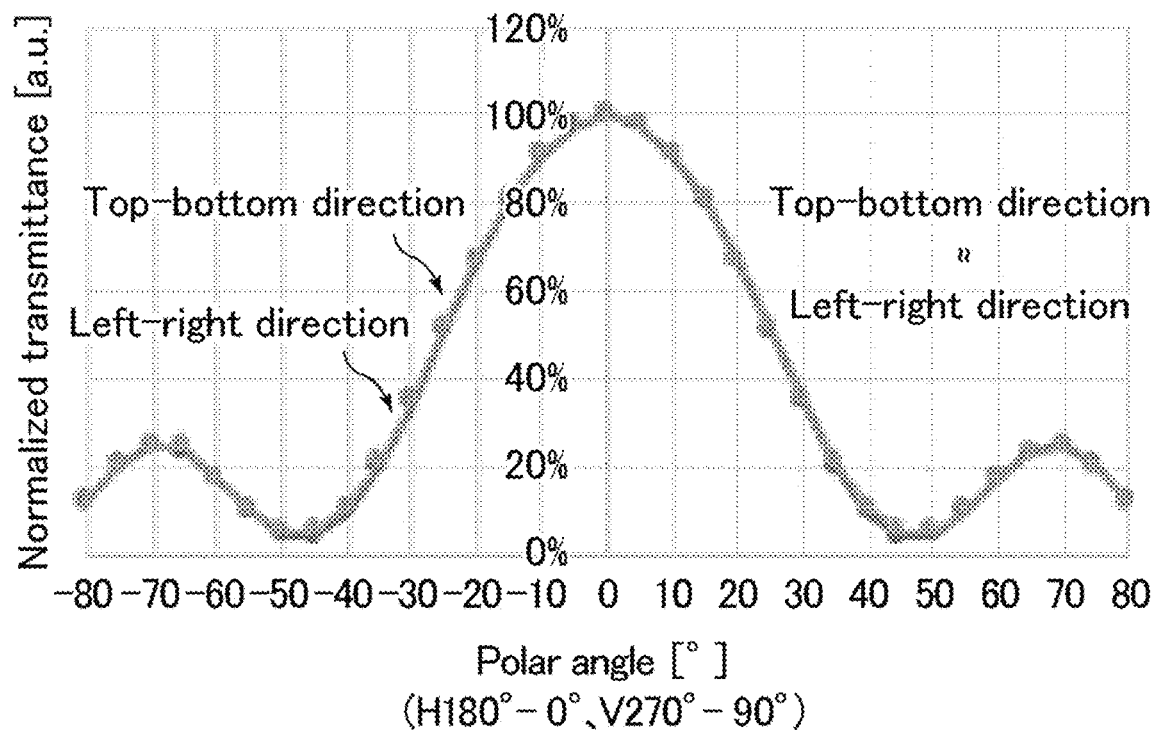
FIG. 9 shows the simulation results of normalized transmittance versus polar angle in the display device of Example 1 in the narrow viewing angle mode.
Figure 10:
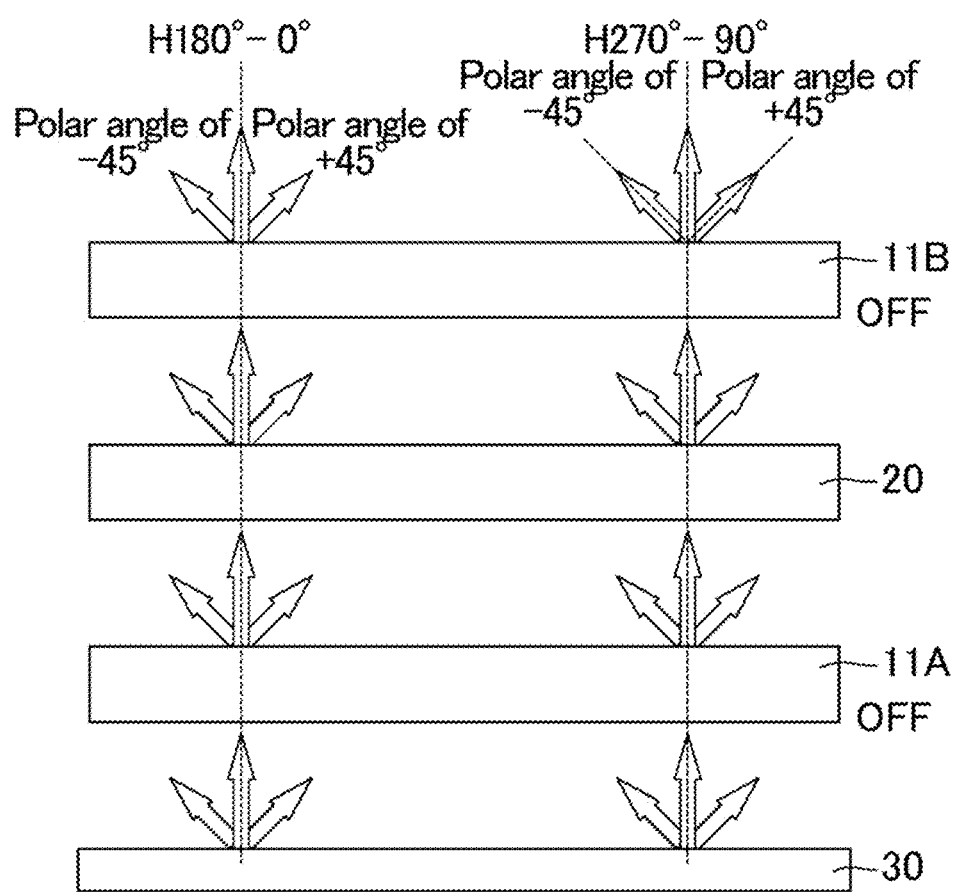
FIG. 10 is a schematic cross-sectional view showing the viewing angles in the display device of Example 1 in the wide viewing angle mode.
Figure 11:
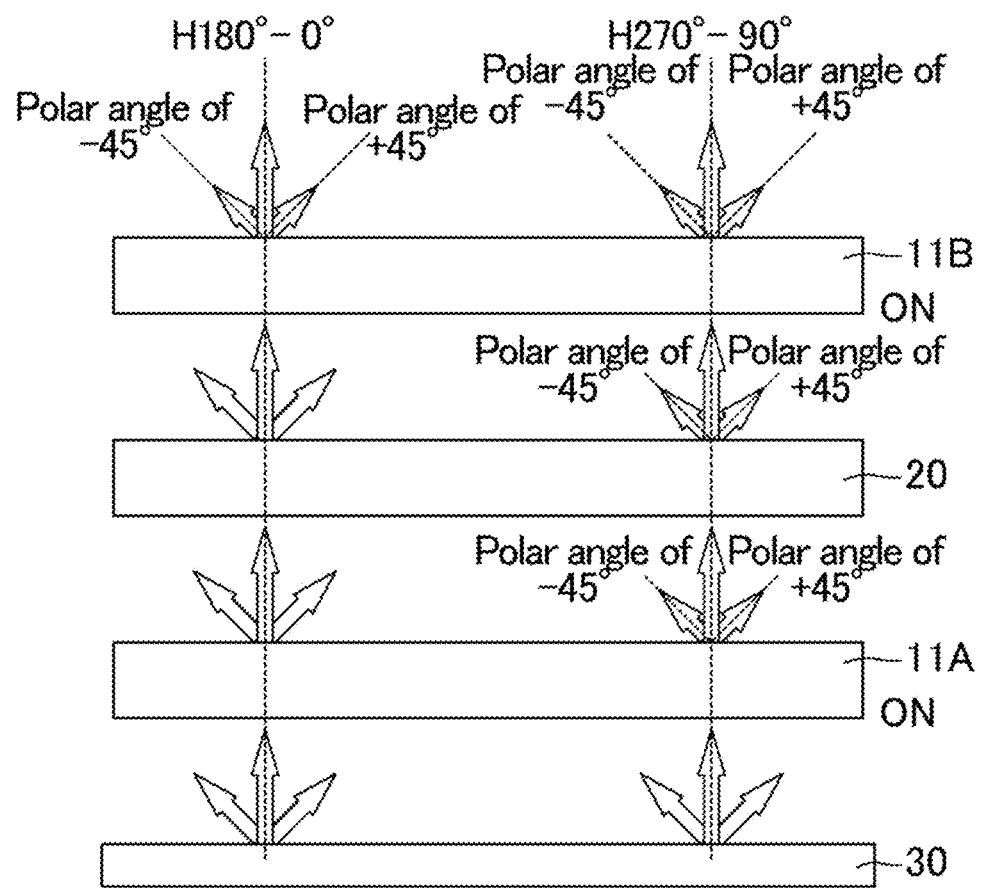
FIG. 11 is a schematic cross-sectional view showing the viewing angles in the display device of Example 1 in the narrow viewing angle mode.

FIG. 6 shows the simulation results of luminance viewing angles of a display device of Example 1 in a wide viewing angle mode. FIG. 7 shows the simulation results of luminance viewing angles of the display device of Example 1 in a narrow viewing angle mode. FIG. 8 shows the simulation results of normalized transmittance versus polar angle in the display device of Example 1 in the wide viewing angle mode. FIG. 9 shows the simulation results of normalized transmittance versus polar angle in the display device of Example 1 in the narrow viewing angle mode. The normalized transmittance represents the transmittance-polar angle dependency (polar angle dependency of transmittance) of the viewing angle-controlling liquid crystal panel, with the transmittance at a polar angle of 0° normalized to 100%. FIG. 10 is a schematic cross-sectional view showing the viewing angles in the display device of Example 1 in the wide viewing angle mode. FIG. 11 is a schematic cross-sectional view showing the viewing angles in the display device of Example 1 in the narrow viewing angle mode. In the present example, the wide viewing angle mode was achieved with no voltage applied to the first viewing angle-controlling liquid crystal panel 11A and the second viewing angle-controlling liquid crystal panel 11B (the first liquid crystal layer 130 and the second liquid crystal layer 330), and the narrow viewing angle mode was achieved with voltage applied to the first viewing angle-controlling liquid crystal panel 11A and the second viewing angle-controlling liquid crystal panel 11B (the first liquid crystal layer 130 and the second liquid crystal layer 330).

TABLE 3

| | Effect | | | |
|---|---|---|---|---|
| | Light-shielding angle [°] | | | |
| | H180°-0° | V270°-90° | Evaluation | Reason |
| Comparative Example 1 | −45°/+45° | — | Poor | Viewing angle control in left-right direction only |

TABLE 3-continued

| | Light-shielding angle [°] | | Effect | |
|---|---|---|---|---|
| | H180°-0° | V270°-90° | Evaluation | Reason |
| Comparative Example 2 | −45°/+45° | — | Poor | Viewing angle control in left-right direction only (higher light-shielding ability owing to top arrangement) |
| Comparative Example 3 | −30°/+70° | — | Fair | Viewing angle control in left-right direction only (left direction light-shielding angle is small polar angle) |
| Comparative Example 4 | — | −30°/+70° | Fair | Viewing angle control in left-right direction only (bottom direction light-shielding angle is small polar angle) |
| Example 1 | −45°/+45° | −45°/+45° | Good | Viewing angle control in top-bottom direction and left-right direction (left-right direction and top-bottom direction light-shielding angles are small polar angles) |
| Example 2 | −45°/+45° | −30°/+70° | Good | Viewing angle control in top-bottom direction and left-right direction (light-shielding angles especially at 3 azimuths (left-right direction and bottom direction) are small polar angles) |
| Example 3 | −45°/+45° | −70°/+30° | Good | Viewing angle control in top-bottom direction and left-right direction (light-shielding angles especially at 3 azimuths (left-right direction and top direction) are small polar angles) |
| Example 4 | −45°/+45° | −30°/+70° | Good | Viewing angle control in top-bottom direction and left-right direction (light-shielding angles especially at 3 azimuths (left-right direction and bottom direction) are small polar angles) Higher light-shielding ability at +45°/135° azimuths |
| Example 5 | −45°/+45° | −45°/+35 | Good | Viewing angle control in top-bottom direction and left-right direction (light-shielding angles especially at 3 azimuths (left-right direction and top direction) are small polar angles) Reduced front color shift |
| Comparative Example 5 | −45°/−35°/+45° | — | Poor | Viewing angle control in left-right direction only |

As shown in FIG. 6 to FIG. 11 and Table 3, with no voltage applied to the first viewing angle-controlling liquid crystal panel 11A and the second viewing angle-controlling liquid crystal panel 11B, the transmittance of light (polarized light) from the backlight 30 having passed through the first viewing angle-controlling liquid crystal panel 11A was high in both the front direction and an oblique direction (polar angle of 45°), which led to bright display in both the front direction and the oblique direction. Since the liquid crystal display panel 20 was driven in the transverse electric field mode, light having passed through the first viewing angle-controlling liquid crystal panel 11A passed through the liquid crystal display panel 20 not only in the front direction but also in the oblique direction. In addition, the transmittance of light having passed through the liquid crystal display panel 20 and then the second viewing angle-controlling liquid crystal panel 11B was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the first viewing angle-controlling liquid crystal panel 11A and the second viewing angle-controlling liquid crystal panel 11B, the transmittance (normalized transmittance) of emission light derived from light (polarized light) from the backlight 30 having passed through the first viewing angle-controlling liquid crystal panel 11A was maximum in the front (polar angle of 0°) in the top-bottom direction, while being minimum at polar angles of ±45° in the top-bottom direction. This emission light had similar angle profiles after passing through the liquid crystal display panel 20. In addition, the transmittance (normalized transmittance) of the emission light from the liquid crystal display panel 20 having passed through the second viewing angle-controlling liquid crystal panel 11B was maximum in the front (polar angle of 0°) in the left-right direction, while being minimum at polar angles of ±45° in the left-right direction. As described above, the first viewing angle-controlling liquid crystal panel 11A was an ECB-mode liquid crystal panel capable of operating in the symmetric narrow viewing angle mode with light-shielding angles of ±45° in the top-bottom direction, and the second viewing angle-controlling liquid crystal panel 11B was an ECB-mode liquid crystal panel capable of operating in the symmetric narrow viewing angle mode with light-shielding angles of ±45° in the left-right direction.

In the present example, the symmetric narrow viewing angle mode with light-shielding angles of ±45° in the top-bottom direction, and the symmetric narrow viewing angle mode with light-shielding angles of ±45° in the left-right direction were achieved. In other words, the viewing angle control was successful at four azimuths (left-right direction/top-bottom direction). This enables prevention of peeping into an ATM terminal from the left-right direction and the top-bottom direction.

Example 2

As in Example 1, the LCD Master 2D was used to simulate the luminance viewing angles as well as the normalized transmittance versus polar angle in the left-right direction (H180°-0°) and the top-bottom direction (V270°-90°) in the display device 1 of Example 2 having the same configuration as in Embodiment 2. The first absorption axis 10P1A and the second absorption axis 10P2A were set in the 90°-270° azimuthal angle direction. The third absorption axis 10P3A and the fourth absorption axis 10P4A were set in the 0°-180° azimuthal angle direction. The first viewing angle-controlling liquid crystal panel 11A and the second viewing angle-controlling liquid crystal panel 11B were ECB-mode liquid crystal panels. The liquid crystal display panel 20 was in the FFS mode. The axial azimuths and other conditions were set as shown in Table 1 and Table 2.

In the first viewing angle-controlling liquid crystal panel 11A, the retardation Re of the first liquid crystal layer 130 was 800 nm, and both the azimuthal angle φ1 and the azimuthal angle φ2 were 15°. In the second viewing angle-controlling liquid crystal panel 11B, the retardation Re of the second liquid crystal layer 330 was 800 nm, and both the azimuthal angle φ3 and the azimuthal angle φ4 were 90°. The display device 1 of the present example showed a difference |φ3−φ1| of 75° (≥50°) and thus satisfied Formula (1). The display device 1 also satisfies Formula (B2-1), Formula (B2-3), Formula (B3), Formula (A4-2), Formula (A4-4), and Formula (A5). FIG. 12 to FIG. 17 and Table 3 show the simulation results.

Figure 12:
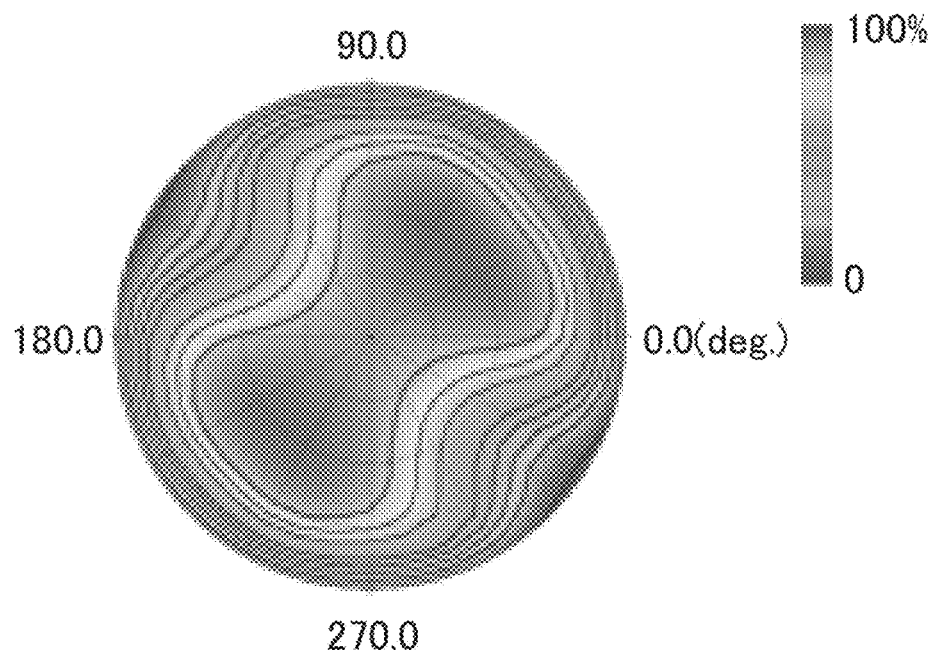
FIG. 12 shows the simulation results of luminance viewing angles of a display device of Example 2 in a wide viewing angle mode.
Figure 13:
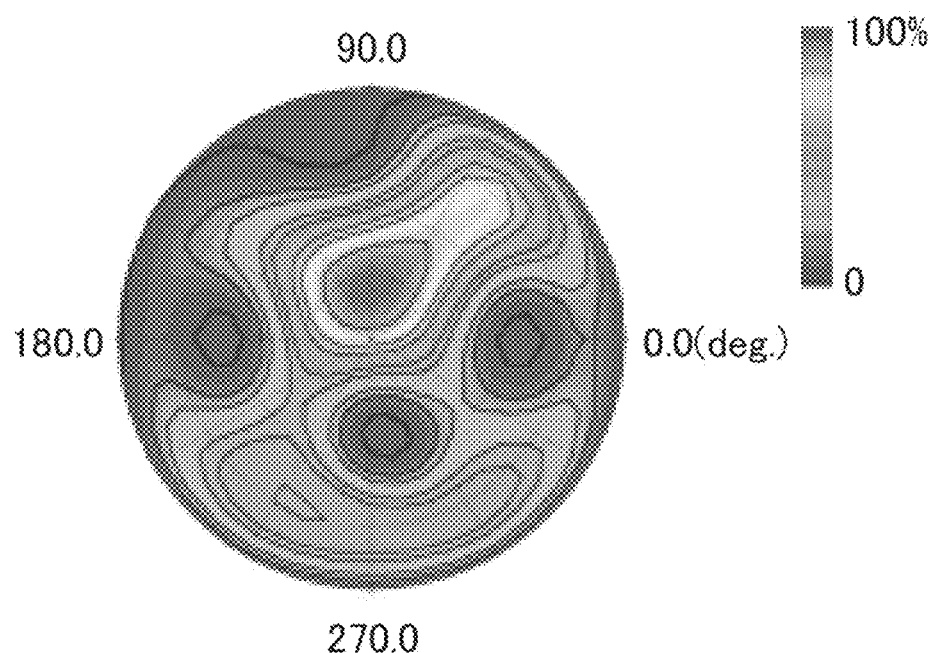
FIG. 13 shows the simulation results of luminance viewing angles of a display device of Example 2 in a narrow viewing angle mode.
Figure 14:
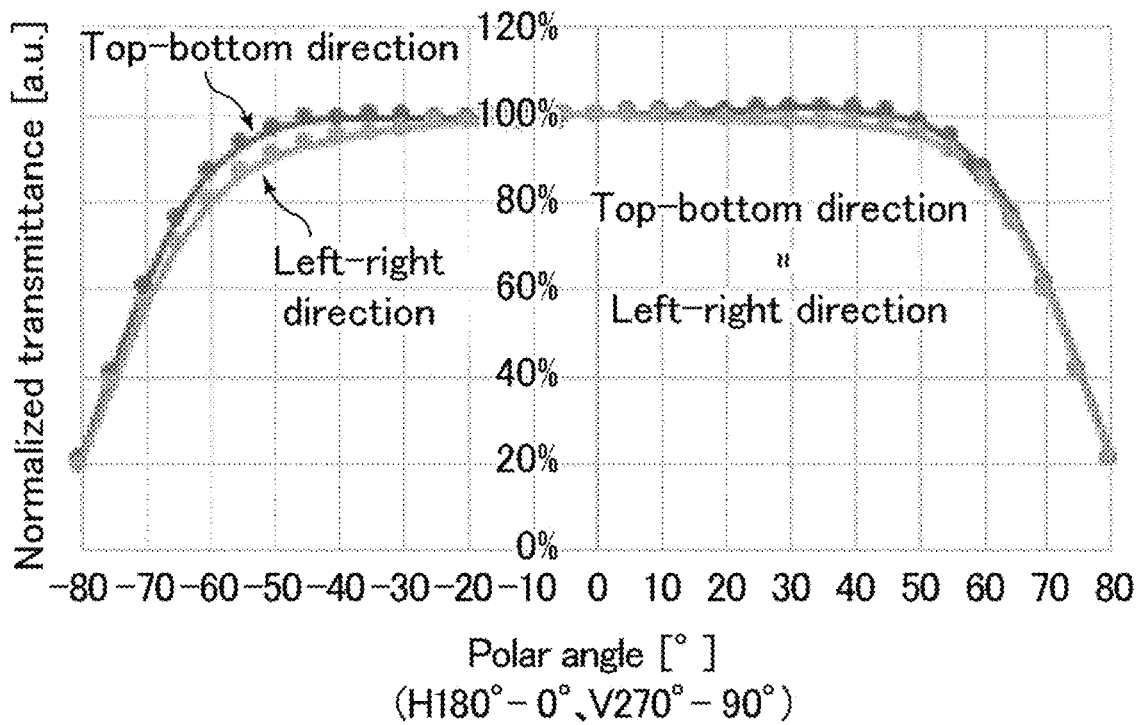
FIG. 14 shows the simulation results of normalized transmittance versus polar angle in the display device of Example 2 in the wide viewing angle mode.
Figure 15:
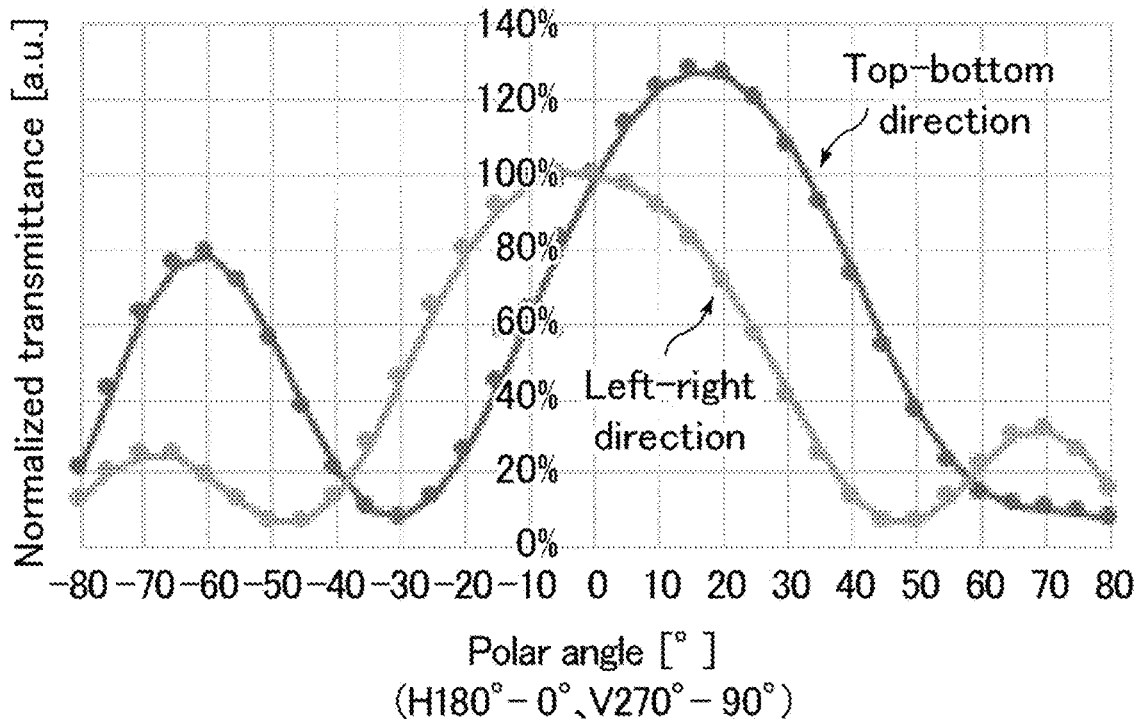
FIG. 15 shows the simulation results of normalized transmittance versus polar angle in the display device of Example 2 in the narrow viewing angle mode.
Figure 16:
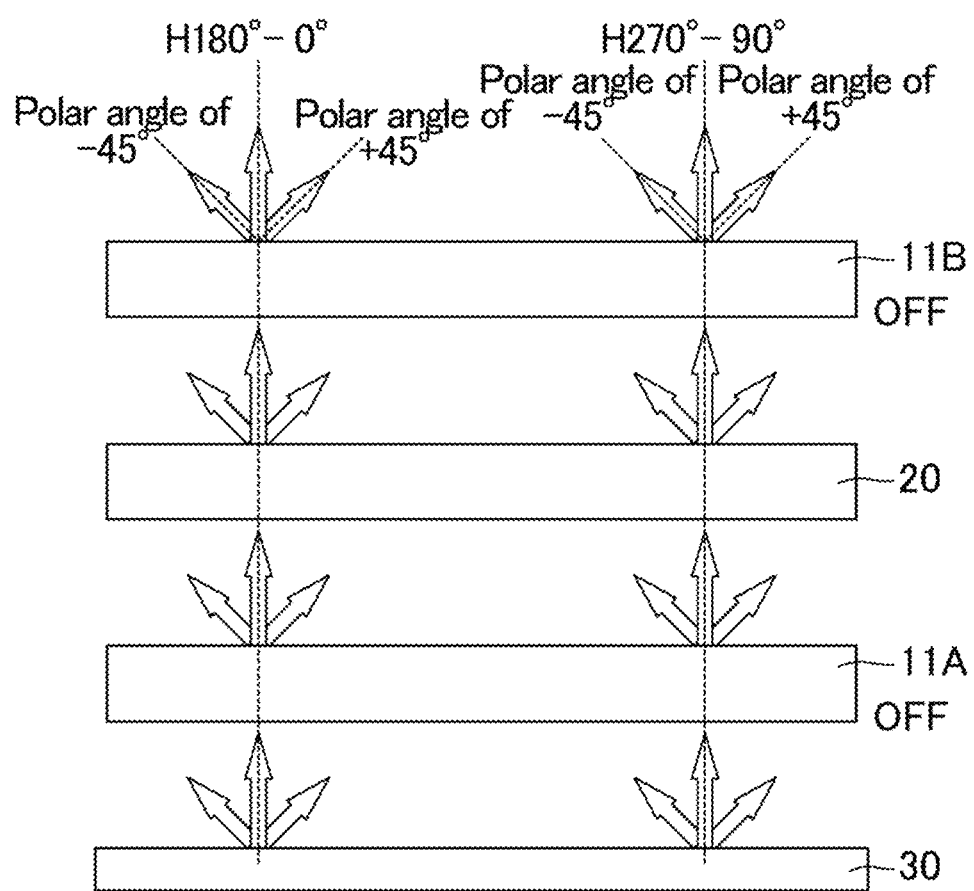
FIG. 16 is a schematic cross-sectional view showing the viewing angles of the display device of Example 2 in the wide viewing angle mode.
Figure 17:
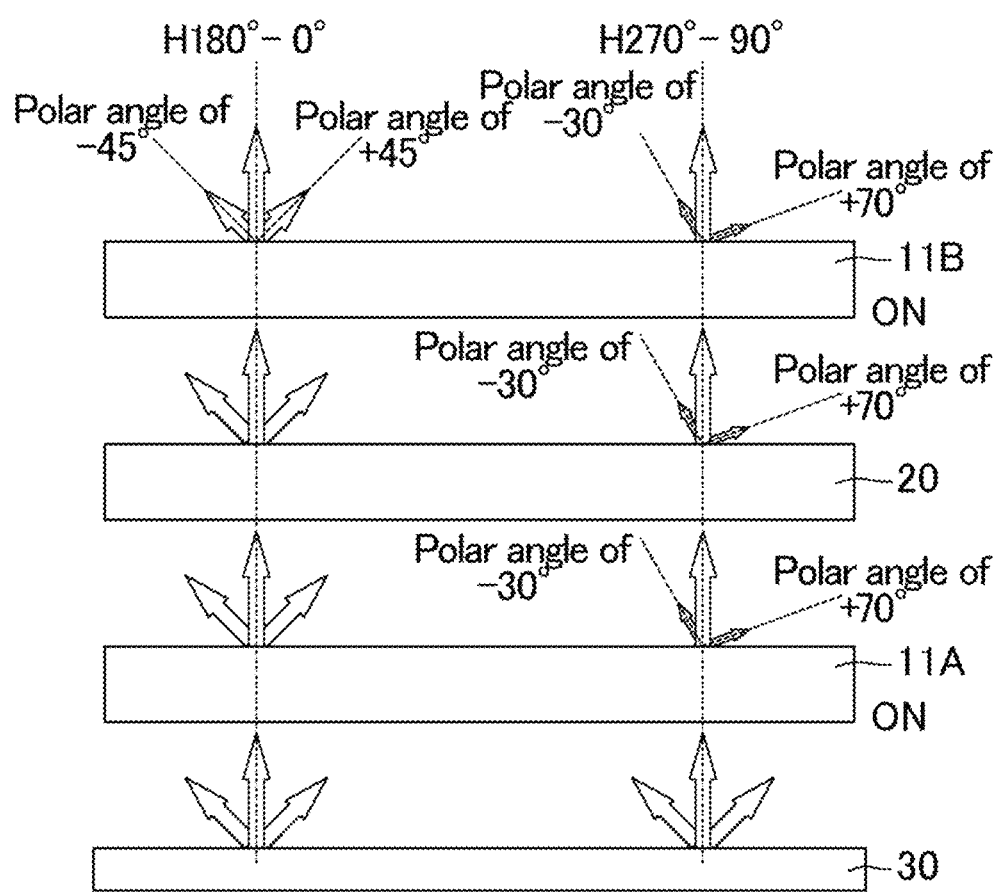
FIG. 17 is a schematic cross-sectional view showing the viewing angles of the display device of Example 2 in the narrow viewing angle mode.

FIG. 12 shows the simulation results of luminance viewing angles of a display device of Example 2 in a wide viewing angle mode. FIG. 13 shows the simulation results of luminance viewing angles of the display device of Example 2 in a narrow viewing angle mode. FIG. 14 shows the simulation results of normalized transmittance versus polar angle in the display device of Example 2 in the wide viewing angle mode. FIG. 15 shows the simulation results of normalized transmittance versus polar angle in the display device of Example 2 in the narrow viewing angle mode. FIG. 16 is a schematic cross-sectional view showing the viewing angles of the display device of Example 2 in the wide viewing angle mode. FIG. 17 is a schematic cross-sectional view showing the viewing angles of the display device of Example 2 in the narrow viewing angle mode. In the present example, the wide viewing angle mode was achieved with no voltage applied to the first viewing angle-controlling liquid crystal panel 11A and the second viewing angle-controlling liquid crystal panel 11B (the first liquid crystal layer 130 and the second liquid crystal layer 330), and the narrow viewing angle mode was achieved with voltage applied to the first viewing angle-controlling liquid crystal panel 11A and the second viewing angle-controlling liquid crystal panel 11B (the first liquid crystal layer 130 and the second liquid crystal layer 330).

As shown in FIG. 12 to FIG. 17 and Table 3, with no voltage applied to the first viewing angle-controlling liquid crystal panel 11A and the second viewing angle-controlling liquid crystal panel 11B, the transmittance of light (polarized light) from the backlight 30 having passed through the first viewing angle-controlling liquid crystal panel 11A was high in both the front direction and an oblique direction (polar angle of 45°), which led to bright display in both the front direction and the oblique direction. Since the liquid crystal display panel 20 was driven in the transverse electric field mode, light having passed through the first viewing angle-controlling liquid crystal panel 11A passed through the liquid crystal display panel 20 not only in the front direction but also in the oblique direction. In addition, the transmittance of light having passed through the liquid crystal display panel 20 and then the second viewing angle-controlling liquid crystal panel 11B was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the first viewing angle-controlling liquid crystal panel 11A and the second viewing angle-controlling liquid crystal panel 11B, the transmittance (normalized transmittance) of emission light derived from light (polarized light) from the backlight 30 having passed through the first viewing angle-controlling liquid crystal panel 11A was maximum in the front (polar angle of 0°) in the top-bottom direction, while being minimum at polar angles of −30° and +70° in the top-bottom direction. This emission light had similar angle profiles after passing through the liquid crystal display panel 20. In addition, the transmittance (normalized transmittance) of the emission light from the liquid crystal display panel 20 having passed through the second viewing angle-controlling liquid crystal panel 11B was maximum in the front (polar angle of 0°) in the left-right direction, while being minimum at polar angles of ±45° in the left-right direction. As described above, the first viewing angle-controlling liquid crystal panel 11A was an ECB-mode liquid crystal panel capable of operating in the asymmetric narrow viewing angle mode with light-shielding angles of −30° and +70° in the top-bottom direction, and the second viewing angle-controlling liquid crystal panel 11B was an ECB-mode liquid crystal panel capable of operating in the symmetric narrow viewing angle mode with light-shielding angles of ±45° in the left-right direction.

In the present example, the asymmetric narrow viewing angle mode with light-shielding angles of −30° and +70° in the top-bottom direction, and the symmetric narrow viewing angle mode with light-shielding angles of ±45° in the left-right direction were achieved. In particular, the viewing angle control to small polar angles was successful at three azimuths (left-right direction/bottom direction), and blocking of light was possible at an even smaller polar angle, i.e., at −30°, in the bottom. This enables an even narrower viewing angle of an ATM terminal, thus enhancing the security. For example, the above configuration can prevent a passerby such as a short person or a person in a wheelchair from stealing the personal information of the user of a vertically installed ATM.

Example 3

As in Example 1, the LCD Master 2D was used to simulate the luminance viewing angles as well as the normalized transmittance versus polar angle in the left-right direction (H180°-0°) and the top-bottom direction (V270°-90°) in the display device 1 of Example 3 having the same configuration as in Embodiment 2. The first absorption axis 10P1A and the second absorption axis 10P2A were set in the 90°-270° azimuthal angle direction. The third absorption axis 10P3A and the fourth absorption axis 10P4A were set in the 0°-180° azimuthal axis direction. The first viewing angle-controlling liquid crystal panel 11A and the second viewing angle-controlling liquid crystal panel 11B were ECB-mode liquid crystal panels. The liquid crystal display panel 20 was in the FFS mode. The axial azimuths and other conditions were set as shown in Table 1 and Table 2.

In the first viewing angle-controlling liquid crystal panel 11A, the retardation Re of the first liquid crystal layer 130 was 800 nm, and both the azimuthal angle φ1 and the azimuthal angle φ2 were 195°. In the second viewing angle-controlling liquid crystal panel 11B, the retardation Re of the second liquid crystal layer 330 was 800 nm, and both the azimuthal angle φ3 and the azimuthal angle φ4 were 90°. The display device 1 of the present example showed a difference |φ3−φ1| of 75° (≥50°) and thus satisfied Formula (1). The display device 1 also satisfied Formula (B2-1), Formula (B2-3), Formula (B3), Formula (A4-2), Formula (A4-4), and Formula (A5). FIG. 18 to FIG. 23 and Table 3 show the simulation results.

Figure 18:
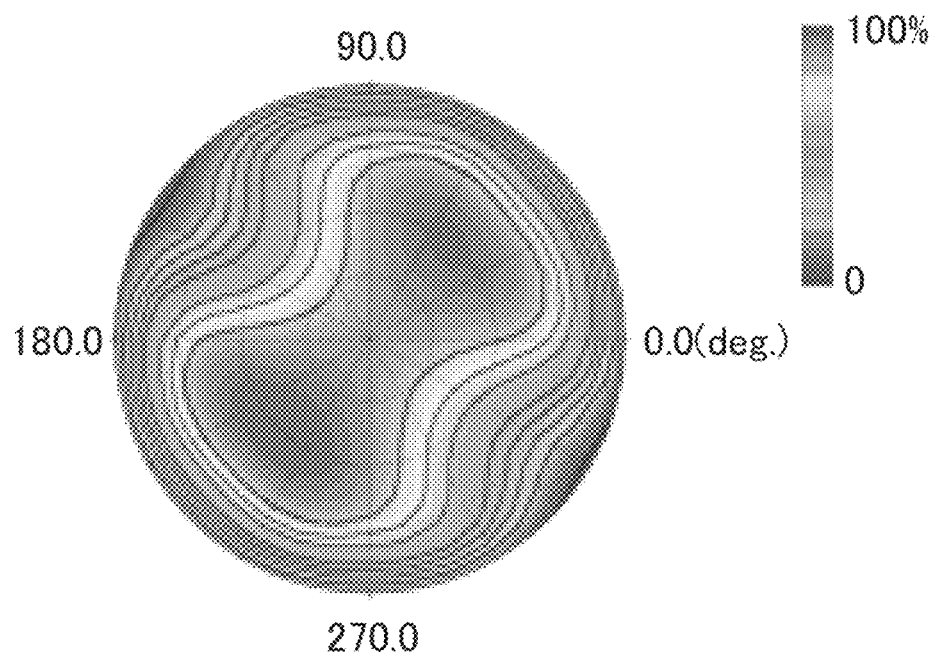
FIG. 18 shows the simulation results of luminance viewing angles of a display device of Example 3 in a wide viewing angle mode.
Figure 19:
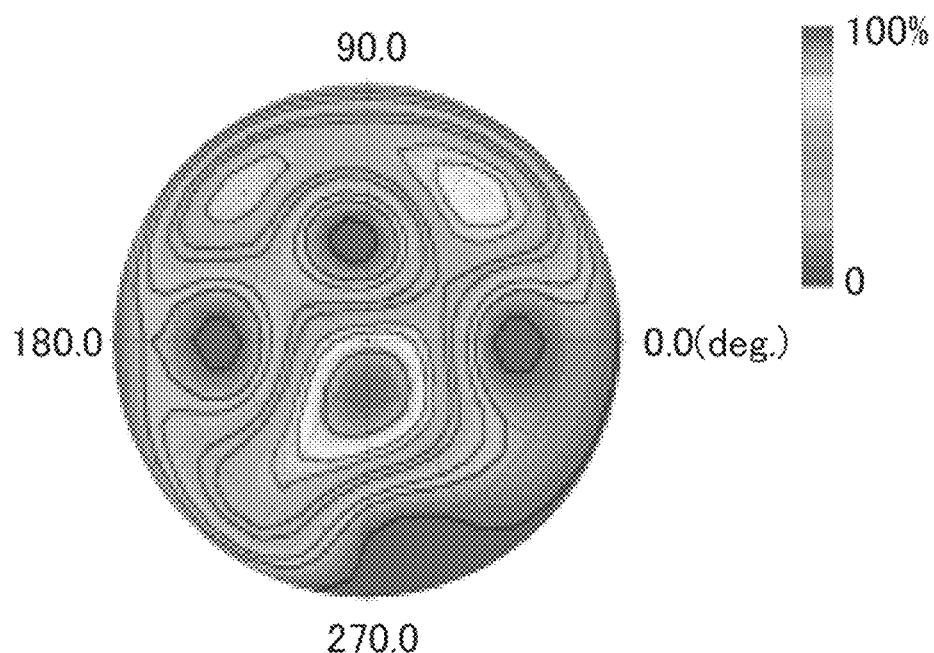
FIG. 19 shows the simulation results of luminance viewing angles of the display device of Example 3 in a narrow viewing angle mode.
Figure 20:
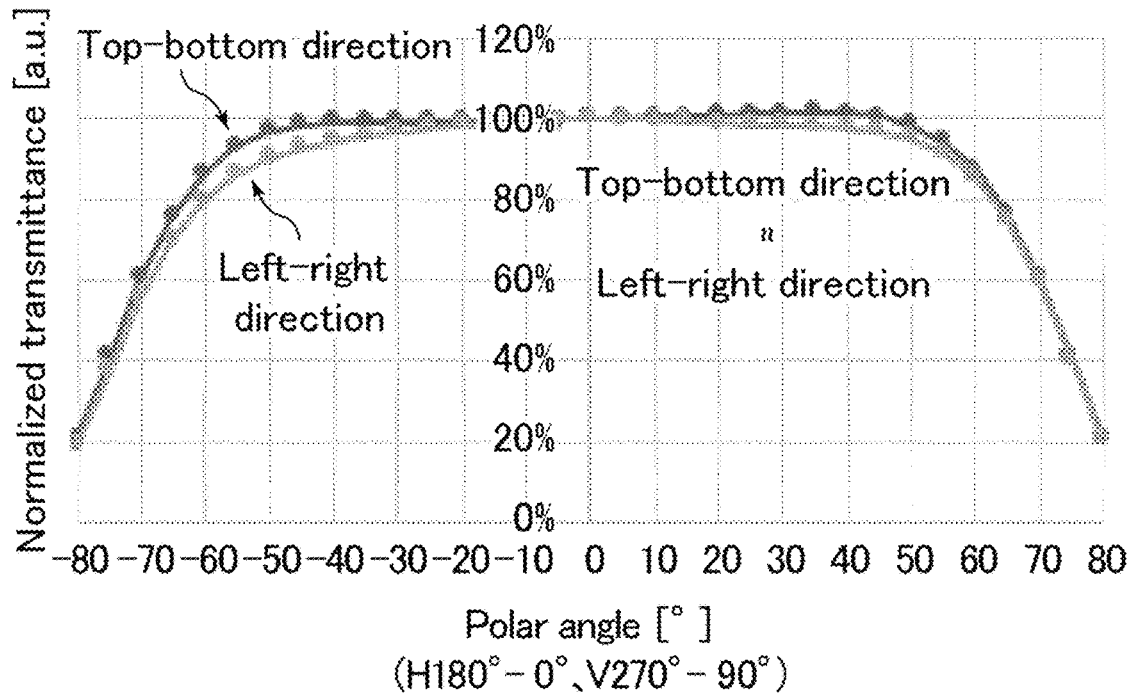
FIG. 20 shows the simulation results of normalized transmittance versus polar angle in the display device of Example 3 in the wide viewing angle mode.
Figure 21:
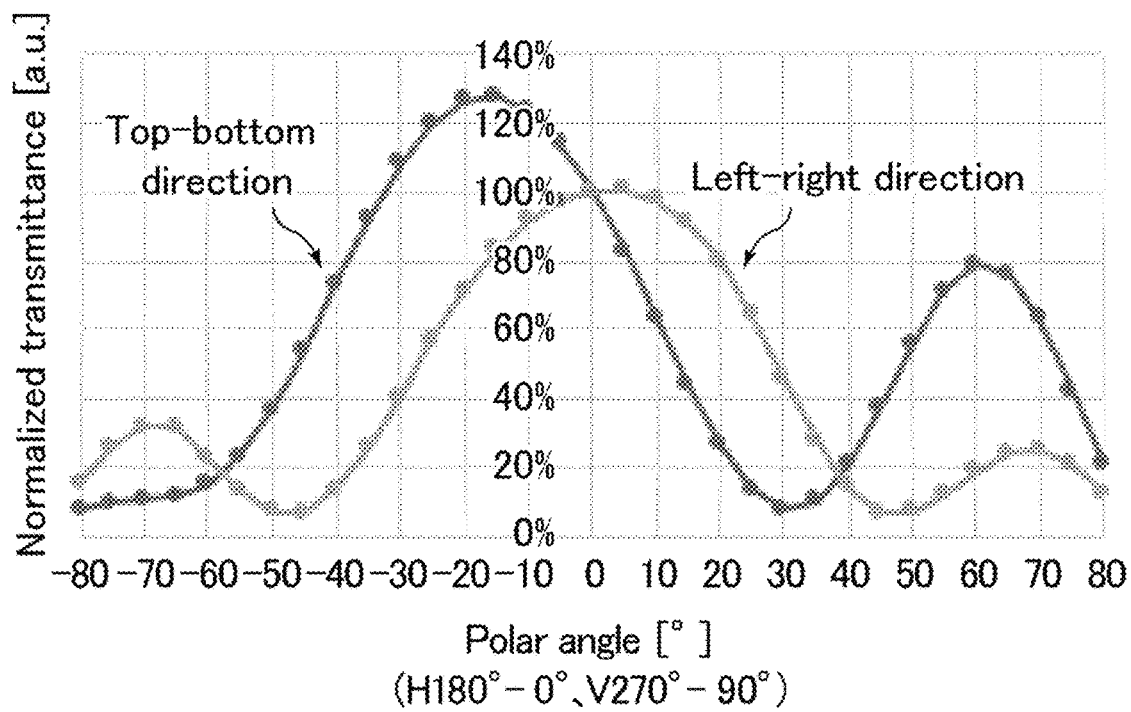
FIG. 21 shows the simulation results of normalized transmittance versus polar angle in the display device of Example 3 in the narrow viewing angle mode.
Figure 22:
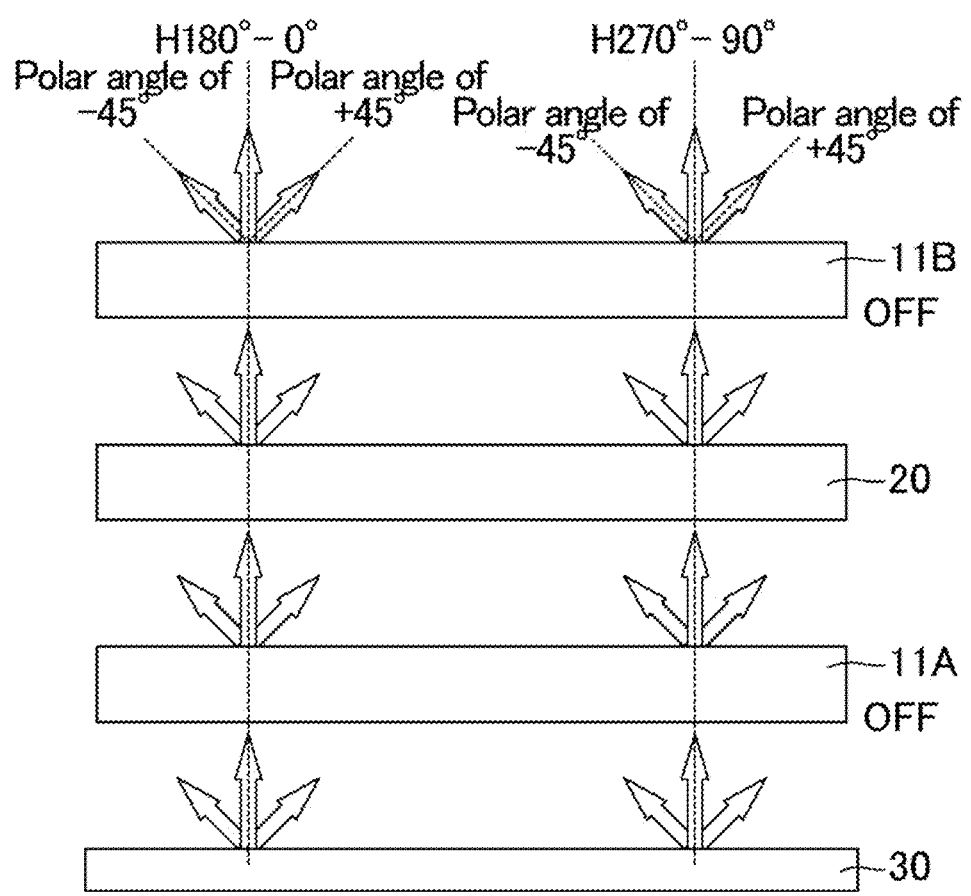
FIG. 22 is a schematic cross-sectional view showing the viewing angles of the display device of Example 3 in the wide viewing angle mode.
Figure 23:
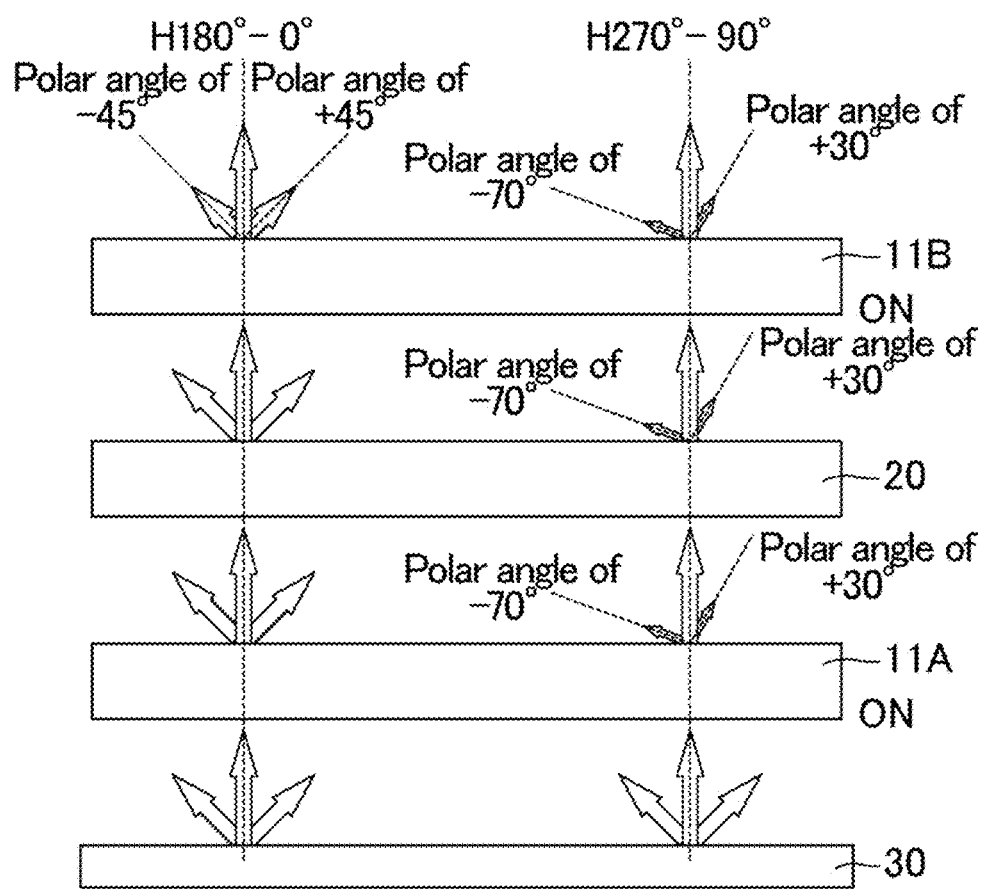
FIG. 23 is a schematic cross-sectional view showing the viewing angles of the display device of Example 3 in the narrow viewing angle mode.

FIG. 18 shows the simulation results of luminance viewing angles of a display device of Example 3 in a wide viewing angle mode. FIG. 19 shows the simulation results of luminance viewing angles of the display device of Example 3 in a narrow viewing angle mode. FIG. 20 shows the simulation results of normalized transmittance versus polar angle in the display device of Example 3 in the wide viewing angle mode. FIG. 21 shows the simulation results of normalized transmittance versus polar angle in the display device of Example 3 in the narrow viewing angle mode. FIG. 22 is a schematic cross-sectional view showing the viewing angles of the display device of Example 3 in the wide viewing angle mode. FIG. 23 is a schematic cross-sectional view showing the viewing angles of the display device of Example 3 in the narrow viewing angle mode. In the present example, the wide viewing angle mode was achieved with no voltage applied to the first viewing angle-controlling liquid crystal panel 11A and the second viewing angle-controlling liquid crystal panel 11B (the first liquid crystal layer 130 and the second liquid crystal layer 330), and the narrow viewing angle mode was achieved with voltage applied to the first viewing angle-controlling liquid crystal panel 11A and the second viewing angle-controlling liquid crystal panel 11B (the first liquid crystal layer 130 and the second liquid crystal layer 330).

As shown in FIG. 18 to FIG. 23 and Table 3, with no voltage applied to the first viewing angle-controlling liquid crystal panel 11A and the second viewing angle-controlling liquid crystal panel 11B, the transmittance of light (polarized light) from the backlight 30 having passed through the first viewing angle-controlling liquid crystal panel 11A was high in both the front direction and an oblique direction (polar angle of 45°), which led to bright display in both the front direction and the oblique direction. Since the liquid crystal display panel 20 was driven in the transverse electric field mode, light having passed through the first viewing angle-controlling liquid crystal panel 11A passed through the liquid crystal display panel 20 not only in the front direction but also in the oblique direction. In addition, the transmittance of light having passed through the liquid crystal display panel 20 and then the second viewing angle-controlling liquid crystal panel 11B was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the first viewing angle-controlling liquid crystal panel 11A and the second viewing angle-controlling liquid crystal panel 11B, the transmittance (normalized transmittance) of emission light derived from light (polarized light) from the backlight 30 having passed through the first viewing angle-controlling liquid crystal panel 11A was maximum in the front (polar angle of 0°) in the top-bottom direction, while being minimum at polar angles of −70° and +30° in the top-bottom direction. This emission light had similar angle profiles after passing through the liquid crystal display panel 20. In addition, the transmittance (normalized transmittance) of the emission light from the liquid crystal display panel 20 having passed through the second viewing angle-controlling liquid crystal panel 11B was maximum in the front (polar angle of 0°) in the left-right direction, while being minimum at polar angles of ±45° in the left-right direction. As described above, the first viewing angle-controlling liquid crystal panel 11A was an ECB-mode liquid crystal panel capable of operating in the asymmetric narrow viewing angle mode with light-shielding angles of −70° and +30° in the top-bottom direction, and the second viewing angle-controlling liquid crystal panel 11B was an ECB-mode liquid crystal panel capable of operating in the symmetric narrow viewing angle mode with light-shielding angles of ±45° in the left-right direction.

In the present example, the asymmetric narrow viewing angle mode with light-shielding angles of −70° and +30° in the top-bottom direction, and the symmetric narrow viewing angle mode with light-shielding angles of ±45° in the left-right direction were achieved. In particular, the viewing angle control to small polar angles was successful at three azimuths (left-right direction/top direction), and blocking of light was possible at an even smaller polar angle, i.e., at −30°, in the top. This enables an even narrower viewing angle of an ATM terminal, thus enhancing the security. For example, the above configuration can provide bright display when the user of a horizontally installed ATM is a short person or a person in a wheelchair.

Example 4

As in Example 1, the LCD Master 2D was used to simulate the luminance viewing angles as well as the normalized transmittance versus polar angle in the left-right direction (H180°-0°) and the top-bottom direction (V270°-90°) in the display device 1 of Example 4 having the same configuration as in Modified Example 1 of Embodiment 2. The retardation Rth in the thickness direction of the negative C plate 12 between the second viewing angle-controlling liquid crystal panel 11B and the fourth polarizing plate 10P4 was 550 nm. The first absorption axis 10P1A and the second absorption axis 10P2A were set in the 90°-270° azimuthal angle direction. The third absorption axis 10P3A and the fourth absorption axis 10P4A were set in the 0°-180° azimuthal angle direction. The first viewing angle-controlling liquid crystal panel 11A and the second viewing angle-controlling liquid crystal panel 11B were ECB-mode liquid crystal panels. The liquid crystal display panel 20 was in the FFS mode. The axial azimuths and other conditions were set as shown in Table 1 and Table 2.

In the first viewing angle-controlling liquid crystal panel 11A, the retardation Re of the first liquid crystal layer 130 was 800 nm, and both the azimuthal angle φ1 and the azimuthal angle φ2 were 15°. In the second viewing angle-controlling liquid crystal panel 11B, the retardation Re of the second liquid crystal layer 330 was 800 nm, and both the azimuthal angle φ3 and the azimuthal angle φ4 were 90°. The display device 1 of the present example showed a difference |φ3−φ1| of 75° (≥50°) and thus satisfied Formula (1). The display device 1 also satisfied Formula (B2-1), Formula (B2-3), Formula (B3), Formula (A4-2), Formula (A4-4), and Formula (A5). The display device 1 of Example 4 had the same configuration as in Example 2, except for including the negative C plate 12. FIG. 24 to FIG. 29 and the Table 3 show the simulation results.

Figure 24:
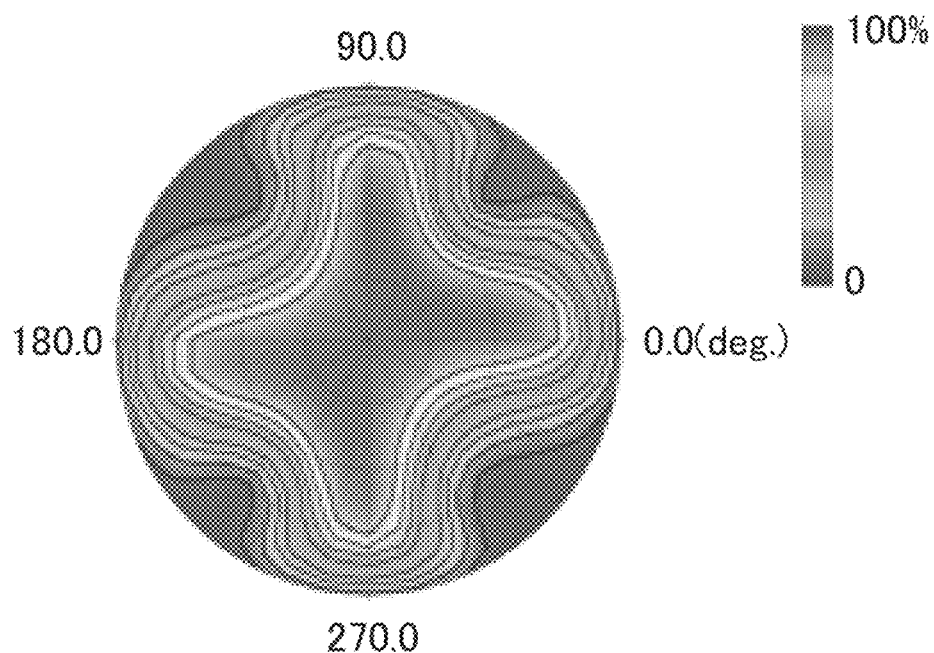
FIG. 24 shows the simulation results of luminance viewing angles of a display device of Example 4 in a wide viewing angle mode.
Figure 25:
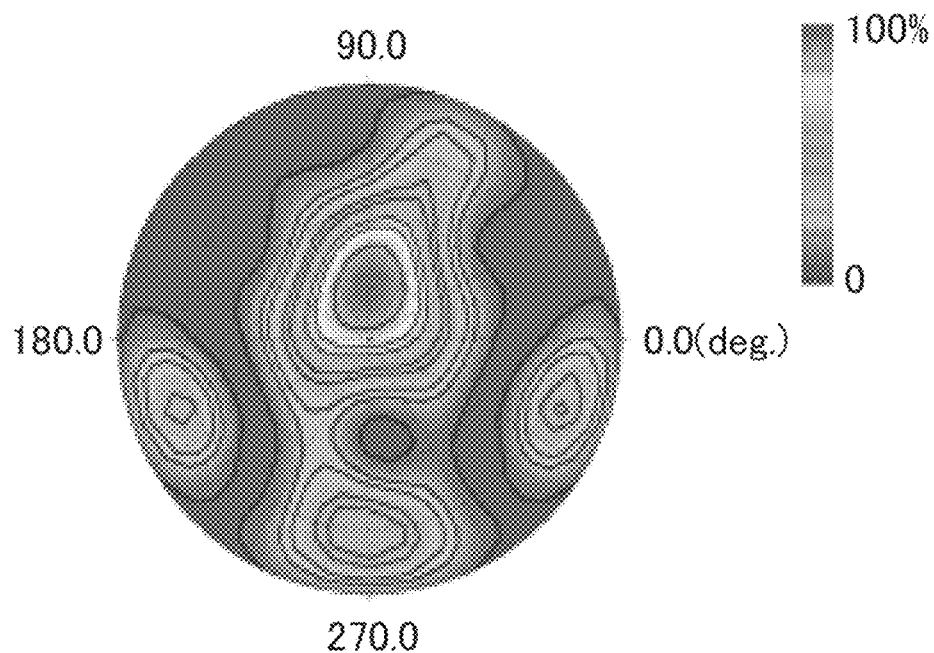
FIG. 25 shows the simulation results of luminance viewing angles of the display device of Example 4 in a narrow viewing angle mode.
Figure 26:
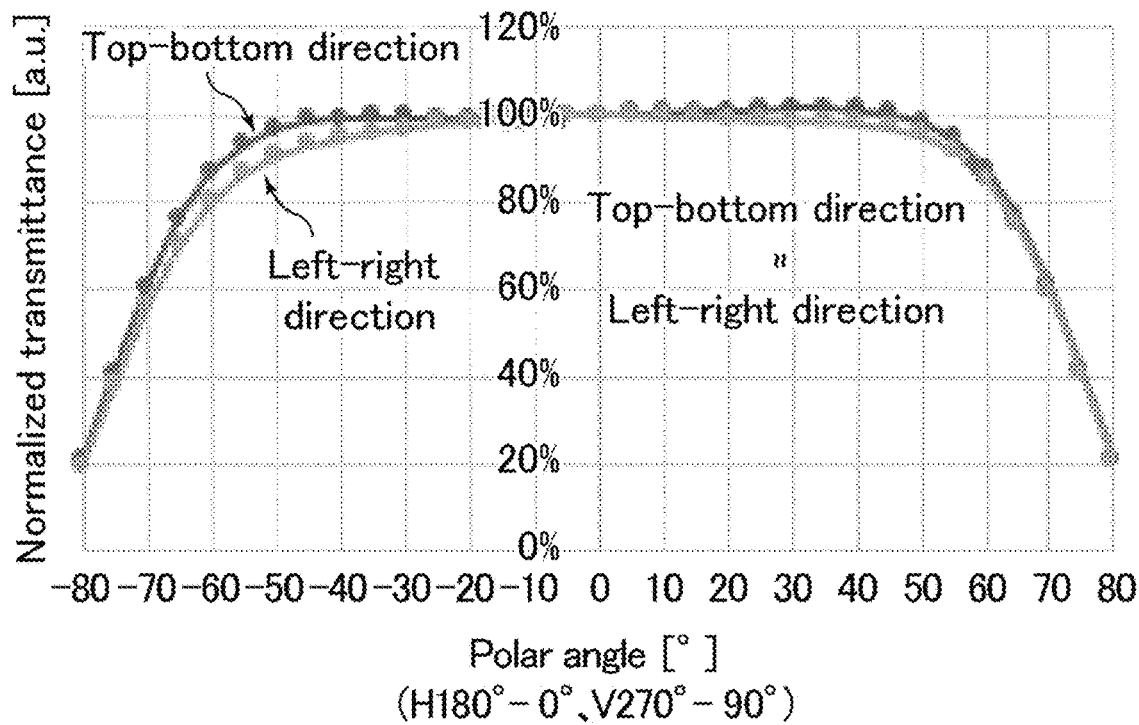
FIG. 26 shows the simulation results of normalized transmittance versus polar angle in the display device of Example 4 in the wide viewing angle mode.
Figure 27:
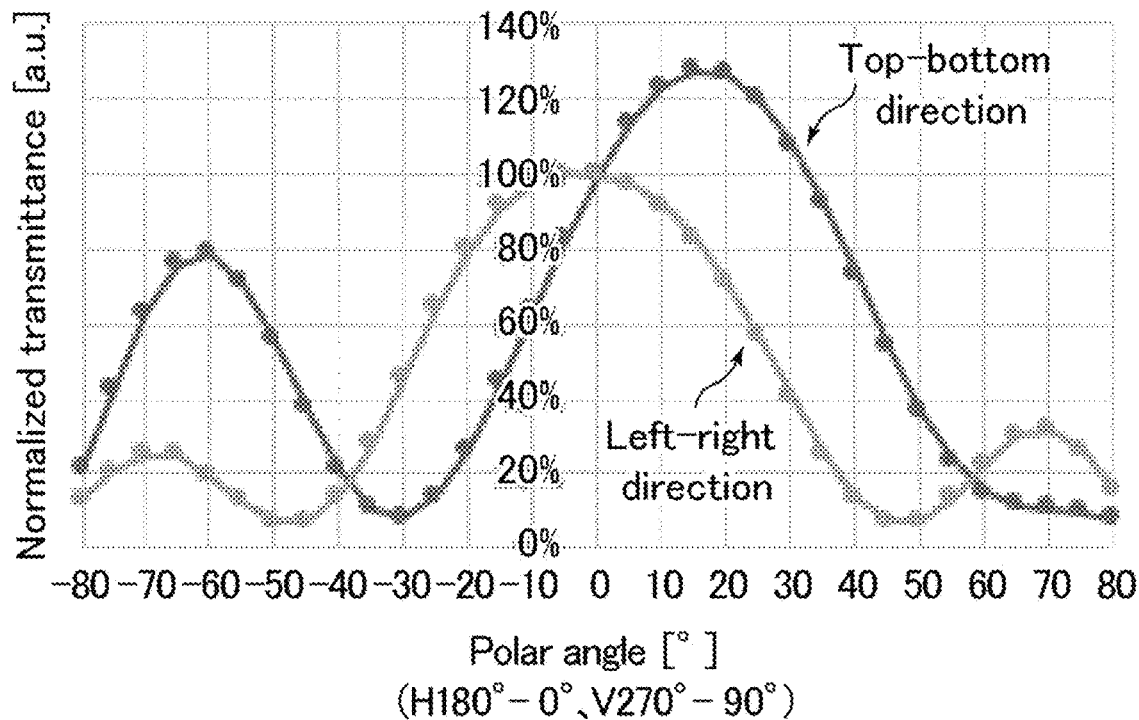
FIG. 27 shows the simulation results of normalized transmittance versus polar angle in the display device of Example 4 in the narrow viewing angle mode.
Figure 28:
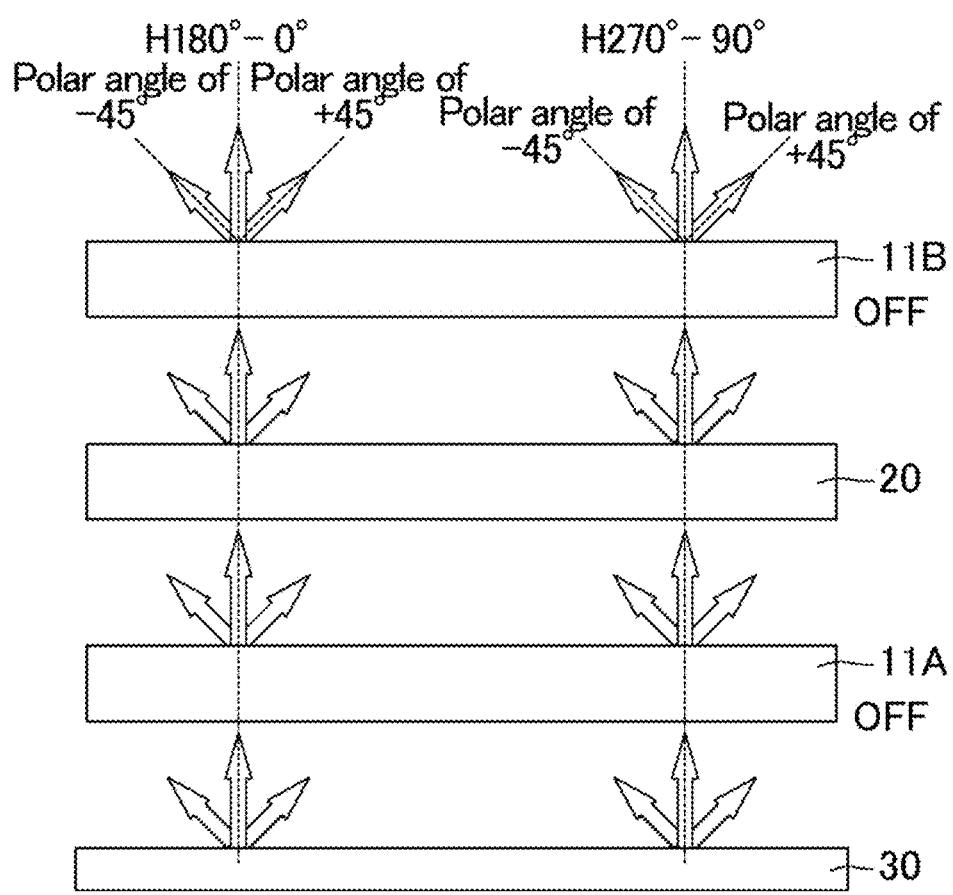
FIG. 28 is a schematic cross-sectional view showing the viewing angles of the display device of Example 4 in the wide viewing angle mode.
Figure 29:
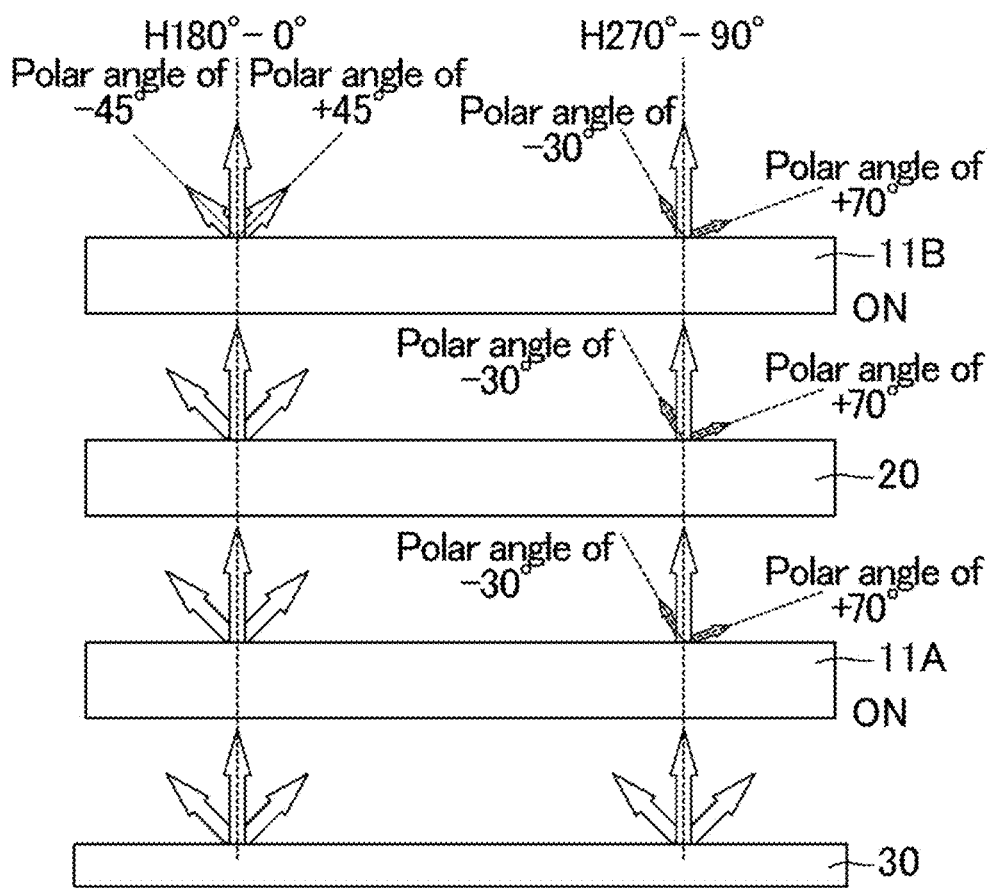
FIG. 29 is a schematic cross-sectional view showing the viewing angles of the display device of Example 4 in the narrow viewing angle mode.

FIG. 24 shows the simulation results of luminance viewing angles of a display device of Example 4 in a wide viewing angle mode. FIG. 25 shows the simulation results of luminance viewing angles of the display device of Example 4 in a narrow viewing angle mode. FIG. 26 shows the simulation results of normalized transmittance versus polar angle in the display device of Example 4 in the wide viewing angle mode. FIG. 27 shows the simulation results of normalized transmittance versus polar angle in the display device of Example 4 in the narrow viewing angle mode. FIG. 28 is a schematic cross-sectional view showing the viewing angles of the display device of Example 4 in the wide viewing angle mode. FIG. 29 is a schematic cross-sectional view showing the viewing angles of the display device of Example 4 in the narrow viewing angle mode. In the present example, the wide viewing angle mode was achieved with no voltage applied to the first viewing angle-controlling liquid crystal panel 11A and the second viewing angle-controlling liquid crystal panel 11B (the first liquid crystal layer 130 and the second liquid crystal layer 330), and the narrow viewing angle mode was achieved with voltage applied to the first viewing angle-controlling liquid crystal panel 11A and the second viewing angle-controlling liquid crystal panel 11B (the first liquid crystal layer 130 and the second liquid crystal layer 330).

As shown in FIG. 24 to FIG. 29 and Table 3, with no voltage applied to the first viewing angle-controlling liquid crystal panel 11A and the second viewing angle-controlling liquid crystal panel 11B, the transmittance of light (polarized light) from the backlight 30 having passed through the first viewing angle-controlling liquid crystal panel 11A was high in both the front direction and an oblique direction (polar angle of 45°), which led to bright display in both the front direction and the oblique direction. Since the liquid crystal display panel 20 was driven in the transverse electric field mode, light having passed through the first viewing angle-controlling liquid crystal panel 11A passed through the liquid crystal display panel 20 not only in the front direction but also in the oblique direction. In addition, the transmittance of light having passed through the liquid crystal display panel 20 and then the second viewing angle-controlling liquid crystal panel 11B was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the first viewing angle-controlling liquid crystal panel 11A and the second viewing angle-controlling liquid crystal panel 11B, the transmittance (normalized transmittance) of emission light derived from light (polarized light) from the backlight 30 having passed through the first viewing angle-controlling liquid crystal panel 11A was maximum in the front (polar angle of 0°) in the top-bottom direction, while being minimum at polar angles of −30° and +70° in the top-bottom direction. This emission light had similar angle profiles after passing through the liquid crystal display panel 20. In addition, the transmittance (normalized transmittance) of emission light from the liquid crystal display panel 20 having passed through the second viewing angle-controlling liquid crystal panel 11B was maximum in the front (polar angle of 0°) in the left-right direction, while being minimum at polar angles of ±45° in the left-right direction. As described above, the first viewing angle-controlling liquid crystal panel 11A was an ECB-mode liquid crystal panel capable of operating in the asymmetric narrow viewing angle mode with light-shielding angles of −30° and +70° in the top-bottom direction, and the second viewing angle-controlling liquid crystal panel 11B was an ECB-mode liquid crystal panel capable of operating in the symmetric narrow viewing angle mode with light-shielding angles of ±45° in the left-right direction.

In the present example, the asymmetric narrow viewing angle mode with light-shielding angles of −30° and +70° in the top-bottom direction, and the symmetric narrow viewing angle mode with light-shielding angles of ±45° in the left-right direction were achieved. In particular, the viewing angle control to small polar angles was successful at three azimuths (left-right direction/bottom direction), and blocking of light was possible at an even smaller polar angle, i.e., at −30°, in the bottom. Also with the negative C plate 12, a higher light-shielding ability was achieved at azimuths of +45° and 135° than in Example 2. This enables an even narrower viewing angle of an ATM terminal than in Example 2, thus enhancing the security. For example, the above configuration can more reliably prevent a passerby such as a short person or a person in a wheelchair from stealing the personal information of the user of a vertically installed ATM than in Example 2.

Example 5

As in Example 1, the LCD Master 2D was used to simulate the luminance viewing angles as well as the normalized transmittance versus polar angle in the left-right direction (H180°-0°) and the top-bottom direction (V270°-90°) in the display device 1 of Example 5 having the same configuration as in Embodiment 4. The first absorption axis 10P1A and the second absorption axis 10P2A were set in the 90°-270° azimuthal angle direction. The third absorption axis 10P3A and the fourth absorption axis 10P4A were set in the 0°-180° azimuthal angle direction. The first viewing angle-controlling liquid crystal panel 11A and the second viewing angle-controlling liquid crystal panel 11B were ECB-mode liquid crystal panels. The liquid crystal display panel 20 was in the FFS mode. The axial azimuths and other conditions were set as shown in Table 1 and Table 2.

In the first viewing angle-controlling liquid crystal panel 11A, the retardation Re of the first liquid crystal layer 130 was 1000 nm, the azimuthal angle $\varphi 1$ was 180°, the azimuthal angle $\varphi 2$ was 190°, and the first liquid crystal molecules 131 was twisted counterclockwise by 10° from the first substrate 110 side toward the second substrate 150 side. In the second viewing angle-controlling liquid crystal panel 11B, the retardation Re of the second liquid crystal layer 330 was 800 nm, and both the azimuthal angle $\varphi 3$ and the azimuthal angle $\varphi 4$ were 90°. The display device 1 of the present example showed a difference $|\varphi 3 - \varphi 1|$ of 90° ($\geq 50°$) and thus satisfied Formula (1). The display device 1 also satisfied Formula (B2-1), Formula (B2-3), Formula (B3), Formula (A6-4), and Formula (A7). FIG. 30 to FIG. 35 and the Table 3 show the simulation results.

Figure 30:
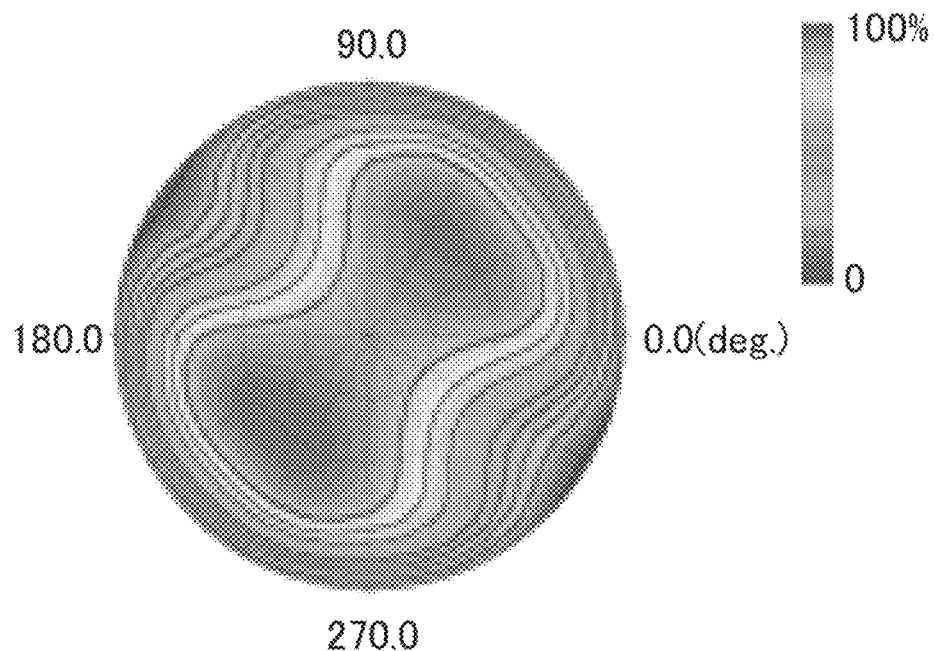
FIG. 30 shows the simulation results of luminance viewing angles of a display device of Example 5 in a wide viewing angle mode.
Figure 31:
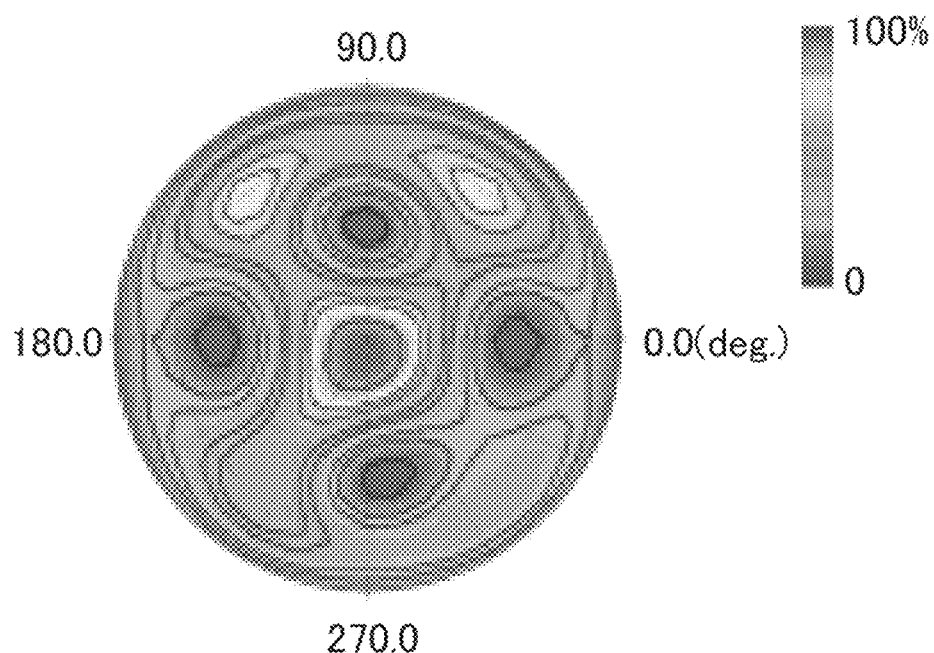
FIG. 31 shows the simulation results of luminance viewing angles of the display device of Example 5 in a narrow viewing angle mode.
Figure 32:
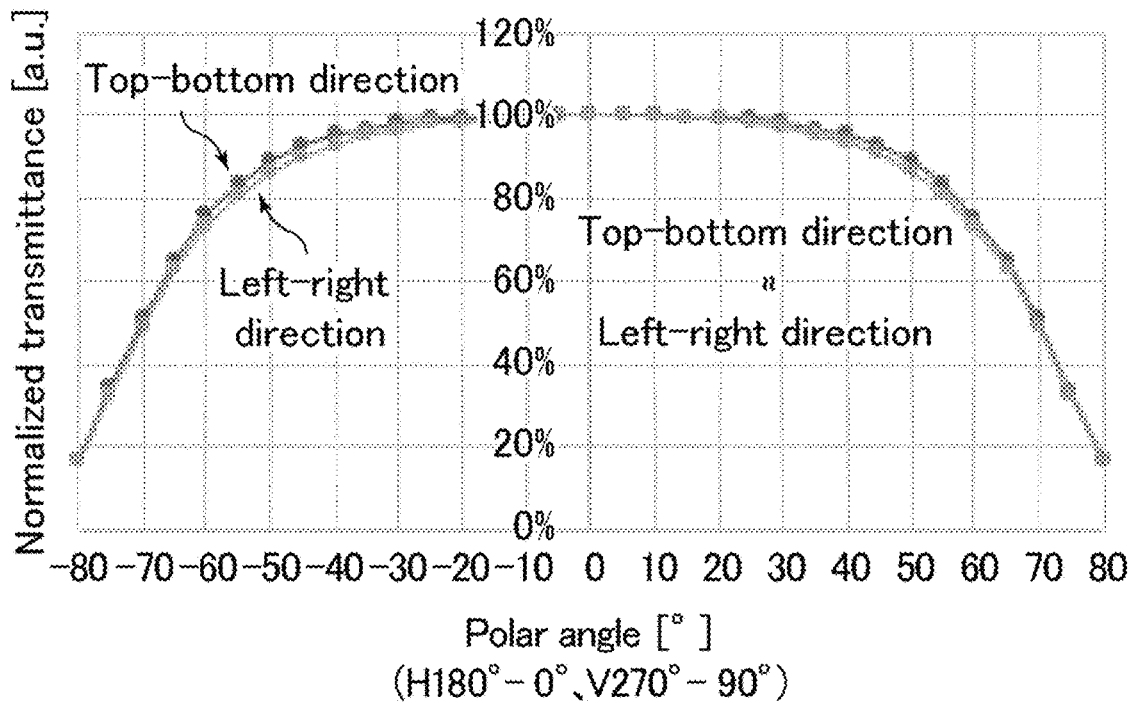
FIG. 32 shows the simulation results of normalized transmittance versus polar angle in the display device of Example 5 in the wide viewing angle mode.
Figure 33:
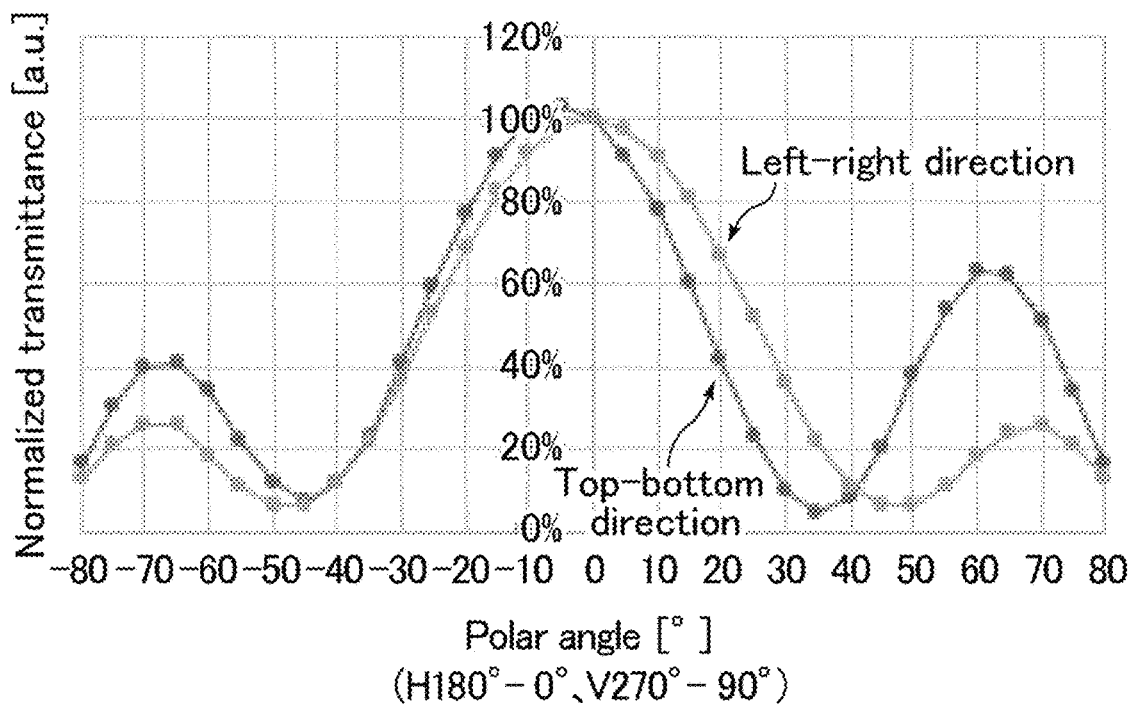
FIG. 33 shows the simulation results of normalized transmittance versus polar angle in the display device of Example 5 in the narrow viewing angle mode.
Figure 34:
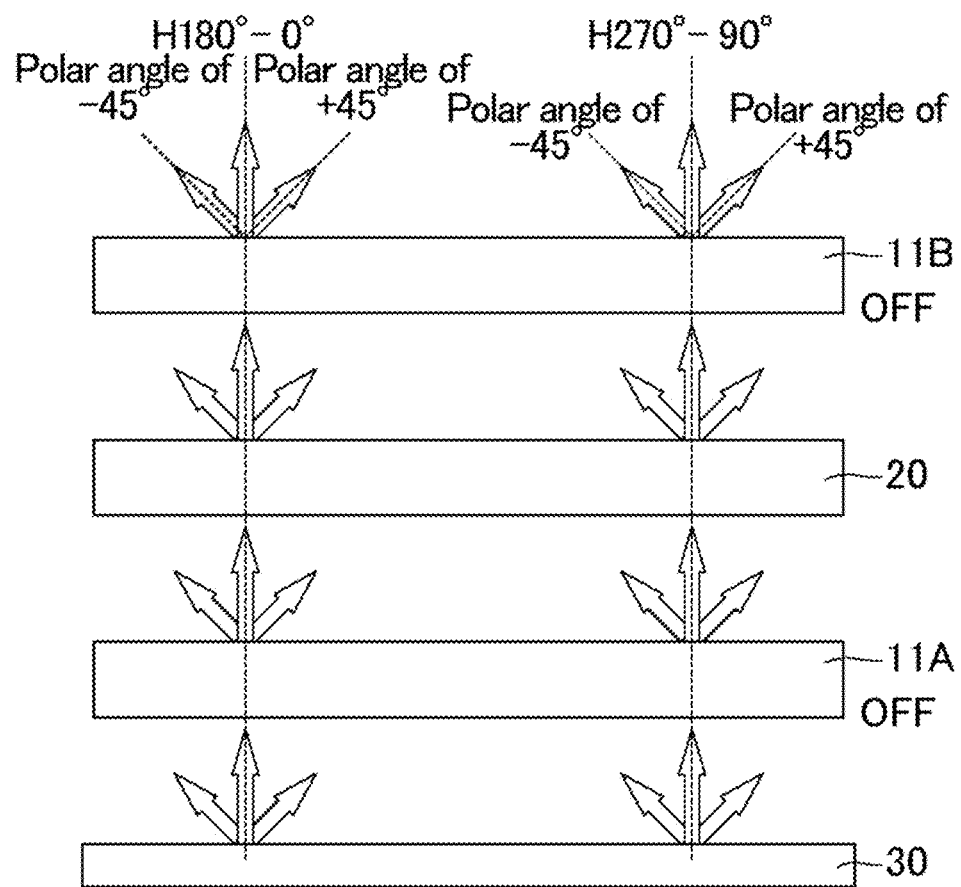
FIG. 34 is a schematic cross-sectional view showing the viewing angles of the display device of Example 5 in the wide viewing angle mode.
Figure 35:
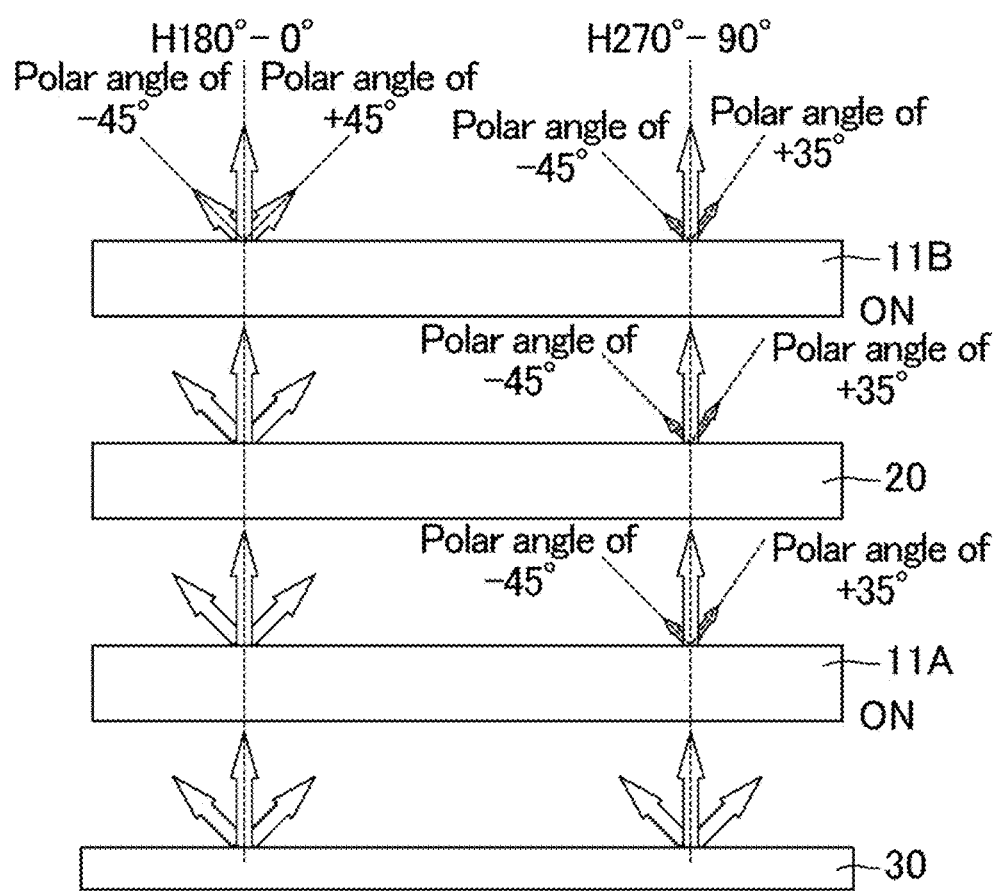
FIG. 35 is a schematic cross-sectional view showing the viewing angles of the display device of Example 5 in the narrow viewing angle mode.

FIG. 30 shows the simulation results of luminance viewing angles of a display device of Example 5 in a wide viewing angle mode. FIG. 31 shows the simulation results of luminance viewing angles of the display device of Example 5 in a narrow viewing angle mode. FIG. 32 shows the simulation results of normalized transmittance versus polar angle in the display device of Example 5 in the wide viewing angle mode. FIG. 33 shows the simulation results of normalized transmittance versus polar angle in the display device of Example 5 in the narrow viewing angle mode. FIG. 34 is a schematic cross-sectional view showing the viewing angles of the display device of Example 5 in the wide viewing angle mode. FIG. 35 is a schematic cross-sectional view showing the viewing angles of the display device of Example 5 in the narrow viewing angle mode. In the present example, the wide viewing angle mode was achieved with no voltage applied to the first viewing angle-controlling liquid crystal panel 11A and the second viewing angle-controlling liquid crystal panel 11B (the first liquid crystal layer 130 and the second liquid crystal layer 330), and the narrow viewing angle mode was achieved with voltage applied to the first viewing angle-controlling liquid crystal panel 11A and the second viewing angle-controlling liquid crystal panel 11B (the first liquid crystal layer 130 and the second liquid crystal layer 330).

As shown in FIG. 30 to FIG. 35 and Table 3, with no voltage applied to the first viewing angle-controlling liquid crystal panel 11A and the second viewing angle-controlling liquid crystal panel 11B, the transmittance of light (polarized light) from the backlight 30 having passed through the first viewing angle-controlling liquid crystal panel 11A was high in both the front direction and an oblique direction (polar angle of 45°), which led to bright display in both the front direction and the oblique direction. Since the liquid crystal display panel 20 was driven in the transverse electric field mode, light having passed through the first viewing angle-controlling liquid crystal panel 11A passed through the liquid crystal display panel 20 not only in the front direction but also in the oblique direction. In addition, the transmittance of light having passed through the liquid crystal display panel 20 and then the second viewing angle-controlling liquid crystal panel 11B was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the first viewing angle-controlling liquid crystal panel 11A and the second viewing angle-controlling liquid crystal panel 11B, the transmittance (normalized transmittance) of emission light derived from light (polarized light) from the backlight 30 having passed through the first viewing angle-controlling liquid crystal panel 11A was maximum in the front (polar angle of 0°) in the top-bottom direction, while being minimum at polar angles of −45° and +35° in the top-bottom direction. This emission light had similar angle profiles after passing through the liquid crystal display panel 20. In addition, the transmittance (normalized transmittance) of the emission light from the liquid crystal display panel 20 having passed through the second viewing angle-controlling liquid crystal panel 11B was maximum in the front (polar angle of 0°) in the left-right direction, while being minimum at polar angles of ±45° in the left-right direction. As described above, the first viewing angle-controlling liquid crystal panel 11A was an ECB-mode liquid crystal panel capable of operating in the asymmetric narrow viewing angle mode with light-shielding angles of −45° and +35° in the top-bottom direction, and the second viewing angle-controlling liquid crystal panel 11B was an ECB-mode liquid crystal panel capable of operating in the symmetric narrow viewing angle mode with light-shielding angles of ±45° in the left-right direction.

In the present example, the asymmetric narrow viewing angle mode with light-shielding angles of −45° and +35° in the top-bottom direction, and the symmetric narrow viewing angle mode with light-shielding angles of ±45° in the left-right direction were achieved. In particular, the viewing angle control to small polar angles was successful at three azimuths (left-right direction/top direction), and blocking of light was possible at an even smaller polar angle, i.e., at +30°, in the top. In the present example, a front color shift in switching between the wide viewing angle mode and the narrow viewing angle mode was more reduced than in Example 3. The present example thus allows, for example, people to use the ATM terminal without perceiving a color difference.

Comparative Example 1

As in Example 1, the LCD Master 2D was used to simulate the luminance viewing angles and the normalized transmittance versus polar angle in the left-right direction (H180°-0°) and the top-bottom direction (V270°-90°) in a display device of Comparative Example 1. The display device of Comparative Example 1 had the same configuration as in Example 1, except for the configuration of the first viewing angle-controlling liquid crystal panel and for including no second viewing angle-controlling liquid crystal panel.

In the first viewing angle-controlling liquid crystal panel 11A in Comparative Example 1, the first absorption axis 10P1A and the second absorption axis 10P2A were set in the 0°-180° azimuthal angle direction. The first viewing angle-controlling liquid crystal panel was an ECB-mode liquid crystal panel. The liquid crystal display panel 20 was in the FFS mode. The axial azimuths and other conditions were set as shown in Table 1 and Table 2. Table 3 shows the simulation results.

As shown in Table 3, the display device of Comparative Example 1 achieved the symmetric narrow viewing angle mode with light-shielding angles of ±45° in the left-right direction, but failed to control the viewing angle in the top-bottom direction.

Comparative Example 2

As in Example 1, the LCD Master 2D was used to simulate the luminance viewing angles and the normalized transmittance versus polar angle in the left-right direction (H180°-0°) and the top-bottom direction (V270°-90°) in a display device of Comparative Example 2. The display device of Comparative Example 2 had the same configuration as in Example 1, except for the configuration of the second viewing angle-controlling liquid crystal panel and for including no first viewing angle-controlling liquid crystal panel.

In Comparative Example 2, the third absorption axis 10P3A and the fourth absorption axis 10P4A were set in the 0°-180° azimuthal angle direction. The second viewing angle-controlling liquid crystal panel was an ECB-mode liquid crystal panel. The liquid crystal display panel 20 was in the FFS mode. The axial azimuths and other conditions were set as shown in Table 1 and Table 2. Table 3 shows the simulation results.

As shown in Table 3, the display device of Comparative Example 2 achieved the symmetric narrow viewing angle mode with light-shielding angles of ±45° in the left-right direction, but failed to control the viewing angle in the top-bottom direction. Including the viewing angle-controlling liquid crystal panel on the viewing surface side of the liquid crystal display panel 20, Comparative Example 2 achieved higher light-shielding ability than Comparative Example 1.

Comparative Example 3

As in Example 1, the LCD Master 2D was used to simulate the luminance viewing angles and the normalized transmittance versus polar angle in the left-right direction (H180°-0°) and the top-bottom direction (V270°-90°) in a display device of Comparative Example 3. The display device of Comparative Example 3 had the same configuration as in Example 1, except for the configuration of the first viewing angle-controlling liquid crystal panel and for including no second viewing angle-controlling liquid crystal panel.

In Comparative Example 3, the first absorption axis 10P1A and the second absorption axis 10P2A were set in the 0°-180° azimuthal angle direction. The first viewing angle-controlling liquid crystal panel was an ECB-mode liquid crystal panel. The liquid crystal display panel 20 was in the FFS mode. The axial azimuths and other conditions were set as shown in Table 1 and Table 2. Table 3 shows the simulation results.

As shown in Table 3, the display device of Comparative Example 3 achieved the asymmetric narrow viewing angle mode with light-shielding angles of −30° and +70° in the left-right direction, but failed to control the viewing angle in the top-bottom direction.

Comparative Example 4

As in Example 1, the LCD Master 2D was used to simulate the luminance viewing angles and the normalized transmittance versus polar angle in the left-right direction (H180°-0°) and the top-bottom direction (V270°-90°) in a display device of Comparative Example 4. The display device of Comparative Example 4 had the same configuration as in Example 1, except for the configuration of the first viewing angle-controlling liquid crystal panel and for including no second viewing angle-controlling liquid crystal panel.

In Comparative Example 4, the first absorption axis 10P1A and the second absorption axis 10P2A were set in the 0°-180° azimuthal angle direction. The first viewing angle-controlling liquid crystal panel was an ECB-mode liquid crystal panel. The liquid crystal display panel 20 was in the FFS mode. The axial azimuths and other conditions were set as shown in Table 1 and Table 2. Table 3 shows the simulation results.

As shown in Table 3, the display device of Comparative Example 4 achieved the asymmetric narrow viewing angle mode with light-shielding angles of −30° and +70° in the top-bottom direction, but failed to control the viewing angle in the left-right direction.

Comparative Example 5

As in Example 1, the LCD Master 2D was used to simulate the luminance viewing angles and the normalized transmittance versus polar angle in the left-right direction (H180°-0°) and the top-bottom direction (V270°-90°) in a display device of Comparative Example 5. The display device of Comparative Example 5 had the same configuration as in Example 1, except for the configuration of the first viewing angle-controlling liquid crystal panel and the configuration of the second viewing angle-controlling liquid crystal panel.

In Comparative Example 5, the first absorption axis 10P1A and second absorption axis 10P2A were set in the 90°-270° azimuthal angle direction. The third absorption axis 10P3A and the fourth absorption axis 10P4A were set in the 0°-180° azimuthal angle direction. The first viewing angle-controlling liquid crystal panel was an ECB-mode liquid crystal panel. The liquid crystal display panel 20 was in the FFS mode. The axial azimuths and other conditions were set as shown in Table 1 and Table 2.

In the first viewing angle-controlling liquid crystal panel, the retardation Re of the first liquid crystal layer was 800 nm, and both the azimuthal angle $\varphi 1$ and the azimuthal angle $\varphi 2$ were 75°. In the second viewing angle-controlling liquid crystal panel, the retardation Re of the second liquid crystal layer was 800 nm, and both the azimuthal angle $\varphi 3$ and the azimuthal angle $\varphi 4$ were 90°. The display device of the present comparative example showed a difference $|\varphi 3 - \varphi 1|$ of 15° and thus failed to satisfy Formula (1). Table 3 shows the simulation results.

As shown in Table 3, in the display device of Comparative Example 5, the light-shielding angles were −45°, −35°, and +45° in the left-right direction. Specifically, the first viewing angle-controlling liquid crystal panel 11A achieved a light-shielding angle of −35° in the left-right direction, while the second viewing angle-controlling liquid crystal panel 11B achieved light-shielding angles of ±45° in the left-right direction. The display device of Comparative Example 5, however, failed to control the viewing angle in the top-bottom direction.

REFERENCE SIGNS LIST

1: display device
10P1, 10P2, 10P3, 10P4: polarizing plate
10P1A, 10P2A, 10P3A, 10P4A: absorption axis
11A, 11B: viewing angle-controlling liquid crystal panel
12: negative C plate
20: liquid crystal display panel
30: backlight
110, 150, 210, 250, 310, 350: substrate
111, 151, 211, 251, 311, 351: support substrate
112, 152, 212, 214, 312, 352: electrode
120, 140, 220, 240, 320, 340: alignment film
130, 230, 330: liquid crystal layer
131, 231, 331, 1311, 1312, 3311, 3312: liquid crystal molecule
1311A, 1312A, 3311A, 3312A: director
213, 215: insulating layer
214a: linear electrode
214b: aperture
252: color filter layer
253: black matrix layer

What is claimed is:

1. A display device comprising, sequentially from a back surface side toward a viewing surface side:
   a backlight;
   a first polarizing plate with a first absorption axis;
   a first liquid crystal panel;
   a second polarizing plate with a second absorption axis;
   a display panel;
   a third polarizing plate with a third absorption axis;
   a second liquid crystal panel; and
   a fourth polarizing plate with a fourth absorption axis,
   the first absorption axis being parallel to the second absorption axis,
   the third absorption axis being parallel to the fourth absorption axis,
   the second absorption axis being perpendicular to the third absorption axis,
   the first liquid crystal panel including, sequentially from the back surface side toward the viewing surface side, a first substrate, a first liquid crystal layer containing first liquid crystal molecules, and a second substrate,
   the second liquid crystal panel including, sequentially from the back surface side toward the viewing surface side, a third substrate, a second liquid crystal layer containing second liquid crystal molecules, and a fourth substrate,
   the display device satisfying the following Formula (1), at least one of the following Formula (A6-1), Formula (A6-3), and Formula (A6-4), and at least one of the following Formula (B2-1) to Formula (B2-4), as well as the following Formula (A7) and Formula (B3):

$$|\varphi3-\varphi1| \geq 50° \quad \text{formula (1)}$$

$$5° \leq \theta(\varphi1, P2) \leq 20° \quad \text{formula (A6-1)}$$

$$5° \leq \theta(\varphi2, P2) \leq 20° \quad \text{formula (A6-3)}$$

$$65° \leq \theta(\varphi2, P2) \leq 80° \quad \text{Formula (A6-4)}$$

$$5° \leq |\varphi1-\varphi2| \leq 20° \quad \text{formula (A7)}$$

$$0° \leq \theta(\varphi3, P2) \leq 3° \quad \text{Formula (B2-1)}$$

$$87° \leq \theta(\varphi3, P2) \leq 90° \quad \text{formula (B2-2)}$$

$$0° \leq \theta(\varphi4, P2) \leq 3° \quad \text{Formula (B2-3)}$$

$$87° \leq \theta(\varphi4, P2) \leq 90° \quad \text{formula (B2-4)}$$

$$0° < |\varphi3-\varphi4| \leq 5° \quad \text{formula (B3)}$$

wherein $\varphi1$ represents an azimuthal angle of a director of the first liquid crystal molecules near the first substrate with no voltage applied to the first liquid crystal layer, $\varphi3$ represents an azimuthal angle of a director of the second liquid crystal molecules near the third substrate with no voltage applied to the second liquid crystal layer, $\varphi2$ represents an azimuthal angle of a director of the first liquid crystal molecules near the second substrate with no voltage applied to the first liquid crystal layer, $\varphi4$ represents an azimuthal angle of a director of the second liquid crystal molecules near the fourth substrate with no voltage applied to the second liquid crystal layer, $\theta(\varphi1, P2)$ represents an angle formed by the director of the first liquid crystal molecules near the first substrate and the second absorption axis in a plan view, $\theta(\varphi2, P2)$ represents an angle formed by the director of the first liquid crystal molecules near the second substrate and the second absorption axis in the plan view, $\theta(\varphi3, P2)$ represents an angle formed by the director of the second liquid crystal molecules near the third substrate and the second absorption axis in the plan view, and $\theta(\varphi4, P2)$ represents an angle formed by the director of the second liquid crystal molecules near the fourth substrate and the second absorption axis in the plan view.

2. The display device according to claim 1, wherein the display panel is an in-plane switching (IPS) mode liquid crystal display panel or a fringe field switching (FFS) mode liquid crystal display panel.

3. The display device according to claim 1, wherein a reference azimuth (0°) is set to a right in a horizontal direction of screens of the first liquid crystal panel and the second liquid crystal panel, and the azimuthal angle $\varphi1$ is not smaller than 135° and smaller than 225°.

4. The display device according to claim 1, further comprising a negative C plate providing a retardation Rth in a thickness direction of not less than 500 nm.

* * * * *